US009230488B2

(12) United States Patent
Kim et al.

(10) Patent No.: US 9,230,488 B2
(45) Date of Patent: Jan. 5, 2016

(54) METHOD OF DRIVING DISPLAY DEVICE

(71) Applicant: SAMSUNG DISPLAY CO., LTD., Gyeonggi-do (KR)

(72) Inventors: Jung-Won Kim, Seoul (KR); Joon-Chul Goh, Gyeonggi-Do (KR); Bong Hyun You, Gyeonggi-do (KR); Uk Chul Choi, Chungcheongnam-do (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 195 days.

(21) Appl. No.: 13/692,342

(22) Filed: Dec. 3, 2012

(65) Prior Publication Data

US 2014/0002509 A1 Jan. 2, 2014

(30) Foreign Application Priority Data

Jun. 29, 2012 (KR) ........................ 10-2012-0070921

(51) Int. Cl.
*G09G 5/10* (2006.01)
*G09G 3/34* (2006.01)
*G09G 3/00* (2006.01)
*G09G 3/36* (2006.01)
*H04N 13/04* (2006.01)

(52) U.S. Cl.
CPC .............. *G09G 3/3413* (2013.01); *G09G 3/003* (2013.01); *G09G 3/3607* (2013.01); *H04N 13/0438* (2013.01); *G09G 3/3648* (2013.01)

(58) Field of Classification Search
None
See application file for complete search history.

(56) References Cited

U.S. PATENT DOCUMENTS

| 2006/0007091 | A1 | 1/2006 | Yang et al. | |
|---|---|---|---|---|
| 2006/0238472 | A1* | 10/2006 | Lee et al. | 345/89 |
| 2009/0237495 | A1* | 9/2009 | Kawahara | 348/56 |
| 2009/0310047 | A1* | 12/2009 | Shin et al. | 349/37 |
| 2010/0007639 | A1* | 1/2010 | Jeong et al. | 345/208 |
| 2010/0238274 | A1* | 9/2010 | Kim et al. | 348/51 |
| 2011/0018983 | A1* | 1/2011 | Kim et al. | 348/56 |
| 2011/0157260 | A1 | 6/2011 | Pyun et al. | |

(Continued)

FOREIGN PATENT DOCUMENTS

| KR | 10-2011-0133730 A | 12/2011 |
|---|---|---|
| KR | 10-2012-0015006 A | 2/2012 |

OTHER PUBLICATIONS

European Patent Search dated Oct. 15, 2015 related to the corresponding European Patent Application No. 12194948.1.

*Primary Examiner* — Alexander Eisen
*Assistant Examiner* — Kebede Teshome
(74) *Attorney, Agent, or Firm* — F. Chau & Associates, LLC

(57) ABSTRACT

A method of driving a display device includes displaying an image corresponding to a left eye image signal during a first frame set including one or more frames and displaying an image corresponding to a right eye image signal during a second frame set including one or more successive frames, in which the first frame set and the second frame set include at least one frame displaying a first image according to a first gamma curve and at least one frame displaying a second image according to a second gamma curve, and the first frame set and the second frame set include two successive frames displaying the second image.

22 Claims, 51 Drawing Sheets

(56) References Cited

U.S. PATENT DOCUMENTS

| | | | |
|---|---|---|---|
| 2011/0205335 A1* | 8/2011 | Kim et al. | 348/43 |
| 2011/0228182 A1 | 9/2011 | Lee et al. | |
| 2011/0273440 A1 | 11/2011 | Park et al. | |
| 2011/0279490 A1 | 11/2011 | Lee et al. | |
| 2011/0279659 A1 | 11/2011 | Jung | |
| 2011/0310090 A1 | 12/2011 | Kim et al. | |
| 2012/0002123 A1 | 1/2012 | Kang | |
| 2012/0032947 A1* | 2/2012 | Phan et al. | 345/419 |
| 2012/0056856 A1 | 3/2012 | Woo et al. | |
| 2012/0075289 A1* | 3/2012 | Koh et al. | 345/419 |

* cited by examiner

FIG.53

METHOD OF DRIVING DISPLAY DEVICE

CROSS-REFERENCE TO RELATED APPLICATION

This application claims priority to Korean Patent Application No. 10-2012-0070921 filed in the Korean Intellectual Property Office on Jun. 29, 2012, the entire contents of which are herein incorporated by reference.

TECHNICAL FIELD

Embodiments of the present invention relate to a method of driving a display device.

DISCUSSION OF THE RELATED ART

Generally, in 3D image displaying technology, a 3D effect of an object is expressed by using binocular parallax. When different 2D images are reflected on an observer's left and right eyes, and an image reflected on the left eye (hereinafter, referred to as a "left eye image") and an image reflected on the right eye (hereinafter, referred to as a "right eye image") are transferred to a brain, the left eye image and the right eye image are recognized in the observer's brain as a 3D image having a depth or a 3D effect. Like 2D liquid crystal displays, 3D liquid crystal displays may suffer from a deterioration of lateral visibility. One method used to address such deterioration of lateral visibility is to divide a pixel into two subpixels to which different voltages are applied. However, this method may compromise other characteristics, such as transmittance.

SUMMARY

Embodiments of the present invention provide a display device that can increase transmittance and lateral visibility of a 3D image to increase display quality and a driving method thereof.

An exemplary embodiment of the present invention provides a method of driving a display device including a plurality of pixels, the method including displaying an image corresponding to a left eye image signal through a pixel of the plurality of pixels during a first frame set including one or more frames and displaying an image corresponding to a right eye image signal through the pixel during a second frame set including one or more frames, wherein the first frame set and the second frame set are adjacent to each other and include at least one frame during which a first image according to a first gamma curve is displayed and at least one frame during which a second image according to a second gamma curve which is different from the first gamma curve is displayed, wherein a luminance of the first image is not lower than a luminance of the second image, and wherein the first frame set and the second frame set include two successive frames displaying the second image.

Each of the first frame set and the second frame set may include a frame during which the first image is displayed and a frame during which the second image is displayed.

An order in which the first image and the second image are displayed during the first frame set may be opposite to an order in which the first image and the second image are displayed during another first frame set.

The plurality of pixels may include a first pixel and a second pixel which are adjacent to each other in a row direction or in a column direction, and when the first pixel displays the first image during one frame, the second pixel may display the second image.

An order in which the first image and the second image are displayed during the first frame set may be different from an order in which the first image and the second image are displayed during the second frame set.

An order in which the first image and the second image are displayed during the first frame set may be opposite to an order in which the first image and the second image are displayed during another first frame set.

A ratio of the number of frames during which the first image is displayed to the number of frames during which the second image is displayed in the first frame set and the second frame set may be 1:3.

Four frames during which the second image is displayed may be positioned between two frames during which the first image is displayed.

Each of the first frame set and the second frame set may include a plurality of frames during which images according to the same gamma curve are displayed.

Images displayed during which a plurality of frames of the first frame set and the second frame set may be based on the same gamma curve.

The plurality of pixels may include a first pixel and a second pixel which are adjacent to each other in a row direction or in a column direction, and when the first pixel displays the first image during one frame, the second pixel may display the second image.

Each of the first frame set and the second frame set may include one frame, and during the first frame set and the second frame set, images according to the same gamma curve are displayed.

The plurality of pixels may include a first pixel and a second pixel which are adjacent to each other in a row direction or in a column direction, and when the first pixel displays the first image during one frame, the second pixel may display the second image.

An exemplary embodiment of the present invention provides a method of driving a display device including a plurality of pixel rows, the method including simultaneously pre-charging a first pixel row and a second pixel row with a data voltage corresponding to the an output image signal for the first pixel row, charging the second pixel row with a data voltage corresponding to an output image signal for the second pixel row and holding a voltage charged in the first pixel row, and charging the first pixel row with a data voltage corresponding to the output image signal for the first pixel row and holding a voltage charged in the second pixel row. Simultaneously pre-charging the first pixel row and the second pixel row, charging the second pixel row, and charging the first pixel row are performed during each frame. A gamma curve on which images displayed by the first pixel row and the second pixel row are based when the first pixel row and the second pixel row are pre-charged during a first frame is different from a gamma curve on which an image displayed by the first pixel row is based when the second pixel row is charged during the first frame.

When images displayed by the first pixel row and the second pixel row are based on a first gamma curve when the first pixel row and the second pixel row are pre-charged during the first frame, images displayed by the first pixel row and the second pixel row may be based on a second gamma curve different from the first gamma curve when the first pixel row and the second pixel row are pre-charged during a second frame subsequent to the first frame.

When the second pixel row is charged during the second frame, an image displayed by the first pixel row may be based on the second gamma curve.

An exemplary embodiment of the present invention provides a method of driving a display device including a plurality of dots, each dot including a plurality of pixels, the method including displaying a left eye image according to a first gamma curve during a first frame through a first pixel of the pixels, displaying a left eye image according to a second gamma curve different from the first gamma curve during the first frame through a second pixel of the pixels, wherein the second pixel is adjacent to the first pixel in a column direction, displaying a right eye image according to the first gamma curve during the second frame subsequent to the first frame through the first pixel, and displaying a right eye image according to the second gamma curve during the second frame through the second pixel, wherein images displayed by two adjacent pixels that represent the same color are based on different gamma curves.

The plurality of pixels included in one dot may display images according to the same gamma curve.

Pixels positioned in one pixel row may display images according to the same gamma curve.

Pixels included in two dots which are adjacent to each other in a row direction may display images according to different gamma curves.

The plurality of pixels included in one dot may include at least two pixels displaying images according to different gamma curves.

Pixels which are adjacent to each other in a row direction may display images according to different gamma curves.

A pixel may include a first subpixel and a second subpixel which display images according to different gamma curves or images according to the same gamma curve.

According to an embodiment, there is provided a method of driving a display device including at least one pixel, the method including displaying a left image during a first frame through the pixel and displaying a right image during a second frame through the pixel, wherein the second frame is subsequent to the first frame, wherein the left image includes a first left image corresponding to a first gamma curve and a second left image corresponding to a second gamma curve, and the right image includes a first right image corresponding to the first gamma curve and a second right image corresponding to the second gamma curve.

According to the exemplary embodiments of the present invention, it is possible to increase transmittance and lateral visibility of a display device which displays a 3D image to increase display quality.

BRIEF DESCRIPTION OF THE DRAWINGS

FIGS. 53A to 53E, respectively, are diagrams illustrating changes over time in luminance of pixels in two pixel rows of a display device according to an exemplary embodiment of the present invention.

DETAILED DESCRIPTION OF THE EMBODIMENTS

Embodiments of the present invention will be hereinafter described in more detail with reference to the accompanying drawings. As those skilled in the art would realize, the described embodiments may be modified in various different ways, all without departing from the spirit or scope of the present invention. The same notations may be used to refer to the same or substantially the same elements throughout the specification and the drawings.

It will be understood that when an element or layer is referred to as being "on," "connected to" or "coupled to" another element or layer, it can be directly on, connected or coupled to the other element or layer or intervening elements or layers may be present.

As used herein, the singular forms, "a," "an" and "the" are intended to include the plural forms as well, unless the context clearly indicates otherwise.

Display devices according to exemplary embodiments of the present invention are described with reference to FIGS. 1 to 6.

Figure 1:
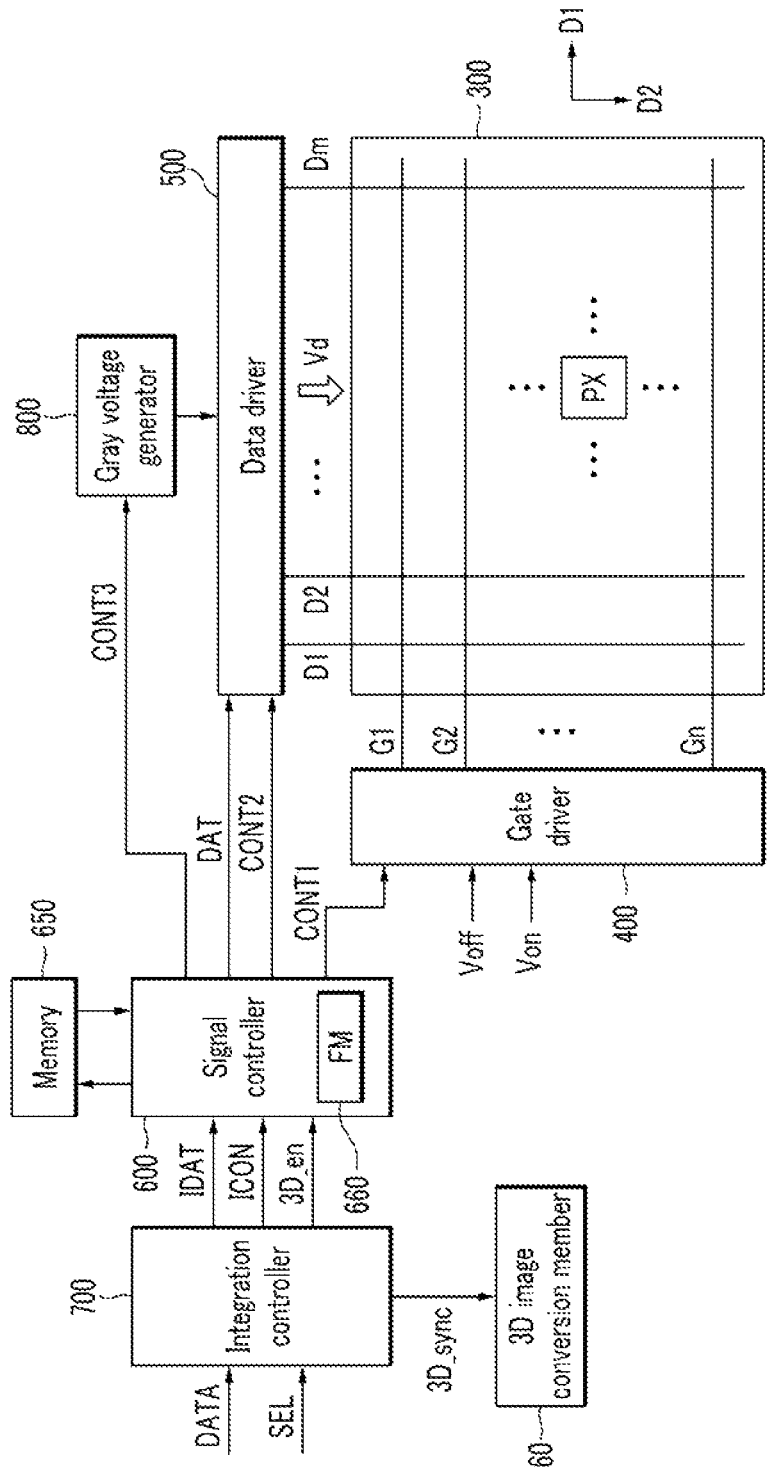
FIGS. 1 and 2 are block diagrams illustrating display devices according to exemplary embodiments of the present invention.
Figure 2:
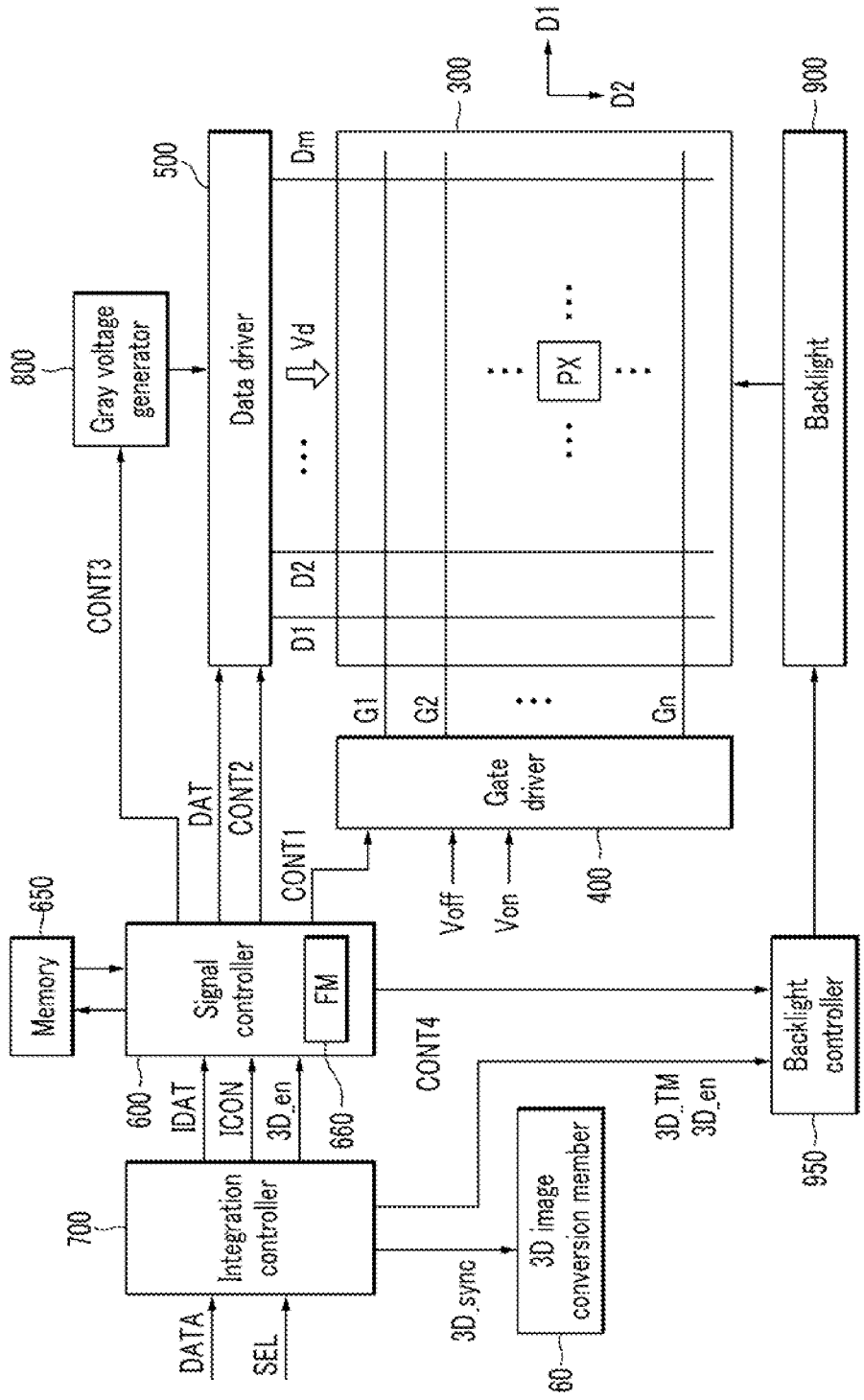
Figure 3:
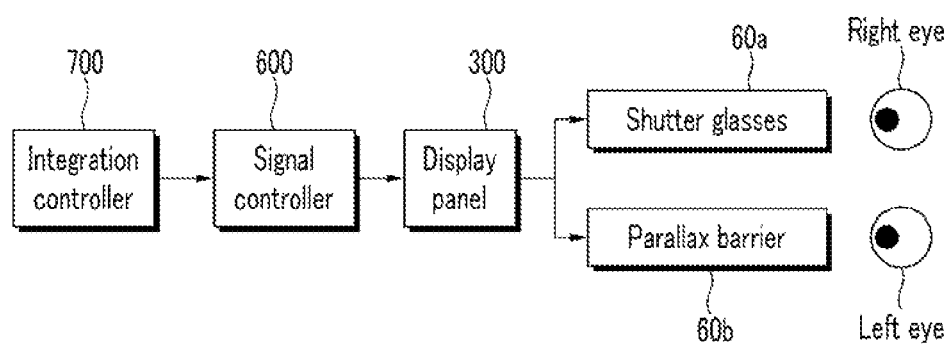
FIG. 3 is a block diagram illustrating a display device that displays a 3D image according to an exemplary embodiment of the present invention.
Figure 4:
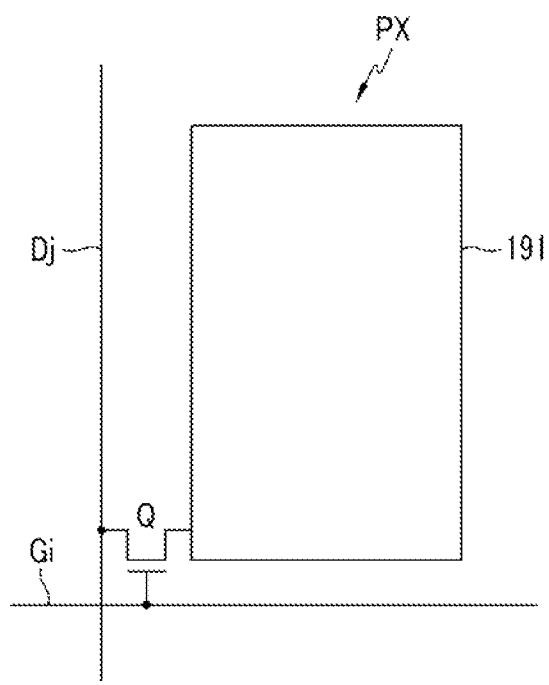
FIG. 4 is a circuit diagram schematically illustrating one pixel of a display device according to an exemplary embodiment of the present invention.
Figure 5:
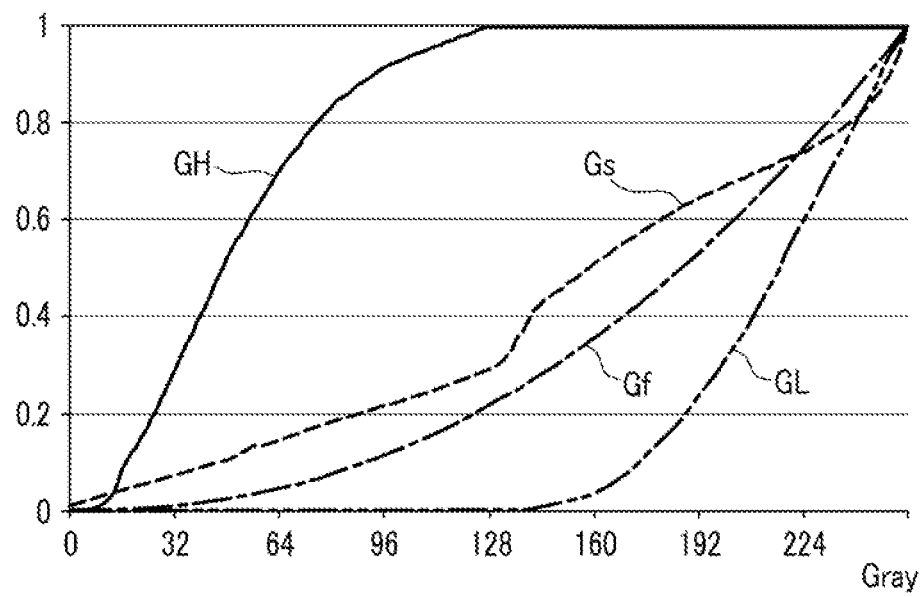
FIGS. 5 and 6 are graphs illustrating gamma curves of a display device according to an exemplary embodiment of the present invention.
Figure 6:
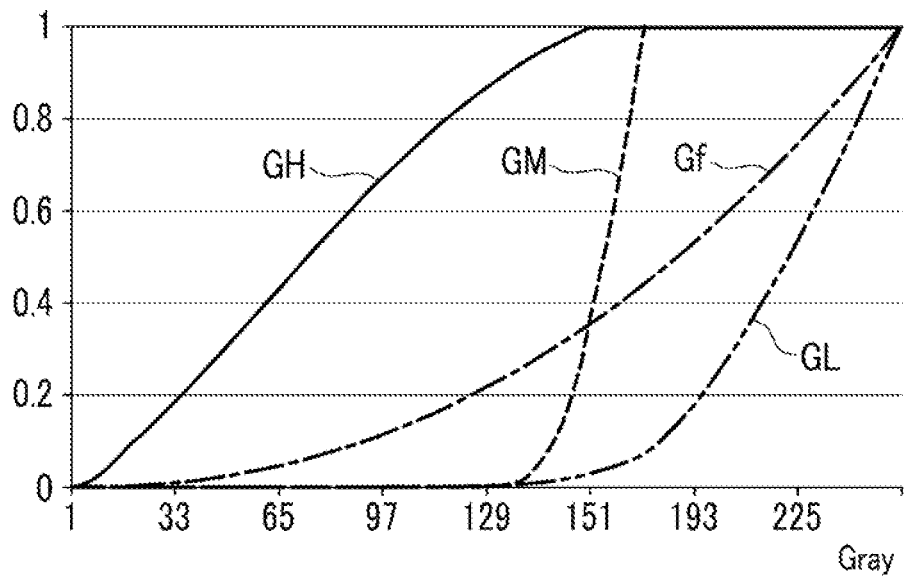

FIGS. 1 and 2, respectively, are block diagrams illustrating display device according to exemplary embodiments of the present invention, FIG. 3 is a block diagram illustrating a display device that can display a 3D image according to an exemplary embodiment of the present invention, FIG. 4 is a circuit diagram schematically illustrating one pixel of a display device according to an exemplary embodiment of the present invention, and FIGS. 5 and 6 are graphs each illustrating a gamma curve of a display device according to an exemplary embodiment of the present invention.

Referring to FIGS. 1 and 2, the display device according to an exemplary embodiment of the present invention includes an integration controller 700, a 3D image conversion member 60, a display panel 300, a gate driver 400 and a data driver 500, which are connected to the display panel 300, a gray voltage generator 800 connected to the data driver 500, a signal controller 600, and a memory 650 connected with the signal controller 600.

The integration controller 700 receives image information DATA and a mode selection information SEL from an outside source. The mode selection information SEL may include selection information on a 2D/3D mode regarding whether the image is displayed in a 2D mode or in a 3D mode. The integration controller 700 generates an input image signal IDAT and an input control signal ICON which controls displaying the input image signal IDAT based on the image information DATA and the mode selection information SEL. When the mode selection information SEL includes information on an instruction to select the 3D mode, the integration controller 700 may further generate a 3D synchronization signal 3D_sync and a 3D enable signal 3D_en. The input image signal IDAT, the input control signal CONT1 and the 3D enable signal 3D_en are transferred to the signal controller 600, and the 3D synchronization signal 3D_sync is transferred to the 3D image conversion member 60.

The input image signal IDAT may include luminance information, and the luminance may have a predetermined number of gray levels. The 3D enable signal 3D_en instructs the display device to operate in the 3D mode, and in the case of the 3D mode, the 3D synchronization signal 3D_sync may control an operation timing of the 3D image conversion member 60. The input control signal ICON may include a vertical synchronization signal Vsync, a horizontal synchronizing signal Hsync, a main clock MCLK, and a data enable signal DE regarding the image display.

The display panel 300 includes a plurality of signal lines and a plurality of pixels PX which are connected to the plurality of signal lines and arranged in a matrix form. When the display device according to an exemplary embodiment of the present invention is a liquid crystal display, the display panel 300 may include lower and upper display panels which face each other and a liquid crystal layer interposed between the two display panels when viewed in a cross-sectional view.

The signal lines include a plurality of gate lines G1-Gn which transfer gate signals (referred to as "scanning signals") and extend in a row direction D1, and a plurality of data lines D1-Dm which transfer data voltages and extend in a column direction D2.

Referring to FIG. 4, one pixel PX included in the display device according to an exemplary embodiment of the present invention may include at least one switching element Q which is connected to at least one data line Dj and at least one gate line Gi, and at least one pixel electrode 191 connected to the switching element Q. The switching element Q may include at least one thin film transistor and may be controlled by a gate signal Vg transferred by a gate line Gi to transfer a data voltage Vd through the data line Dj to the pixel electrode 191.

Each pixel PX displays one of three primary colors (spatial division) or alternately displays the primary colors in sequence (temporal division). The spatial division and temporal division schemes may apply together so that a desired color may be recognized. The plurality of adjacent pixels PX which display different primary colors, respectively, may form one set (referred to as a dot). One dot may display white.

The gate driver 400 is connected to the gate lines G1-Gn to sequentially apply a gate signal Vg formed by combining a gate-on voltage Von with a gate-off voltage Voff to the gate lines G1-Gn in the column direction D2.

The memory 650 is connected with the signal controller 600 to store gamma data for a gamma curve and then transmit the gamma data to the signal controller 600. The gamma curve represents the luminance or transmittance for a gray level of the input image signal IDAT and may be used to determine a gray voltage or a reference gray voltage. The gamma data stored in the memory 650 may include gamma data for two or more different gamma curves.

For example, referring to FIG. 5, the gamma data of the display device according to an exemplary embodiment of the present invention may include gamma data for a first gamma curve GH and a second gamma curve GL. The luminance of an image according to the first gamma curve GH may be higher than or the same as the luminance of an image according to the second gamma curve GL. To improve lateral visibility of the display device, the first and second gamma curves may be adjusted so that a front synthetic gamma curve of the first and second gamma curves GH and GL coincides with a front gamma curve Gf (for example, a gamma curve having a gamma value of 2.2) which is determined to be most suitable for the display device and so that a side synthetic gamma curve of the first and second gamma curves GH and GL is closest to the front gamma curve Gf.

Referring to FIG. 6, gamma data according to an exemplary embodiment of the present invention may include gamma data for at least three different gamma curves. The gamma data according to an exemplary embodiment of the present invention may include gamma data for a first gamma curve GH, a second gamma curve GL and a third gamma curve GM. The luminance of an image according to the first gamma curve GH may be higher than or the same as the luminance of an image according to the third gamma curve GM, and the luminance of the image according to the third gamma curve GM may be higher than or the same as the luminance of an image according to the second gamma curve GL. To improve lateral visibility of the display device, the first to third gamma curves GH, GL, and GM may be adjusted so that a synthetic gamma curve of images displayed for one frame set coincides with a front gamma curve Gf which is determined to be most suitable for the display device, and a side synthetic gamma curve of the first to third gamma curves GH, GL, and GM is closest to the front gamma curve Gf. According to an embodiment, the first to third gamma curves GH, GL, and GM are selected so that the synthetic gamma curve does not have a maximum inflection point and is close to the front gamma curve Gf, thereby increasing image quality.

According to an embodiment, the memory 650 may be included in the signal controller 600 or the gray voltage generator 800 and may be included in the data driver 500.

The gray voltage generator 800 generates all of the gray voltages associated with the transmittance of the pixel PX or a predetermined number of reference gray voltages associated with the transmittance of the pixel PX. According to an embodiment, the (reference) gray voltages may include a positive voltage and a negative voltage with respect to a common voltage Vcom. The gray voltage generator 800 may receive gamma data from the signal controller 600 to generate a (reference) gray voltage based on the gamma data.

According to an embodiment, the gray voltage generator 800 may be included in the data driver 500.

The data driver 500 is connected with the data lines D1-Dm and selects a gray voltage from the gray voltage generator 800 to apply the selected gray voltage as a data voltage Vd to the data lines D1-Dm. However, when the gray voltage generator 800 provides not all of the gray voltages but only a predetermined number of reference gray voltages, the data driver 500 generates gray voltages for all the gray levels by dividing the reference gray voltages and may select the data voltages Vd among the generated gray voltages.

The signal controller 600 receives the input image signal IDAT, the input control signal CONT1, and the 3D enable signal 3D_en from the integration controller 700 and controls operations of the gate driver 400, the data driver 500, and the gray voltage generator 800.

The signal controller 600 processes the input image signal IDAT according to an operation condition of the display panel 300 based on the input image signal IDAT and the input control signal ICON and generates an output image signal DAT, a gate control signal CONT1, a data control signal CONT2, and a gamma control signal CONT3.

The signal controller 600 may operate in a 2D mode for displaying a 2D image or in a 3D mode for displaying a 3D image according to the 3D enable signal 3D_en received from the integration controller 700. In the 3D mode, the output image signal DAT may include a left eye image signal and a right eye image signal. Accordingly, one pixel PX of the display panel 300 may alternately display a data voltage for a right eye image (referred to as a "right eye data voltage") corresponding to the right eye image signal and a data voltage for a left eye image (referred to as a "left eye data voltage").

The signal controller 600 may further include a frame memory 660 that can store the input image signal IDAT per frame.

The 3D image conversion member 60 for displaying a 3D image allows an image for an observer's left eye (referred to as a "left eye image") to be viewed by the left eye and an image for his right eye (referred to as a "right eye image") to be viewed by the right eye to generate binocular parallax. The 3D image conversion member 60 allows images to be observed at different angles by both eyes and the observer accordingly feels a 3D effect.

Referring to FIG. 3, as an example of the 3D image conversion member 60, shutter glasses 60a including a left eye shutter and a right eye shutter, and a parallax barrier 60b which has a light blocking unit and a light transmitting alternately formed are shown.

In the case of using the shutter glasses 60a, when the display panel 300 alternately displays the left eye image and the right eye image, the left eye shutter and the right eye shutter included in the shutter glasses 60a may alternately shield light in synchronization with the alternate display of the display panel 300. The observer may recognize the image of the display panel 300 as a 3D image through the shutter glasses 60a.

In the case of using the parallax barrier 60b, the parallax barrier 60b is positioned at the front or the rear of the display panel 300, and the display panel 300 may alternately display the left eye image and the right eye image in a horizontal direction. The light blocking unit which blocks light and the light transmitting unit which transmits light may be alternately formed in the parallax barrier 60b. The image from the display panel 300 is divided into the left eye image and the right eye image through the light transmitting unit of the parallax barrier 60b, which are to be viewed by the left eye and the right eye, respectively, of the observer.

The 3D image conversion member 60 may receive a 3D synchronization signal 3D_sync from the integration controller 700 and may operate in synchronization with the received 3D synchronization signal 3D_sync. The 3D synchronization signal 3D_sync may be generated by the signal controller 600 and may be transferred to the 3D image conversion member 60.

Referring to FIG. 2, a display device according to an exemplary embodiment of the present invention may further include a backlight 900 that supplies light to the display panel 300 and a backlight controller 950 that controls the backlight 900.

The backlight 900 may be positioned at the rear of the display panel 300 and may include at least one light source. Examples of the light source may include a fluorescent lamp, such as a cold cathode fluorescent lamp (CCFL), or a light emitting diode (LED). The light source included in the backlight 900 may be turned on or off for a predetermined time under the control of the backlight controller 950 depending on a backlight control signal CONT4. The backlight 900 may be divided into a plurality of blocks, and the plurality of blocks may be driven. According to an embodiment, the backlight 900 may further include at least one straight light guide plate facing the display panel 300.

According to an exemplary embodiment, the signal controller 600 generates the backlight control signal CONT4 and transmits the backlight control signal CONT4 to the backlight controller 950. The integration controller 700 may transfer a 3D enable signal 3D_en and a 3D timing signal 3D_TM to the backlight controller 950.

The backlight controller 950 receives the 3D timing signal 3D_TM and the 3D enable signal 3D_en from the integration controller 700, generates a backlight control signal based on the received 3D timing signal 3D_TM and 3D enable signal 3D__3n and transfers the generated backlight control signal to the backlight 900. The backlight 900 may be turned on or off under the control of the backlight control signal.

According to an embodiment, the backlight controller 950 may receive the backlight control signal CONT4 from the signal controller 600.

A method of driving the display device is described.

The signal controller 600 receives the input image signal IDAT and the input control signal ICON, which controls the display of the input image signal IDAT, from the integration controller 700. In the case of the 3D mode, the signal controller 600 receives the 3D enable signal 3D_en and operates in the 3D mode.

The signal controller 600 processes the input image signal IDAT based on the input image signal IDAT and the input control signal ICON to convert the input image signal IDAT into the output image signal DAT and generates the gate control signal CONT1, the data control signal CONT2 and the gamma control signal CONT3. The signal controller 600 transmits the gate control signal CONT1, to the gate driver 400, transmits the data control signal CONT2 and the output image signal DAT to the data driver 500, and transmits the gamma control signal CONT3 to the gray voltage generator 800. According to an embodiment, the data control signal CONT2 may further include an inversion signal which inverts a polarity of the data voltage Vd (referred to as a polarity of the data voltage) for the common voltage Vcom. The gamma control signal CONT3 may include gamma data stored in the memory 650.

According to an embodiment, when the display device further includes the backlight 900, the signal controller 600 generates a backlight control signal CONT4 and transmits the backlight control signal CONT4 to the backlight controller 950.

The gray voltage generator 800 generates gray voltages or a predetermined number of reference gray voltages according to the gamma control signal CONT3 and transmits the gray voltages or the reference gray voltages to the data driver 500. The gray voltages may be provided for each of different gamma curves, and a gray voltage may also be generated for a gamma curve selected through a separate selection process.

The data driver 500 receives the digital image signal DAT for a row of pixels PX from the signal controller 600 according to the data control signal CONT2 and selects a gray voltage corresponding to each digital image signal DAT, converts the digital image signal DAT into an analog data voltage Vd and then applies the digital image signal DAT to the corresponding data lines D1-Dm.

A frame frequency (referred to as an input frequency or a gamma frequency) at which the data driver 500 outputs the data voltage Vd to the data lines D1-Dm and thus displays an image through each pixel PX may be different from an image frequency (referred to as an output frequency) at which an image for one input image signal IDAT is displayed every two or more successive frames (referred to as a frame set). The image frequency may be 1/n (n is a natural number of 2 or more) of the frame frequency. For example, when the frame frequency is 120 Hz, the image frequency may be 60 Hz, and when the frame frequency is 240 Hz, the image frequency may be 60 Hz, 80 Hz, or 120 Hz.

In the case of the 3D mode, each pixel PX may alternately receive a left eye data voltage and a right eye data voltage on a per frame set basis, and may be applied with the left eye/right eye data voltages according to different gamma curves or the same gamma curve for a plurality of frames included in each frame set. However, in the 3D mode, a method of displaying the image in the pixel PX may vary depending on the type of 3D image conversion member 60 or the type of a 3D mode.

The gate driver 400 applies a gate-on voltage Von to the gate lines G1-Gn according to the gate control signal CONT1 from the signal controller 600 and turns on switching elements connected to the gate lines G1-Gn. Then, the data voltage Vd applied to the data lines D1-Dm is applied to a corresponding pixel PX through the turned-on switching element. When the data voltage Vd is applied to the pixel PX, the pixel PX may represent a luminance level corresponding to the data voltage Vd through various optical conversion elements. For example, according to an embodiment, in the case of a liquid crystal display, the luminance level corresponding to a gray level of the input image signal IDAT may be represented by controlling a tilted degree of liquid crystal molecules of the liquid crystal layer to control polarization of light.

For example, when the display device includes the backlight 900, the backlight 900 may emit light during a light emitting period ON under the control of the backlight controller 950 when the pixel PX is charged with the corresponding data voltage Vd. Accordingly, each pixel PX may display an image of a gray level corresponding to the corresponding data voltage Vd.

The light emitting period ON of the backlight 900 may start a predetermined time after the data voltage Vd is applied to the pixel PX. According to an embodiment, a position of the light emitting period ON of the backlight 900 may be determined depending on a response speed of the optical conversion element of the liquid crystal layer. For example, according to an embodiment, the light emitting period ON of the backlight 900 may start when reaction of the optical conversion element is almost completed, thereby preventing crosstalk.

In the case of the 3D mode, the 3D image conversion member 60 receives the 3D synchronization signal 3D_sync from the integration controller 700 and operates in synchronization with the 3D synchronization signal 3D_sync to thus transmit the left eye image and the right eye image which are displayed by the display panel 300 to the left eye and the right eye, respectively, such that the observer may recognize the 3D image.

According to an embodiment, a horizontal period, which is simply referred to as "1H" and is the same or substantially the same as one period of a horizontal synchronizing signal Hsync and a data enable signal DE, is repeated, so that the gate-on voltages Von are sequentially applied to all the gate lines G1-Gn and the data voltages Vd are applied to all the pixels PX, thereby displaying a frame of an image.

According to an exemplary embodiment of the present invention, one pixel PX receives the data voltages Vd according to different gamma curves during a plurality of frames included in one frame set to display the image, which is called "time division driving".

When one pixel PX includes two subpixels PXa and PXb, spatial division driving and time division driving both are applied to the pixel PX and thus images according to different gamma curves for one input image signal IDAT may be displayed through the two subpixels PXa and PXb during one frame, and each of the subpixels PXa and PXb may display images according to different gamma curves during successive frames. Accordingly, the side synthetic gamma curve for one frame set with respect to the two subpixels PXa and PXb is closest to the front gamma curve Gf, thereby improving lateral visibility.

Then, a pixel of a display device according to an exemplary embodiment of the present invention is described with reference to FIG. 7.

Figure 7:
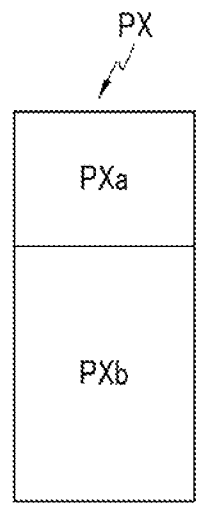
FIG. 7 is a diagram illustrating two subpixels included in one pixel of a display device according to an exemplary embodiment of the present invention.

FIG. 7 is a diagram illustrating two subpixels included in one pixel PX of a display device according to an exemplary embodiment of the present invention.

Referring to FIG. 7, the pixel PX may include a first subpixel PXa and a second subpixel PXb. The first subpixel PXa and the second subpixel PXb may display images according to different gamma curves with respect to one input image signal IDAT or may display an image according to the same gamma curve. The areas of the first subpixel PXa and the second subpixel PXb may be the same as each other or different from each other.

Various structures of the pixel PX including the first subpixel PXa and the second subpixel PXb will be described with reference to FIGS. 8 to 16.

First, a display device according to an exemplary embodiment of the present invention is described with reference to FIGS. 8, 9 and 10.

Figure 8:
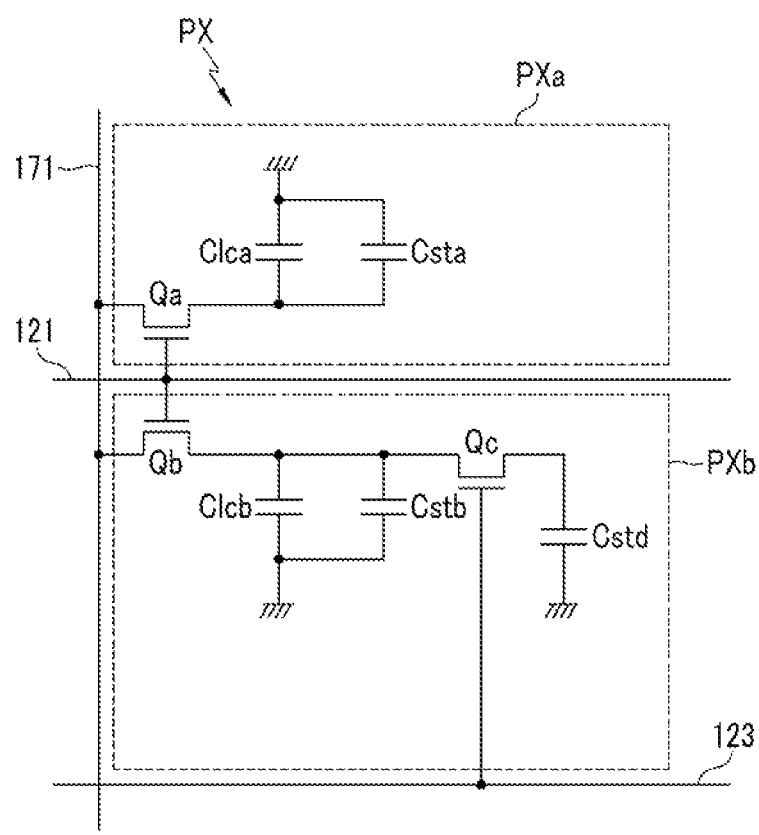
FIG. 8 is an equivalent circuit diagram illustrating one pixel of a display device according to an exemplary embodiment of the present invention.
Figure 9:
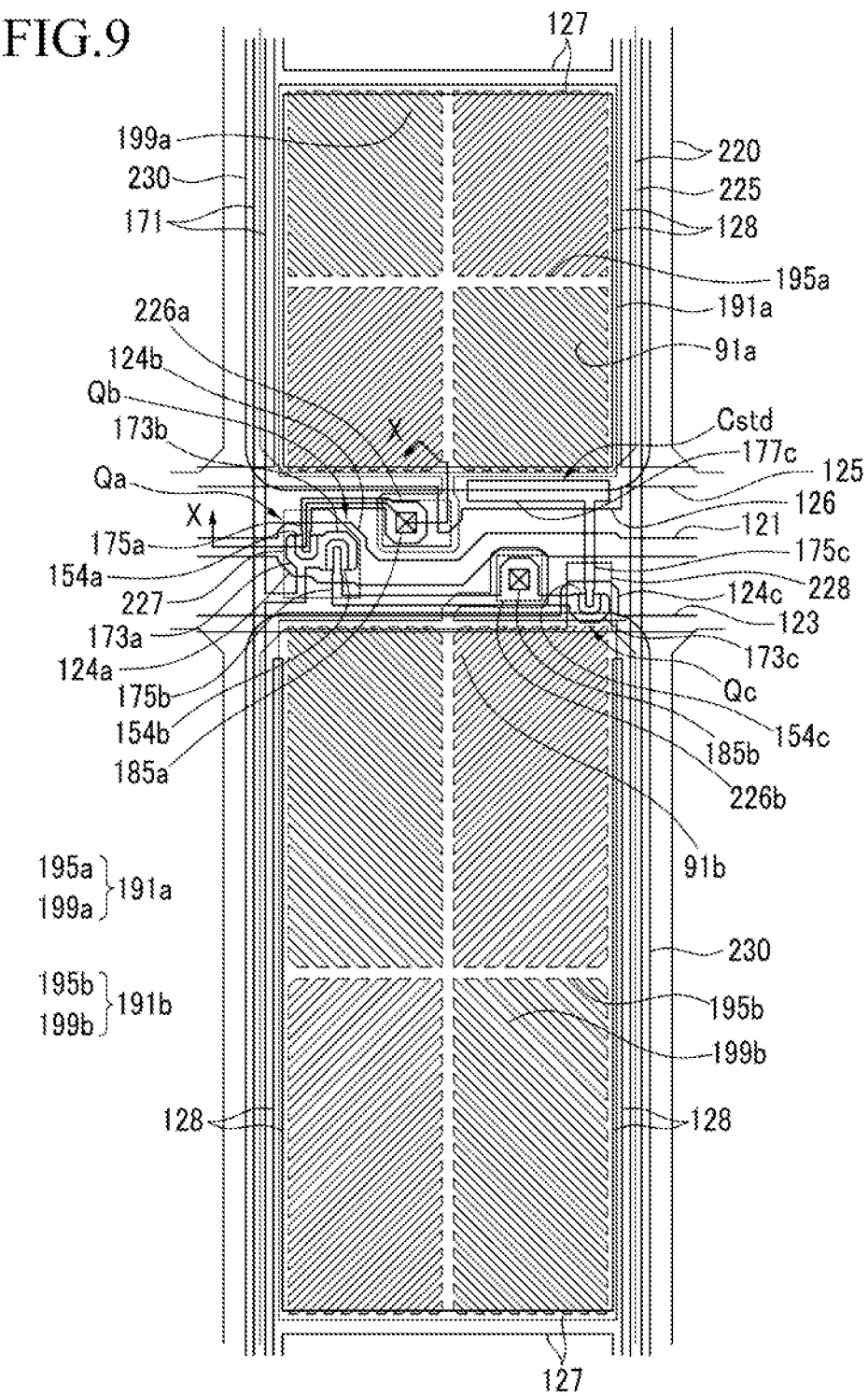
FIG. 9 is a plan view illustrating one pixel of a display device according to an exemplary embodiment of the present invention.
Figure 10:
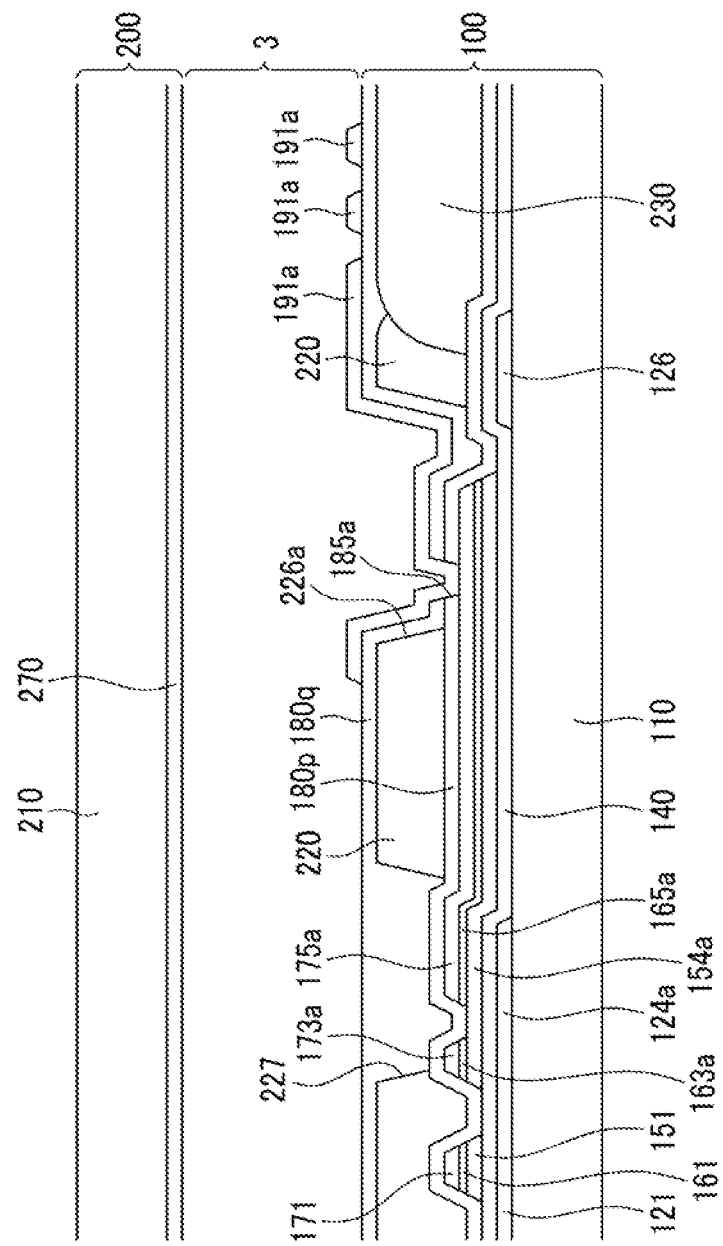
FIG. 10 is a cross-sectional view taken along line X-X of FIG. 9.

FIG. 8 is an equivalent circuit diagram illustrating one pixel of a display device according to an exemplary embodiment of the present invention, FIG. 9 is a plan view of one pixel of a display device according to an exemplary embodiment of the present invention, and FIG. 10 is a cross-sectional view taken along line X-X of FIG. 9.

Referring to FIG. 8, the display device according to an exemplary embodiment of the present invention is a liquid crystal display and includes signal lines including a gate line 121, a depressurizing gate line 123 and a data line 171 and pixels PX connected to the signal lines.

Each pixel PX includes first and second subpixels PXa and PXb. The first subpixel PXa includes a first switching element Qa, a first liquid crystal capacitor Clca and a first storage capacitor Csta, and the second subpixel PXb includes second and third switching elements Qb and Qc, a second liquid crystal capacitor Clcb, a second storage capacitor Cstb and a depressurizing capacitor Cstd.

The first and second switching elements Qa and Qb are connected to the gate line 121 and the data line 171, and the third switching element Qc is connected to the depressurizing gate line 123.

According to an embodiment, the first and second switching elements Qa and Qb are three-terminal elements, such as thin film transistors, which have control terminals connected to the gate line 121, input terminals connected with the data line 171, and output terminals connected to the first and second liquid crystal capacitors Clca and Clcb, respectively, and the first and second storage capacitors Csta and Cstb, respectively.

According to an embodiment, the third switching element Qc is a three-terminal element, such as a thin film transistor, which has a control terminal connected with the depressurizing gate line 123, an input terminal connected with the second liquid crystal capacitor Clcb, and an output terminal connected with the depressurizing capacitor Cstd.

The depressurizing capacitor Cstd is connected to the output terminal of the third switching element Qc and a common voltage.

The operation of the pixel PX is described.

When a gate-on voltage Von is applied to the gate line 121, the first and second thin film transistors Qa and Qb connected to the gate line 121 are turned on. Accordingly, a data voltage is applied from the data line 171 to the first and second liquid crystal capacitors Clca and Clcb through the turned-on first and second switching elements Qa and Qb, and thus the first and second liquid crystal capacitors Clca and Clcb are charged with a voltage corresponding to a difference between a data voltage Vd and a common voltage Vcom. According to an embodiment, when the gate-on voltage Von is applied to the gate line 121, a gate-off voltage Voff is applied to the depressurizing gate line 123.

When the gate-off voltage Voff is applied to the gate line 121, and simultaneously, the gate-on voltage Von is applied to the depressurizing gate line 123, the first and second switching elements Qa and Qb connected to the gate line 121 are turned off, and the third switching element Qc is turned on. Accordingly, the voltage charged in the second liquid crystal capacitor Clcb, which is connected with the output terminal of the second switching element Qb, decreases.

According to an embodiment, when the liquid crystal display is driven in a frame inversion scheme, and a data voltage Vd, which is positive in polarity with respect to the common voltage Vcom, is applied to the data line 171 during a current frame, negative (−) charges are concentrated in the depressurizing capacitor Cstd after the previous frame ends. During the current frame, when the third switching element Qc is turned on, positive (+) charges of the second liquid crystal capacitor Clcb flow into the depressurizing capacitor Cstd through the third switching element Qc, the positive (+) charges are concentrated in the depressurizing capacitor Cstd, and the voltage charged in the second liquid crystal capacitor Clcb decreases. On the contrary, during the next frame, as the third switching element Qc is turned on, with the negative (−) charges charged in the second liquid crystal capacitor Clcb, the negative (−) charges of the second liquid crystal capacitor Clcb flow into the depressurizing capacitor Cstd, the negative (−) charges are concentrated in the depressurizing capacitor Cstd, and the voltage of the second liquid crystal capacitor Clcb decreases.

As such, according to an exemplary embodiment, regardless of the polarity of the data voltage Vd, the voltage charged in the second liquid crystal capacitor Clcb may be always lower than the voltage charged in the first liquid crystal capacitor Clca. Accordingly, the voltages charged in the first and second liquid crystal capacitors Clca and Clcb are different from each other, such that it is possible to increase lateral visibility of the liquid crystal display.

A detailed structure of the liquid crystal display shown in FIG. 8 is described with reference to FIGS. 9 and 10.

Referring to FIGS. 9 and 10, the liquid crystal display according to an exemplary embodiment includes a lower panel 100 and an upper panel 200 which face each other, and a liquid crystal layer 3 interposed between the two display panels 100 and 200. According to an embodiment, polarizers may be provided on the outer surfaces of the display panels 100 and 200.

An opposite electrode 270 is formed on an insulation substrate 210. The opposite electrode 270 may be made of a transparent conductor, such as ITO and IZO or metal. According to an embodiment, an alignment layer may be formed on the opposite electrode 270.

The liquid crystal layer 3 interposed between the lower panel 100 and the upper panel 200 includes liquid crystal having dielectric anisotropy. The liquid crystal molecules may be aligned so that a long axis thereof is perpendicular or substantially perpendicular to the surfaces of the two display panels 100 and 200 when no electric field is applied. According to an embodiment, the liquid crystal molecules of the liquid crystal layer 3 may be pretilted so that the long axis is substantially parallel or parallel to a longitudinal direction of minute branches 199a and 199b of first and second subpixel electrodes 191a and 191b. According to an embodiment, the liquid crystal layer 3 may further include an alignment aid containing reactive mesogen, which may cause such pretilt.

A plurality of gate conductors including a plurality of gate lines 121, a plurality of depressurizing gate lines 123 and a plurality of storage electrode lines 125 are formed on an insulation substrate 110.

The gate line 121 and the depressurizing gate line 123 mainly extend in a horizontal direction and transfer gate signals. The gate line 121 includes a first gate electrode 124a and a second gate electrode 124b which protrude upward and downward, and the depressurizing gate line 123 may include a third gate electrode 124c which protrudes upward. The first gate electrode 124a and the second gate electrode 124b are connected to each other to form a single protrusion.

The storage electrode line 125 may mainly extend in a horizontal direction and may be positioned on the gate line 121 to transfer a predetermined voltage, such as a common voltage Vcom. The storage electrode line 125 may include a storage extension 126, two vertical portions 128 which extend upward to be perpendicular or substantially perpendicular to the gate line 121, and a horizontal portion 127 connecting the two vertical portions 128 to each other. However, the structure of the storage electrode line 125 is not limited thereto.

A gate insulating layer 140 is formed on the gate conductors 121, 123, and 125.

A plurality of semiconductor stripes 151 are formed of amorphous or crystalline silicon on the gate insulating layer 140. The semiconductor stripes 151 may include first and second semiconductors 154a and 154b, which are connected to each other and mainly extend in a vertical direction toward the first and second gate electrodes 124a and 124b, and a semiconductor 154c which is connected with the second semiconductor 154b.

A plurality of ohmic contacts 161 are formed on the semiconductor stripe 151, ohmic contacts 163a and 165a are formed on the first semiconductor 154a, the ohmic contact may be formed on the second semiconductor 154b and the third semiconductor 154c, respectively. The ohmic contact 165a may protrude from the ohmic contact stripe 161. However, alternatively, the ohmic contacts 161 and 165a may be omitted according to the type of the semiconductor 151.

A data conductor including a plurality of data lines 171, a plurality of first drain electrodes 175a, a plurality of second drain electrodes 175b and a plurality of third drain electrodes 175c is formed on the ohmic contacts 161 and 165a.

The data line 171 transfers a data signal and mainly extends in a vertical direction to cross the gate line 121 and the depressurizing gate line 123. The data line 171 may include a first source electrode 173a and a second source electrode 173b which extend toward the first gate electrode 124a and the second gate electrode 124b.

Each of the first drain electrode 175a, the second drain electrode 175b and the third drain electrode 175c may include one wide end and another rod-shaped end. The rod-shaped ends of the first drain electrode 175a and the second drain electrode 175b are partially surrounded by the first source electrode 173a and the second source electrode 173b, respectively. The wide end of the second drain electrode 175b extends to form a third source electrode 173c which is bent in a 'U' shape. A wide end 177c of the third drain electrode 175c overlaps the storage extension 126 to form a depressurizing capacitor Cstd, and a rod-shaped end of the third drain electrode 175c is partially surrounded by the third source electrode 173c.

The first/second/third gate electrodes 124a/124b/124c, the first/second/third source electrodes 173a/173b/173c, and the first/second/third drain electrodes 175a/175b/175c form first/second/third thin film transistors (TFTs) Qa/Qb/Qc together with the first/second/third semiconductors 154a/154b/154c, and a channel of the thin film transistor is formed in each of the semiconductors 154a/154b/154c between each of the source electrodes 173a/173b/173c and each of the drain electrodes 175a/175b/175c.

A lower passivation layer 180p is formed of an inorganic insulator, such as silicon nitride or silicon oxide, on the data conductors 171, 175a, 175b, and 175c and on the exposed portions of the semiconductor 154a, 154b, and 154c.

A color filter 230 and a light blocking member 220 may be positioned on the lower passivation layer 180. The light blocking member 220 may include a portion which covers a region where the first thin film transistor Qa, the second thin film transistor Qb and the third thin film transistor Qc are positioned, and a portion extending along the data line 171. The light blocking member 220 may include an opening 227 which is positioned on the first thin film transistor Qa and the second thin film transistor Qb, an opening 226a which is positioned on a wide end of the first drain electrode 175a, an opening 226b which is positioned on a wide end of the second drain electrode 175b, and an opening 228 which is positioned on the third thin film transistor Qc. Alternatively, the color filter 230 or the light blocking member 220 may be positioned on the upper panel 200.

An upper passivation layer 180q may be formed on the color filter 230 and the light blocking member 220.

A plurality of contact holes 185a and 185b, which expose the first drain electrode 175a and the second drain electrode 175b, respectively, are formed on the lower passivation layer 180p and the upper passivation layer 180q. The contact holes 185a and 185b may be positioned in the openings 226a and 226b, respectively, of the light blocking member 220.

A pixel electrode including a first subpixel electrode 191a and a second subpixel electrode 191b is formed on the upper passivation layer 180q.

The first and second subpixel electrodes 191a and 191b may be adjacent to each other in a column direction, and a height of the second subpixel electrode 191b may be larger than a height of the first subpixel electrode 191a.

The overall shape of the first subpixel electrode 191a is a quadrangle and includes an outer edge portion defining an outer edge, a cross stem 195a including a horizontal stem and a vertical stem, and a plurality of minute branches 199a which obliquely extend from the cross stem 195a to the outside. A minute slit 91a is positioned between the adjacent minute branches 199a.

The overall shape of the second subpixel electrode 191b is a quadrangle and includes an outer edge portion defining an outer edge, a cross stem 195b including a horizontal stem and a vertical stem, and a plurality of minute branches 199b which obliquely extend from the cross stem 195b to the outside. A minute slit 91b is positioned between the adjacent minute branches 199b.

Each of the first subpixel electrode 191a and the second subpixel electrode 191b is divided into four subregions by each of the cross stems 195a and 195b. Referring to FIG. 9, each subregion of the second subpixel electrode 191b may include a region in which a distance between the minute branches 199b is changed according to a position, but alternatively, the distance between the minute branches 199b may be constant. The detailed structure of the first and second subpixel electrodes 191a and 191b is not limited to the example shown in FIG. 9 and may be variously modified, and the size of each portion may vary according to a design element, such as a cell gap, a kind, and a characteristic of the liquid crystal layer 3.

The first subpixel electrode 191a receives a data voltage from the first drain electrode 175a through the contact hole 185a, and the second subpixel electrode 191b may receive a data voltage from the second drain electrode 175b through the contact hole 185b.

According to an embodiment, an alignment layer may be formed on the first and second subpixel electrodes 191a and 191b and the upper passivation layer 180q.

The first and second subpixel electrodes 191a and 191b generate an electric field together with the opposite electrode 270 of the upper panel 200, thereby determining the directions of the liquid crystal molecules of the liquid crystal layer 3 between the two electrodes 191 and 270. According to a tilted degree of the liquid crystal molecules, the degree of a change in polarization of light which is incident to the liquid crystal layer 3 varies, and the change in the polarization is represented as a change in transmittance by the polarizer, and as a result, the liquid crystal display displays an image.

Sides of the minute branches 199a and 199b or the minute slits 91a and 91b included in the first and second subpixel electrodes 191a and 191b distort the electric field to create a horizontal component of the electric field which is perpendicular or substantially perpendicular to the sides of the minute branches 199a and 199b or the minute slits 91a and 91b, and tilted directions of the liquid crystal molecules are determined by the horizontal component. Accordingly, the liquid crystal molecules are first tilted in a direction perpendicular or substantially perpendicular to the sides of the minute branches 199a and 199b or the minute slits 91a and

91b. However, since a horizontal component of the electric field is created in an opposite direction by sides of adjacent minute branches 199a and 199b or adjacent minute slits 91a and 91b, and the width of the minute branches 199a and 199b or the minute slits 91a and 91b is narrow, the liquid crystal molecules which are tilted in the directions opposite to each other are tilted in a direction parallel to the minute branches 199a and 199b or the minute slits 91a and 91b.

In an exemplary embodiment of the present invention, since the first and second subpixel electrodes 191a and 191b include four subregions having different longitudinal directions of the minute branches 199a and 199b, the liquid crystal molecules of the liquid crystal layer 3 have a total of four directions, and a reference viewing angle of the liquid crystal display may be increased.

The first subpixel electrode 191a and the opposite electrode 270 form the first liquid crystal capacitor Clca together with the liquid crystal layer 3 between the first subpixel electrode 191 and the opposite electrode 270, and the second subpixel electrode 191b and the opposite electrode 270 form the second liquid crystal capacitor Clcb together with the liquid crystal layer 3 between the second subpixel electrode 191b and the opposite electrode 270 to maintain the applied voltage even after the first and second thin film transistors Qa and Qb are turned off.

The first and second subpixel electrodes 191a and 191b overlap the storage electrode line 125 to form the first and second storage capacitors Csta and Cstb.

A display device according to an exemplary embodiment of the present invention will be described with reference to FIGS. 11 to 13.

Figure 11:
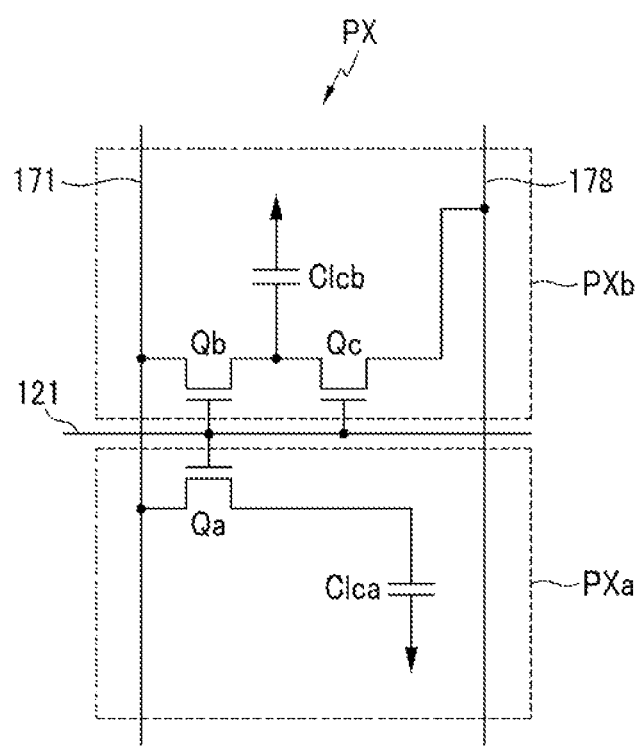
FIG. 11 is an equivalent circuit diagram illustrating one pixel of a display device according to an exemplary embodiment of the present invention.
Figure 12A:
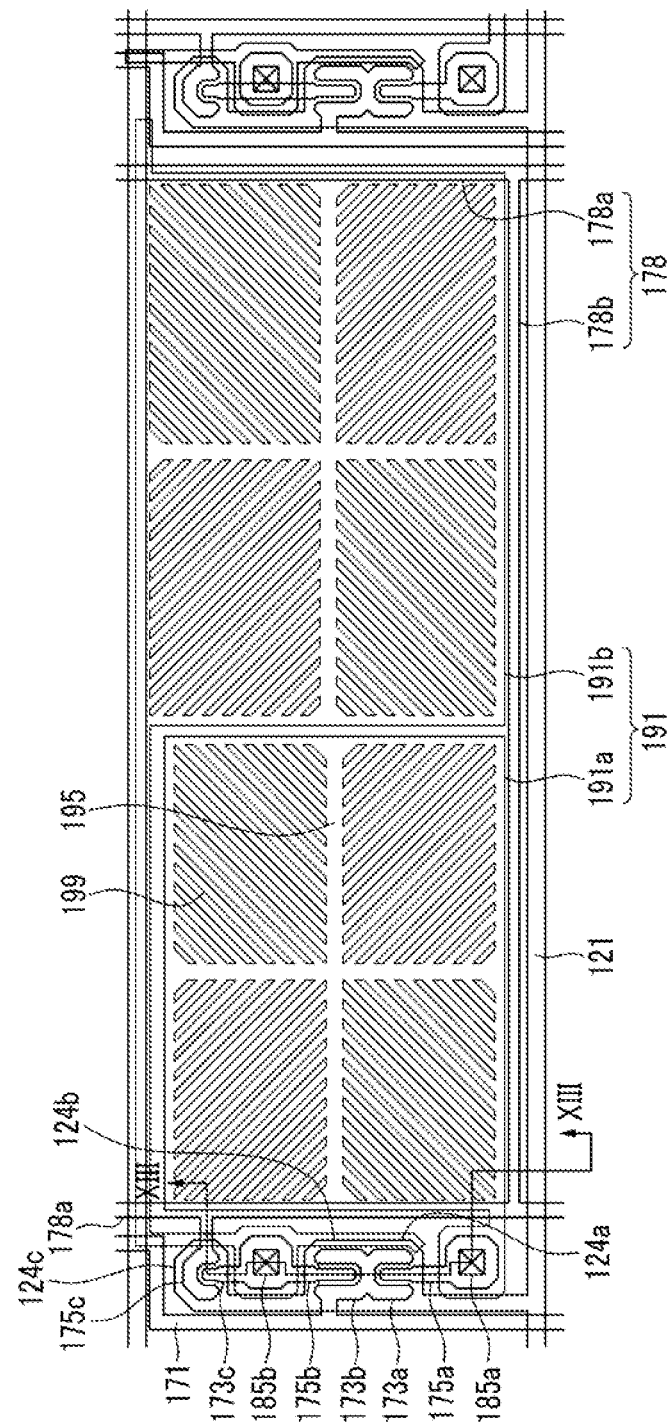
FIGS. 12A and 12B, respectively, are plan views illustrating one pixel of a display device according to an exemplary embodiment of the present invention.
Figure 12B:
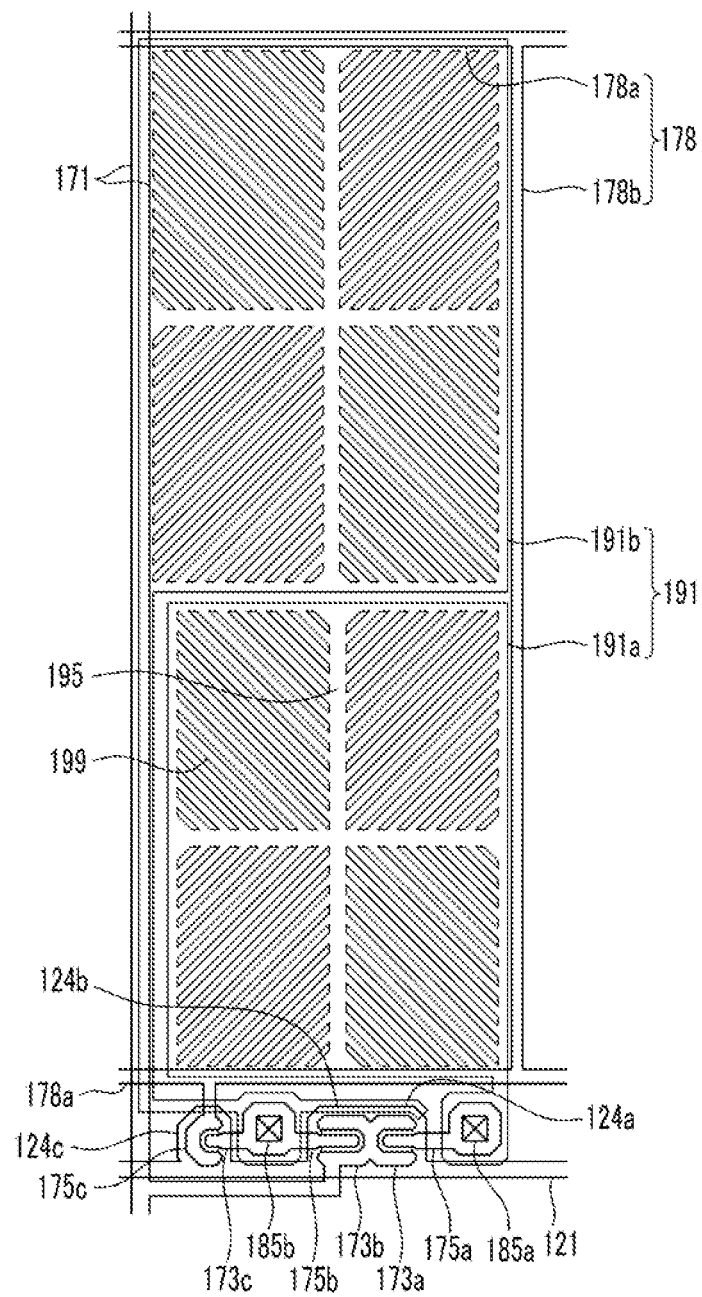
Figure 13:
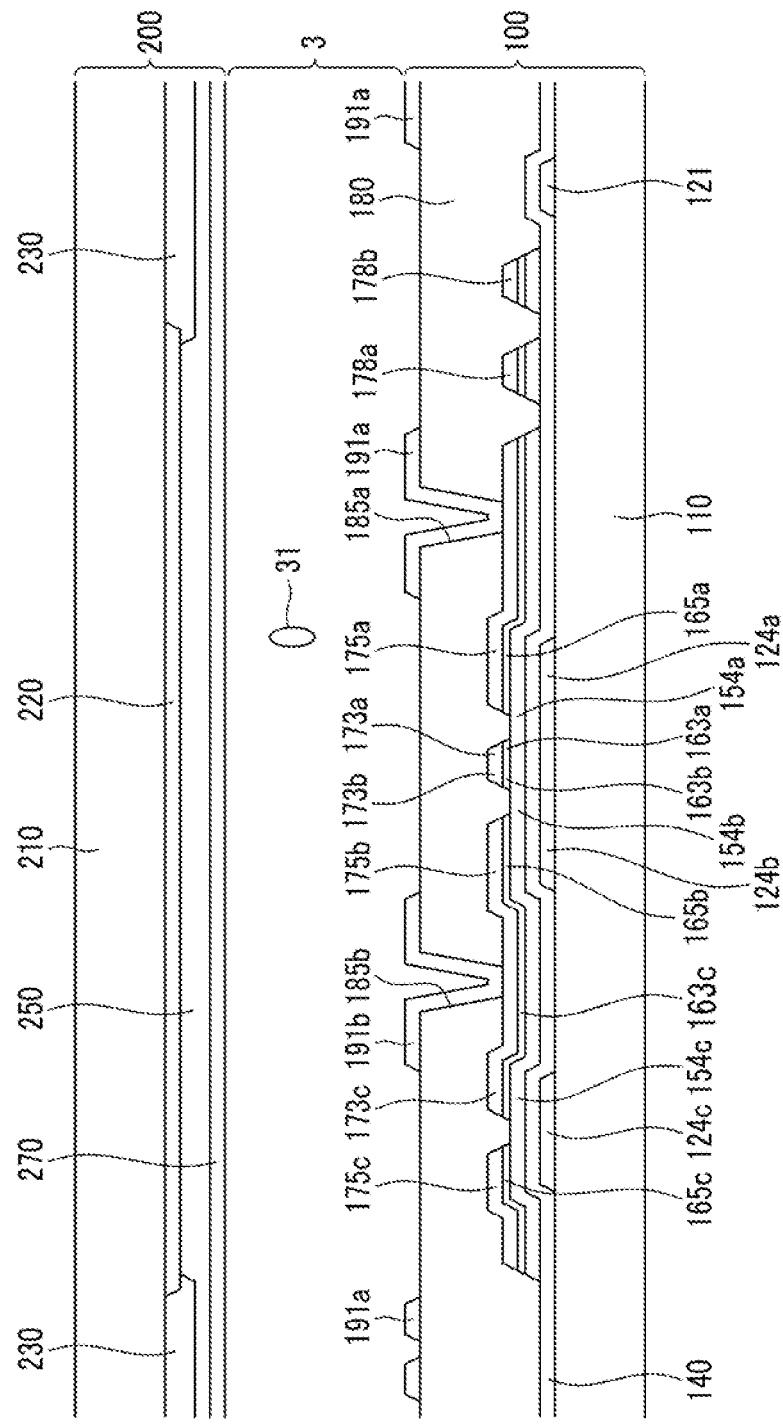
FIG. 13 is a cross-sectional view taken along line XIII-XIII of FIG. 12A.

FIG. 11 is an equivalent circuit diagram illustrating one pixel of a display device according to an exemplary embodiment of the present invention, FIGS. 12A and 12B are plan views illustrating one pixel of a display device according to exemplary embodiments of the present invention, and FIG. 13 is a cross-sectional view taken along line XIII-XIII of FIG. 12.

Referring to FIG. 11, according to an embodiment, the display device is a liquid crystal display that includes signal lines including a gate line 121 transferring a gate signal, a data line 171 transferring a data signal, a reference voltage line 178 transferring a reference voltage, and pixels PX connected to the signal lines.

Each pixel PX includes first and second subpixels PXa and PXb. The first subpixel PXa includes a first switching element Qa and a first liquid crystal capacitor Clca, and the second subpixel PXb includes second and third switching elements Qb and Qc and a second liquid crystal capacitor Clcb.

The first switching element Qa and the second switching element Qb each are connected to the gate line 121 and the data line 171, and the third switching element Qc is connected to an output terminal of the second switching element Qb and the reference voltage line 178.

The first switching element Qa and the second switching element Qb are three-terminal elements, such as a thin film transistor, which include control terminals connected to the gate line 121 and input terminals connected with the data line 171. An output terminal of the first switching element Qa is connected to the first liquid crystal capacitors Clca, and an output terminal of the second switching element Qb is connected to the second liquid crystal capacitor Clcb and the input terminal of the third switching element Qc.

The third switching element Qc is also a three-terminal element, such as a thin film transistor, which includes a control terminal connected with the gate line 121, an input terminal connected with the second liquid crystal capacitor Clcb, and an output terminal connected with the reference voltage line 178.

The operation of the pixel PX shown in FIG. 11 is described.

When a gate-on voltage Von is applied to the gate line 121, the first switching element Qa, the second switching element Qb and the third switching element Qc connected to the gate line 121 are turned on. Accordingly, a data voltage applied to the data line 171 is applied to the first liquid crystal capacitor Clca and the second liquid crystal capacitor Clcb through the turned-on first switching element Qa and second switching element Qb, respectively, and thus the first liquid crystal capacitor Clca and the second liquid crystal capacitor Clcb are charged with a voltage corresponding to a difference between a data voltage Vd and a common voltage Vcom. The same data voltage Vd is transferred to the first liquid crystal capacitor Clcb and the second liquid crystal capacitor Clcb through the first and second switching elements Qa and Qb, respectively, but the voltage charged in the second liquid crystal capacitor Clcb is divided by the third switching element Qc. Accordingly, since the voltage charged in the second liquid crystal capacitor Clcb is lower than the voltage charged in the first liquid crystal capacitor Clca, the luminance of the two subpixels PXa and PXb may be changed. Accordingly, the charged voltage in the first liquid crystal capacitor Clca and the charged voltage in the second liquid crystal capacitor Clcb may be controlled so that an image viewed from a side may be closest to an image viewed from a front, thereby increasing lateral visibility.

A detailed structure of a liquid crystal display according to an exemplary embodiment will be described with reference to FIGS. 12A and 13.

Referring to FIGS. 12A and 13, the liquid crystal display according to an exemplary embodiment includes a lower panel 100 and an upper panel which face each other, a liquid crystal layer 3 interposed between the two display panels 100 and 200, and two polarizers attached on the outer surfaces of the display panels 100 and 200.

A gate line 121 is positioned on the insulation substrate 110. The gate line 121 includes a first gate electrode 124a, a second gate electrode 124b, and a third gate electrode 124c.

A gate insulating layer 140 is positioned on the gate line 121, and a first semiconductor 154a, a second semiconductor 154b and a third semiconductor 154c are positioned on the gate insulating layer 140.

A plurality of ohmic contacts 163a, 165a, 163b, 165b, 163c, and 165c may be positioned on the first semiconductor 154a, the second semiconductor 154b and the third semiconductor 154c.

On the ohmic contacts 163a, 165a, 163b, 165b, 163c, and 165c and the gate insulating layer 140 are disposed data conductors 171, 173c, 175a, 175b, 175c, and 178, which include a plurality of data lines 171 including a first source electrode 173a and a second source electrode 173b, a first drain electrode 175a, a second drain electrode 175b, a third source electrode 173a, a third drain electrode 175c, and a reference voltage line 178.

The reference voltage line 178 may include two stems 178a which are parallel or substantially parallel to the data line 171 and a connection part 178b connecting the two stems 178a to each other. The two stems 178a of the reference voltage line 178 may be connected to each other by the connection part 178b, thereby preventing a delay of a signal flowing in the reference voltage line 178. However, the shape of the reference voltage line 178 is not limited thereto and may be variously modified.

The first gate electrode 124a, the first source electrode 173a and the first drain electrode 175a may form a first thin film transistor Qa together with the first semiconductor 154a, the second gate electrode 124b, the second source electrode 173b and the second drain electrode 175b may form a second thin film transistor Qb together with the second semiconductor 154b, and the third gate electrode 124c, the third source electrode 173c and the third drain electrode 175c may form a third thin film transistor Qc together with the third semiconductor 154c.

A passivation layer 180 may be positioned on the data conductors 171, 173c, 175a, 175b, 175c, and 177 and on the exposed portions of the semiconductors 154a, 154b, and 154c. The passivation layer 180 may include a plurality of contact holes 185a and 185b which expose the first drain electrode 175a and the second drain electrode 175b.

A pixel electrode 191 including a first subpixel electrode 191a and a second subpixel electrode 191b is positioned on the passivation layer 180.

The pixel electrode 191 may include a first side parallel to the gate line 121 and a second side parallel to the data line 171. The first side parallel to the gate line 121 may be longer than the second side parallel to the data line 171. Since the number of the data lines 171 which are positioned on the display panel 300 may be reduced, the number of data driving chips included in the data driver 500 may be reduced.

The first subpixel electrode 191a and the second subpixel electrode 191b may be adjacent to each other in a horizontal direction. Each of the first and second subpixel electrodes 191a and 191b may include a cross stem 195 and a plurality of minute branches 199.

The first subpixel electrode 191a and the second subpixel electrode 191b are physically and electrically connected with the first drain electrode 175a and the second drain electrode 175b through the contact holes 185a and 185b and may receive data voltages from the first drain electrode 175a and the second drain electrode 175b. A part of the data voltage applied to the second drain electrode 175b is divided through the third source electrode 173c, and a magnitude of the voltage applied to the second subpixel electrode 191b may be smaller than a magnitude of the voltage applied to the first subpixel electrode 191a.

An area of the second subpixel electrode 191b may be the same as or larger than an area of the first subpixel electrode 191a.

The voltage applied to the reference voltage line 178 may be higher than the common voltage Vcom, and the absolute value of the difference between the common voltage Vcom and the voltage applied to the reference voltage line 178 may be about 1 V to about 4 V.

A light blocking member 220 and a color filter 230 may be positioned on an insulation substrate 210. At least one of the light blocking member 220 and the color filter 230 may be positioned on the lower panel 100.

An overcoat 250 may be positioned on the color filter 230 and the light blocking member 220. Alternatively, the overcoat 250 may be omitted.

An opposite electrode 270 is formed on the overcoat 250.

Alignment layers are formed on two sides of the display panels 100 and 200 and may be vertical alignment layers.

Referring to FIG. 12B, a display device according to an exemplary embodiment of the present invention is substantially the same as the display device described above in connection with FIG. 12A except that gate line 121 may extend in a horizontal direction, and the data line 171 may extend in a direction perpendicular or substantially perpendicular to the gate line 121.

A side of the pixel electrode 191, which is substantially parallel to the gate line 121 is shorter than another side of the pixel electrode 191, which is substantially parallel to the data line 171. The first subpixel electrode 191a and the second subpixel electrode 191b may be adjacent to each other in a vertical direction.

A display device according to an exemplary embodiment of the present invention will be described with reference to FIG. 14.

Figure 14:
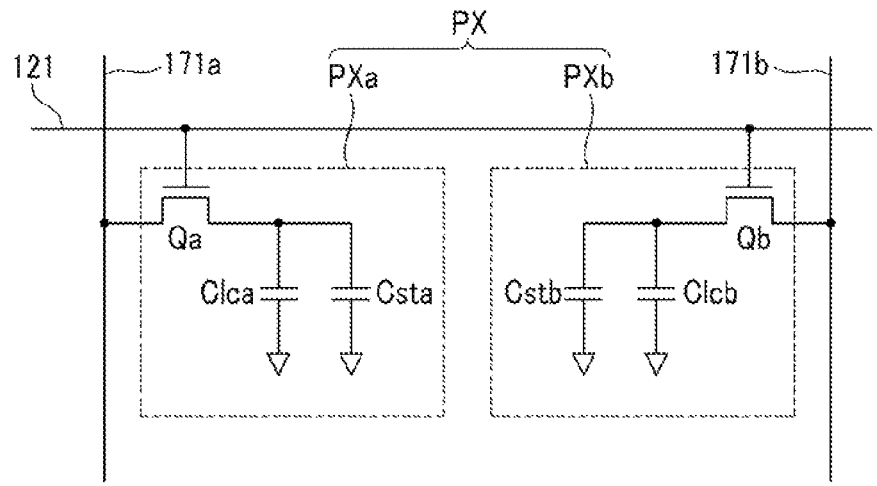
FIGS. 14, 15, and 16, respectively, are equivalent circuit diagrams each illustrating one pixel of a display device according to an exemplary embodiment of the present invention.

Referring to FIG. 14, the display device according to an exemplary embodiment of the present invention includes signal lines including first and second data lines 171a and 171b and a gate line 121, and pixels PX connected to the signal lines.

Each pixel PX includes first and second subpixels PXa and PXb. The first subpixel PXa includes a first switching element Qa, a first liquid crystal capacitor Clca and a first storage capacitor Csta, and the second subpixel PXb includes a second switching element Qb, a second liquid crystal capacitor Clcb and a second storage capacitor Cstb.

The first switching element Qa includes a control terminal connected to the gate line 121 and an input terminal connected to the first data line 171a. An output terminal of the first switching element Qa is connected with the first liquid crystal capacitor Clca and the first storage capacitor Csta.

The second switching element Qb includes a control terminal connected to the gate line 121 and an input terminal connected to the second data line 171b. An output terminal of the second switching element Qb is connected with the second liquid crystal capacitor Clcb and the second storage capacitor Cstb.

The first liquid crystal capacitor Clca and the second liquid crystal capacitor Clcb may receive different data voltages Vd for one input image signal IDAT through the first and second switching elements Qa and Qb which are connected to different data lines 171a and 171b, respectively.

Figure 15:
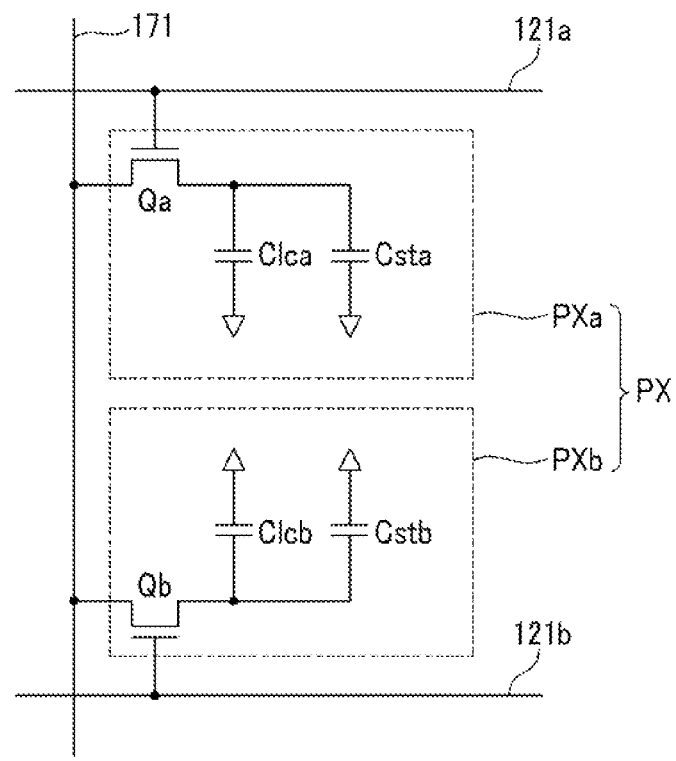

Referring to FIG. 15, the display device according to an exemplary embodiment includes signal lines including a data line 171 and first and second gate lines 121a and 121b, and pixels PX connected to the signal lines. Each pixel PX includes first and second subpixels PXa and PXb.

The first switching element Qa included in the first subpixel PXa includes a control terminal connected to the first gate line 121a and an input terminal connected to the data line 171. An output terminal of the first switching element Qa is connected with the first liquid crystal capacitor Clca and the first storage capacitor Csta.

The second switching element Qb includes a control terminal connected to the second gate line 121b and an input terminal connected to the data line 171. An output terminal of the second switching element Qb is connected with the second liquid crystal capacitor Clcb and the second storage capacitor Cstb.

The first liquid crystal capacitor Clca and the second liquid crystal capacitor Clcb may receive different data voltages Vd for one input image signal IDAT which is transferred by the data line 171 at different times through the first and second switching elements Qa and Qb which are connected to different gate lines 121a and 121b, respectively.

Figure 16:
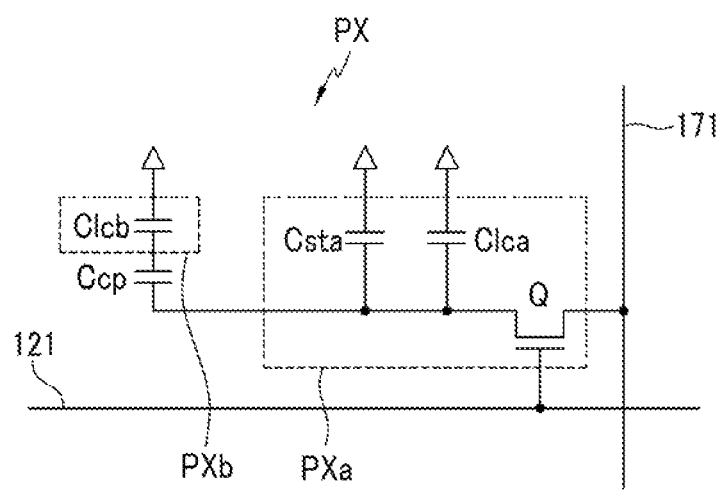

Referring to FIG. 16, the display device according to an exemplary embodiment includes signal lines including a data line 171 and a gate line 121, and pixels PX connected to the signal lines. Each pixel PX may include first and second subpixels Pxa and PXb, and a coupling capacitor Ccp which is connected between the two subpixels PXa and PXb.

The first subpixel Pxa includes a switching element Q connected to the gate line 121 and the data line 171, and a first liquid crystal capacitor Clca and a first storage capacitor Csta which are connected to the switching element Q, and the second subpixel PXb includes a second liquid crystal capacitor Clcb connected with the coupling capacitor Ccp.

A control terminal of the switching element Q is connected with the gate line 121, an input terminal is connected with the data line 171, and an output terminal is connected with the first liquid crystal capacitor Clca, the first storage capacitor Csta and the coupling capacitor Ccp. The switching element Q transfers a data voltage Vd of the data line 171 to the first liquid crystal capacitor Clca and the coupling capacitor Ccp according to a gate signal from the gate line 121, and the coupling capacitor Ccp may transfer the data voltage Vd whose magnitude is changed to the second liquid crystal capacitor Clcb. A charged voltage Va in the first liquid crystal capacitor Clca and a charged voltage Vb in the second liquid crystal capacitor Clcb may have the following relationship:

$$Vb = Va \times [Ccp/(Ccp + Clcb)]$$

Here, Ccp is a capacitance of the coupling capacitor Ccp, and Clcb is a capacitance of the second liquid crystal capacitor Clcb. Accordingly, the charged voltage Vb in the second liquid crystal capacitor Clcb may be smaller than the charged voltage Va in the first liquid crystal capacitor Clca. When the capacitance of the coupling capacitor Ccp is controlled, a ratio of the charged voltage Va in the first liquid crystal capacitor Clca to the charged voltage Vb in the second liquid crystal capacitor Clcb is controlled, thereby increasing lateral visibility.

Methods of driving a display device according to exemplary embodiments will be described with reference to FIGS. 17 to 24.

FIGS. 17 to 24, respectively, are timing diagrams illustrating methods of driving a display device according to an exemplary embodiment of the present invention.

The display device according to an exemplary embodiment of the present invention may increase lateral visibility by using the first and second gamma curves GH and GL described above in connection with FIGS. 5 and 6. However, the display device is not limited thereto and may use three or more different gamma curves.

Figure 17:
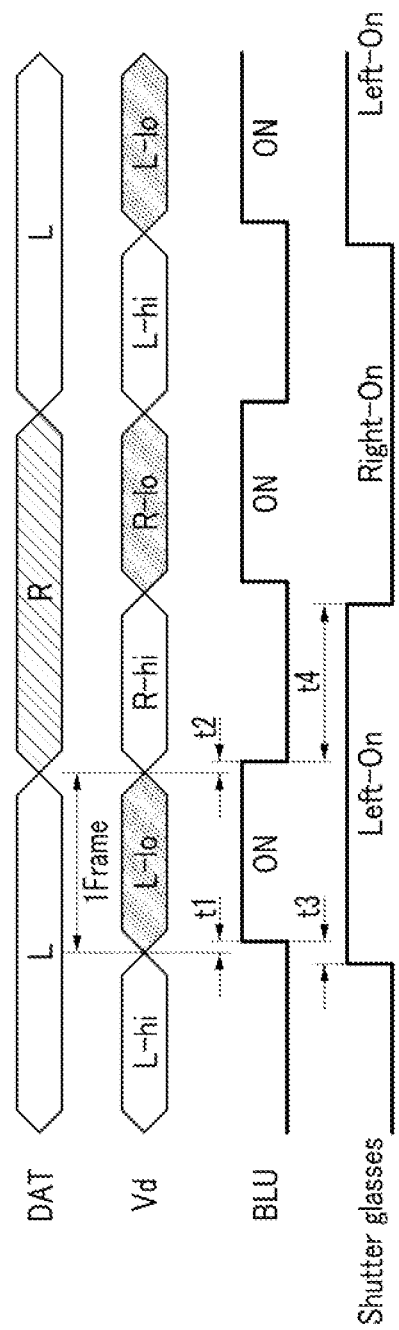
FIGS. 17 to 24 are timing diagrams illustrating a method of driving a display device that displays a 3D image according to an exemplary embodiment of the present invention.
Figure 18:
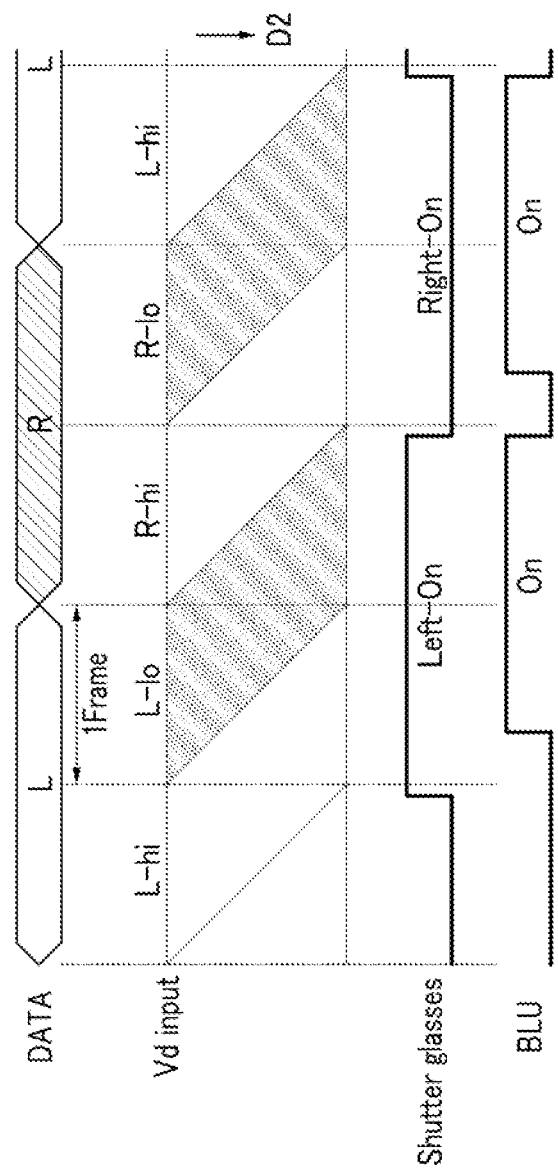

Referring to FIGS. 17 and 18, when the display device operates in a 3D mode, an integration controller 700 inputs a 3D enable signal 3D_en, which enables 3D mode operation, to the signal controller 600 and transfers the input image signal IDAT to the signal controller 600. In the 3D mode, the input image signal IDAT may be input at a predetermined image frequency. The image frequency is also referred to as an output frequency, and according to an embodiment, the image frequency is a frequency at which an image for an input image signal IDAT is displayed every two or more successive frames (referred to as a frame set). According to an embodiment, the image frequency may be 1/n (n is a natural number of 2 or more) of a frame frequency at which the data driver 500 outputs the data voltage Vd to the data lines D1 to Dm. For example, when the frame frequency is 120 Hz, the image frequency may be 60 Hz, and when the frame frequency is 240 Hz, the image frequency may be 60 Hz, 80 Hz, or 120 Hz. The input image signal IDAT may include a left eye input image signal and a right eye input image signal.

The signal controller 600 processes the input image signal IDAT to be suitable for an operational condition of the display panel 300 to generate an output image signal DAT. The output image signal DAT includes a left eye image signal L and a right eye image signal R, and the left eye image signal L and the right eye image signal R may be alternately output to the data driver 500. The data driver 500 generates a data voltage Vd based on the output image signal DAT for the pixels PX in one row and the gray voltage from the gray voltage generator 800.

One frame set during which data voltages Vd corresponding to successive left eye image signal L and right eye image signal R are inputted includes data voltages according to two or more gamma curves.

As shown in FIGS. 17 and 18, the left eye image signal L is converted into a first left eye data voltage L-hi according to the first gamma curve GH and a second left eye data voltage L-lo according to the second gamma curve GL, and the right eye image signal R is converted into a first right eye data voltage R-hi according to the first gamma curve GH and a second right eye data voltage R-lo according to the second gamma curve GL. The first gamma curve GH and the second gamma curve GL have different gamma values, respectively. Alternatively, each of the left eye image signal L and the right eye image signal R is converted into data voltages according to the first gamma curve GH, the second gamma curve GL, and the third gamma curve GM and is displayed during one frame set.

Each data voltage Vd may be inputted to the data lines D1-Dm of the display panel 300 at a predetermined frame frequency, and when each of the data voltages Vd is inputted to a corresponding pixel PX in a column direction D2 in sequence, an image frame (1 Frame) is displayed. A pixel PX to which the first left eye data voltage L-hi is inputted displays a first left eye image, a pixel PX to which the second left eye data voltage L-lo is inputted displays a second left eye image, a pixel PX to which the first right eye data voltage R-hi is inputted displays a first right eye image, and a pixel PX to which the second right eye data voltage R-lo is inputted displays a second right eye image.

The display order of the first left eye image and the second left eye image for the left eye image signal L and the display order of the first right eye image and the second right eye image for the right eye image signal R may be variously changed. FIGS. 17 and 18 show examples in which the application order of the gamma curves according to the left eye data voltages L-hi and L-lo for the left eye image signal L is the same or substantially the same as the application order of the gamma curves according to the right eye data voltages R-hi and R-lo for the right eye image signal R.

When the display device according to an exemplary embodiment of the present invention includes the backlight 900, a light emitting period ON of the backlight 900 may start a first time t1 after the second left eye data voltage L-lo or the second right eye data voltage R-lo is inputted to the pixel PX and may end a second time t2 after the input of the data voltage Vd is completed. According to an embodiment, the first time t1 and the second time t2 may be controlled according to a response speed of the display device.

Most of the light emitting period ON of the backlight 900 overlaps the input period of the second left eye data voltage L-lo or the second right eye data voltage R-lo. However, alternatively, according to the response speed of the display panel 300, the light emitting period ON of the backlight 900 may overlap the input period of the first left eye data voltage L-hi or the first right eye data voltage R-hi. Accordingly, since image according to the first gamma curve GH and the image according to the second gamma curve GL for each of the left eye image signal L and the right eye image signal R are successively shown, the lateral visibility of the 3D image may be increased.

However, according to an embodiment, the position and time of the light emitting period ON of the backlight 900 may be controlled according to the characteristics of the display panel 300, such as a response speed of the liquid crystal, a target crosstalk degree, target lateral visibility and target luminance.

According to an exemplary embodiment of the present invention, to increase visibility, a descending response speed of the liquid crystal molecules may be increased. For example, when a difference in luminance of an image between a high luminance level and a low luminance level is changed from 99% to 1%, the descending response speed of the liquid crystal molecules may be 4.17 ms or less when the frame frequency is 240 Hz and may be 8.3 ms or less when the frame frequency is 120 Hz.

When the 3D image conversion member 60 includes shutter glasses, at least a part of an open period Left-On of the left eye shutter of the shutter glasses may overlap the light emitting period ON of the backlight 900 corresponding to the period during which the second left eye image is displayed, and at least a part of an open period Right-On of the right eye shutter of the shutter glasses may overlap the light emitting period ON of the backlight 900 corresponding to the period during which the second right eye image is displayed. A start point of the open period Left-On or Right-On of the right eye shutter or the left eye shutter may be positioned at a third time t3 earlier than a start point of the corresponding light emitting period ON of the backlight 900, and an end point of the open period Left-On or Right-On of the right eye shutter or the left eye shutter may be positioned at a fourth time t4 later than an end point of the corresponding light emitting period ON of the backlight 900.

The left eye shutter is opened while the first left eye image and the second left eye image are displayed by the display panel 300 and the backlight 900, and the right eye shutter is opened while the first right eye image and the second right eye image are displayed by the display panel 300 and the backlight 900 so that the first and second left eye images and the first and second right eye images may be differentiated and recognized by the observer as the 3D image.

Figure 19:
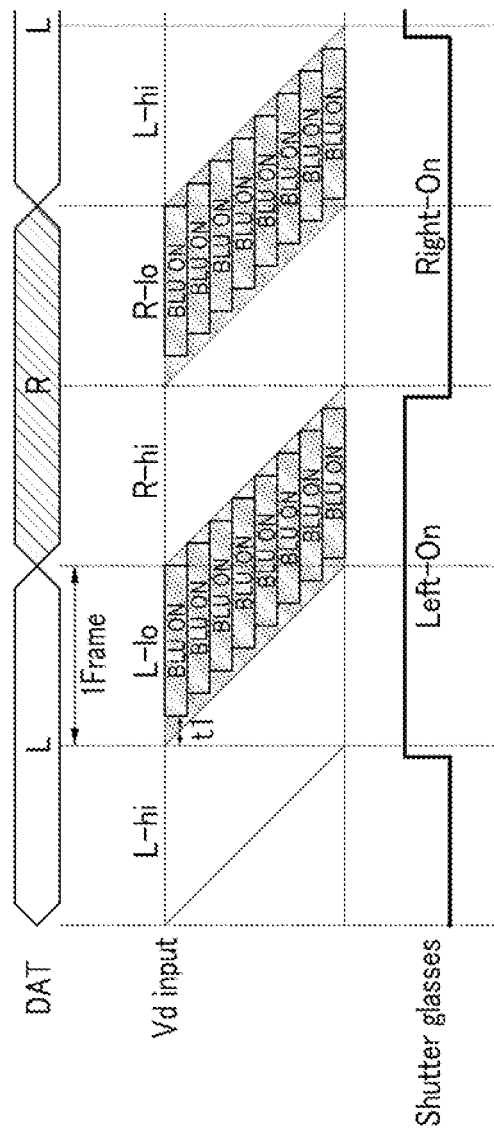
Figure 20:
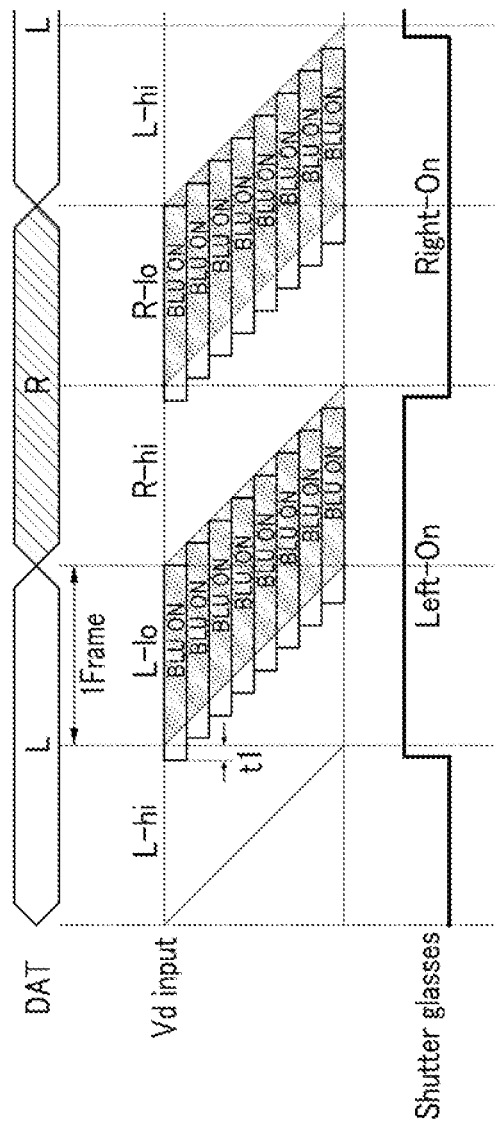

The display driving method described below in connection with FIGS. 19 and 20 is substantially the same as the display driving method described above in connection with FIGS. 17 and 18, except that the backlight 900 is divided into a plurality of blocks that may be turned on in sequence as the gate signal of the display panel 300 is scanned.

Referring to FIG. 19, each light emitting period ON of the backlight 900 may start the first time t1 after the second left eye data voltage L-lo or the second right eye data voltage R-lo is inputted to the corresponding pixel PX of the display panel 300 and may end in the second time t2 after the input of the data voltage Vd is completed. However, the light emitting period ON is not limited thereto and as shown in FIG. 20, a light emitting period ON of each block of the backlight 900 may at least partially overlap the input period of the first left eye data voltage L-hi or the first right eye data voltage R-hi. A distance between the start point of the light emitting period ON of the backlight 900 and the input start point of the second left eye data voltage L-lo or the second right eye data voltage R-lo may be the first time t1.

When the 3D image conversion member 60 includes the shutter glasses, the left shutter or the right shutter of the shutter glasses is opened during the open time Left-On or Right-On which overlaps the scanning time of the light emitting period ON of the backlight 900 to differentiate the first and second left eye images from the first and second right eye images.

According to an exemplary embodiment of the present invention, a plurality of frames during which successive left eye image signal L and right eye image signal R are displayed include two frames which successively display images according to the second gamma curve GL.

Figure 21:
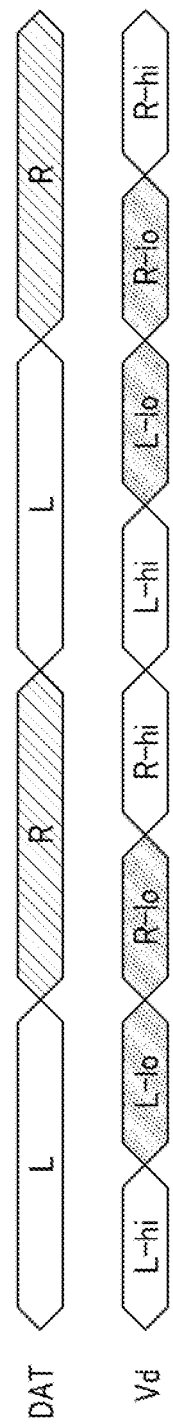
Figure 22:
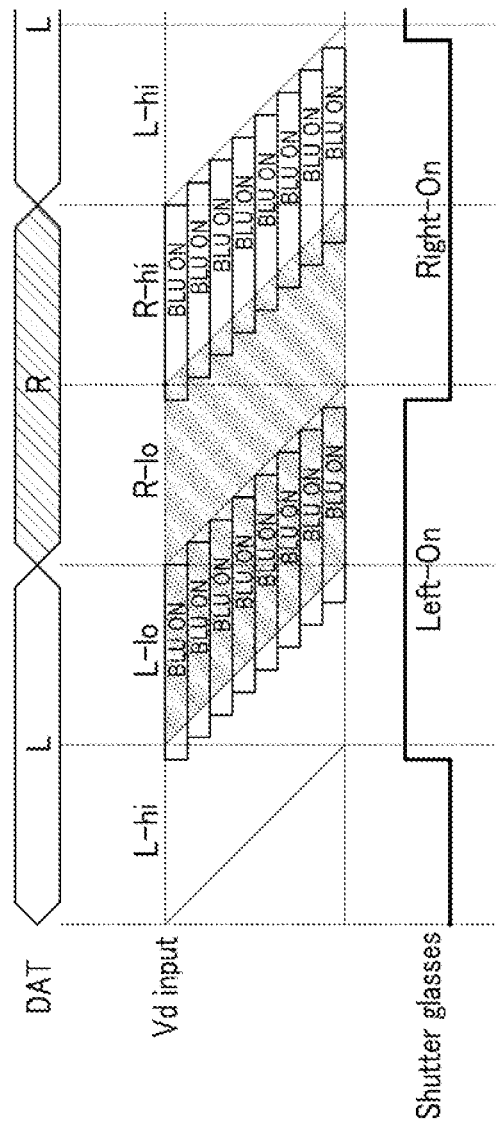

Referring to FIGS. 21 and 22, the application order of the gamma curves according to the left eye data voltages L-hi and L-lo for the left eye image signal L may be opposite to the application order of the gamma curves according to the right eye data voltages R-hi and R-lo for the right eye image signal R.

Referring to FIGS. 21 and 22, when the first left eye data voltage L-hi is first inputted and the second left eye data voltage L-lo is inputted later with respect to the left eye image signal L, the second right eye data voltage R-lo may be first inputted and the first right eye data voltage R-hi may be inputted with respect to the right eye image signal R. When the second left eye data voltage L-lo is first inputted and the first left eye data voltage L-hi is inputted with respect to the left eye image signal L, the first right eye data voltage R-hi may be first inputted and the second right eye data voltage R-lo may be inputted with respect to the right eye image signal R.

Figure 23:
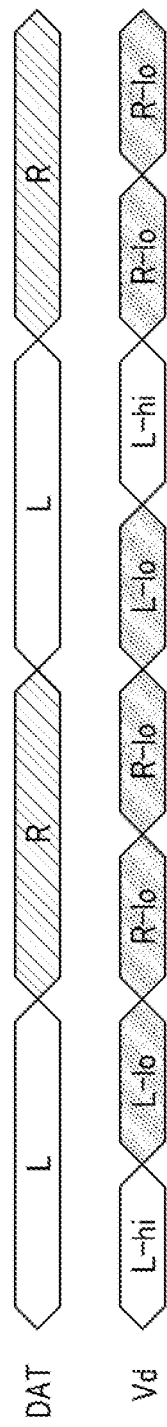
Figure 24:
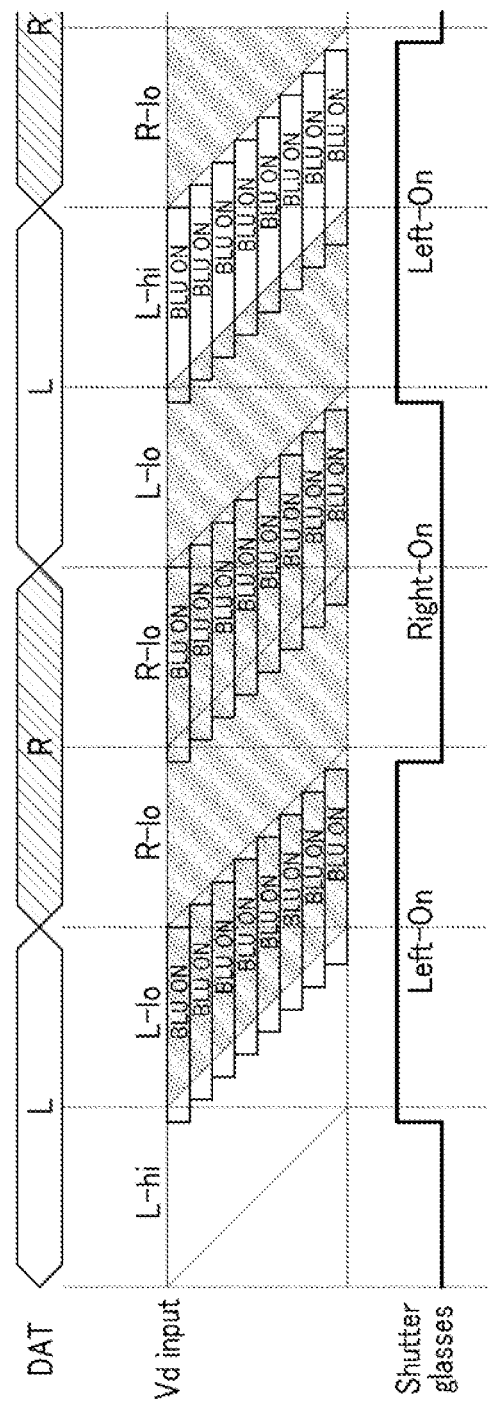

The input order of the first left eye data voltage L-hi and the second left eye data voltage L-lo for two adjacent left eye images L between which one right eye image signal R is positioned may be constant as shown in FIGS. 21 and 22 and may be reversed as shown in FIGS. 23 and 24. According to an embodiment, such input order may also apply to two adjacent right eye image signals R between which one left eye image signal L is positioned. For example, according to an embodiment, the input order of the first right eye data voltage R-hi and the second right eye data voltage R-lo for the two adjacent right eye images L between which one left eye image signal L is positioned may be constant or may be reversed.

The light emitting period ON of the backlight 900 may substantially overlap a second left eye image display period for the left eye image signal L and may substantially overlap a first right eye image display period for the right eye image signal R. The image according to the second gamma curve GL may be mostly recognized with respect to the left eye image signal L, and the image according to the first gamma curve GH may be mostly recognized with respect to the right eye image signal R. Accordingly, the observer's left and right eyes respectively recognize the images according to different gamma characteristics, which may be prevented by separately preparing for the left eye gamma curve and the right eye gamma curve. For example, the first gamma curve GH may include a first left eye gamma curve and a first right eye gamma curve different from each other, and the second gamma curve GL may include a second left eye gamma curve and a second right eye gamma curve different from each other. According to an embodiment, the characteristics of the second left eye gamma curve may be similar to the characteristics of the first right eye gamma curve, and the characteristics of the first left eye gamma curve may be similar to the characteristics of the second right eye gamma curve.

Referring to FIGS. 23 and 24, the data voltage Vd according to the second gamma curve GL may be inputted to the display panel 300 during at least three frames of two successive frame sets during which two successive left eye image signal L and right eye image signal R are displayed. According to an embodiment, the data voltages Vd according to the second gamma curve GL may be input at different timings from each other in each frame set. According to an exemplary embodiment, a plurality of frames during which display for the successive left eye image signal L and right eye image signal R is performed include two frames during which the images according to the second gamma curve GL are successively displayed.

Referring to FIGS. 23 and 24, when the first left eye data voltage L-hi and the second left eye data voltage L-lo are inputted during two successive frames for the left eye image signal L, the second right eye data voltage R-lo may be inputted during two successive frames for the right eye image signal R. The input orders of the first left eye data voltage L-hi and the second left eye data voltage L-lo for the adjacent left eye image signals L may be different from each other. Similarly, when the second left eye data voltage L-lo is inputted during two successive frames of the left eye image signal L, the first right eye data voltage R-hi and the second right eye data voltage R-lo may be successively inputted with respect to the right eye image signal R. The input orders of the first right eye data voltage R-hi and the second right eye data voltage R-lo for the adjacent right eye image signals R may be different from each other.

The first left eye image, the second left eye image, the second right eye image and the second right eye image are successively inputted with respect to first successive left eye image signal L and right eye image signal R, the second left eye image, the first left eye image, the second right eye image and the second right eye image are successively inputted with respect to the next successive left image signal L and right eye image signal R, and the second left eye image, the first left eye image and the second right eye image are successively inputted with respect to the next successive left image signal L and right eye image signal R, and the second left eye image, the second left eye image, the second right eye image and the first right eye image are successively inputted with respect to the next successive left image signal L and right eye image signal R, and then the process may be continuously repeated.

According to an exemplary embodiment, during two successive frame sets, a ratio of the number of times in which the data voltage Vd according to the first gamma curve GH is input to the number of times in which the data voltage Vd according to the second gamma curve GL is input is approximately 1:3, and as a result, the image according to the second gamma curve GL may be more recognized. Accordingly, lateral visibility of the 3D mode may be increased. In an exemplary embodiment, to prevent a flicker, a frame frequency of 480 Hz or more may be applied.

A method of driving a display device according to an exemplary embodiment of the present invention will be described with reference to FIGS. 25 to 35.

Figure 25:
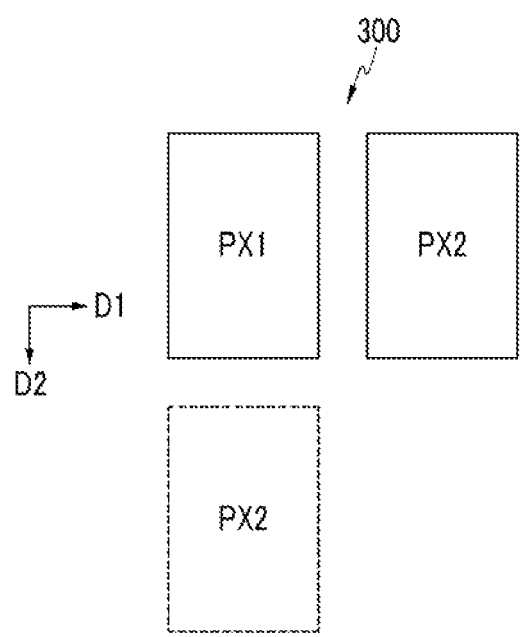
FIG. 25 is a layout view schematically illustrating a pixel included in a display device according to an exemplary embodiment of the present invention.

FIG. 25 is a layout view schematically illustrating a pixel included in a display device according to an exemplary embodiment of the present invention, and FIGS. 26 to 35 are timing diagrams illustrating methods of driving a display device that can display a 3D image according to exemplary embodiments of the present invention.

Referring to FIG. 25, a display panel 300 of the display device according to an exemplary embodiment of the present invention includes a plurality of pixels PX, and the plurality of pixels PX include a first pixel PX1 and a second pixel PX2 which are adjacent to each other in a row direction D1 or a column direction D2.

Referring to FIGS. 26 to 35, When data voltages Vd according to different gamma curves are inputted for two successive frame sets, a gamma curve which is applied to the data voltage Vd inputted to the first pixel PX1 and a gamma curve which is applied to the data voltage Vd inputted to the second pixel PX2 may be different from each other. According to an embodiment, when the data voltage Vd inputted to the first pixel PX1 is based on the first gamma curve GH, the data voltage Vd inputted to the second pixel PX2 may be based on the second gamma curve GL. Alternatively, when the data voltage Vd inputted to the first pixel PX1 is based on the second gamma curve GL, the data voltage Vd inputted to the second pixel PX2 may be based on the first gamma curve GH. Accordingly, a fault in display, such as a flicker, which is caused due to a difference in luminance, may be removed.

Figure 26:
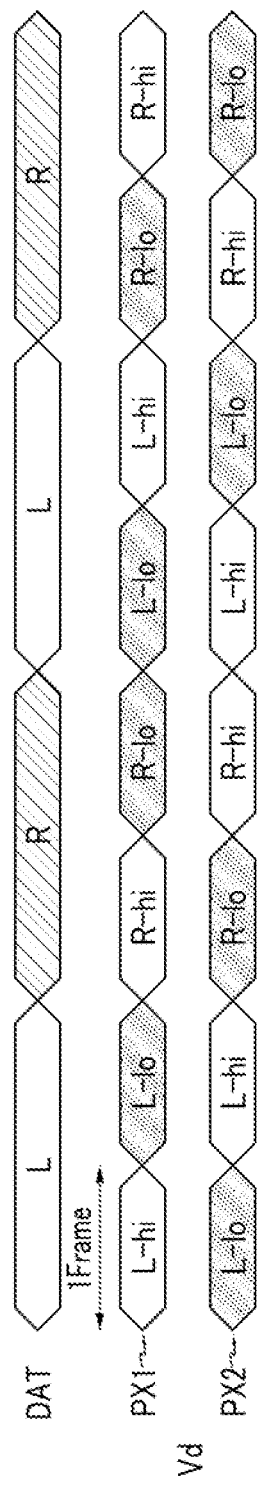
FIGS. 26 to 35 are timing diagrams each illustrating a method of driving a display device that displays a 3D image according to an exemplary embodiment of the present invention.
Figure 27:
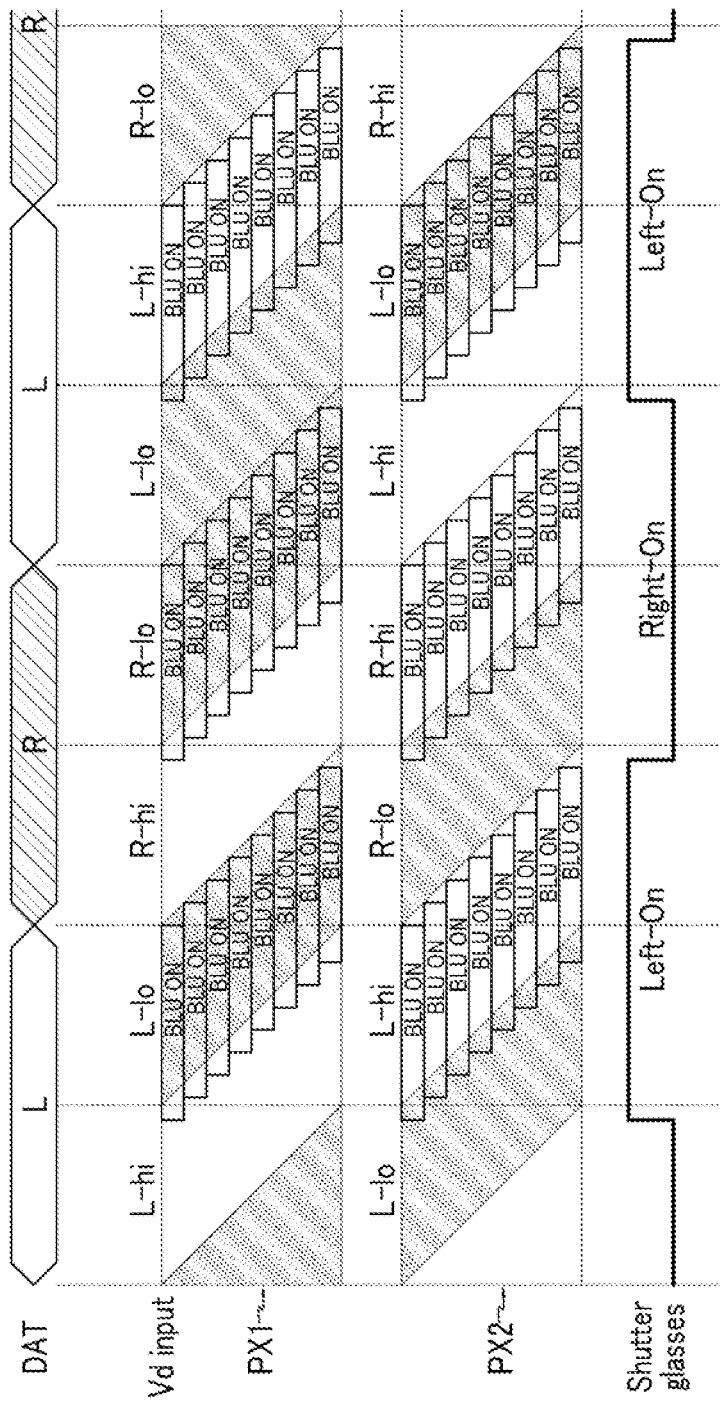

The display driving method described below in connection with FIGS. 26 and 27 is substantially the same as the display driving method described above in connection with FIGS. 17 to 20 except that, in one pixel PX1 and PX2, when the gamma curves may be applied to two successive left eye image signal L and right eye image signal R in the order of the first gamma curve GH, the second gamma curve GL, the first gamma curve GH and the second gamma curve GL, the gamma curves may be applied to the next two successive left eye image signal L and right eye image signal R in the order of the second gamma curve GL, the first gamma curve GH, the second gamma curve GL and the first gamma curve GH. Accordingly, when the light emitting period ON of the backlight 900 mostly overlaps a display period of the last frame of each frame set, the second left eye data voltage L-lo and the second right eye data voltage R-lo according to the second gamma curve GL are recognized, and the first left eye data voltage L-hi and the first right eye data voltage R-hi according to the first gamma curve GH may be then recognized, such that lateral visibility for one pixel PX1 and PX2 may be increased.

Figure 28:
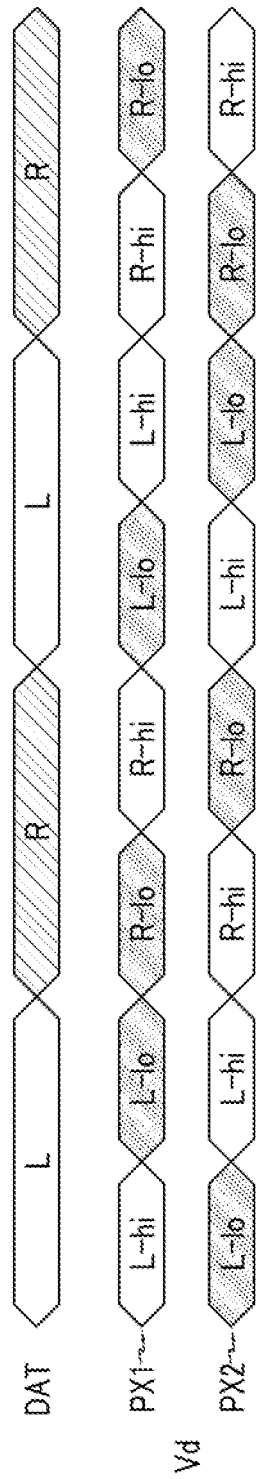
Figure 29:
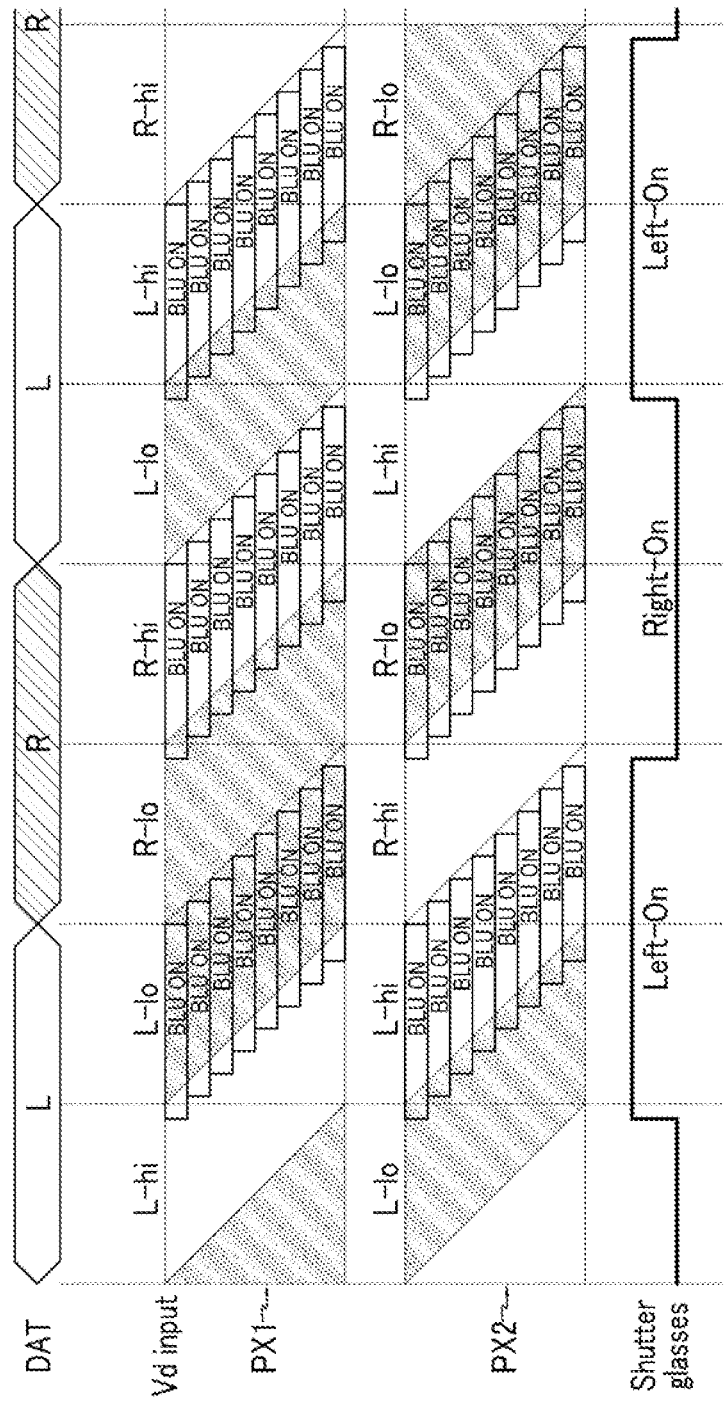

The display driving method described below in connection with FIGS. 28 and 29 is substantially the same as the display driving method described above in connection with FIGS. 21 and 22 except that, in one pixel PX1 and PX2, when the gamma curves may be applied to two successive left eye image signal L and right eye image signal R in the order of the first gamma curve GH, the second gamma curve GL, the second gamma curve GL and the first gamma curve GH, the gamma curves may be applied to the next two successive left eye image signal L and right eye image signal R in the order of the second gamma curve GL, the first gamma curve GH, the first gamma curve GH and the second gamma curve GL. Accordingly, when the light emitting period ON of the backlight 900 mostly overlaps a display period of the last frame of each frame set, the data voltages L-hi and R-hi according to the first gamma curve GH and the data voltages L-lo and R-lo according to the second gamma curve GL may be successively displayed with respect to both the left eye image signal L and the right eye image signal R, such that lateral visibility of the 3D image for one pixel PX1 and PX2 may be increased. The same first gamma curve GH and second gamma curve GL may be applied to the left eye image signal L and the right eye image signal R.

Figure 30:
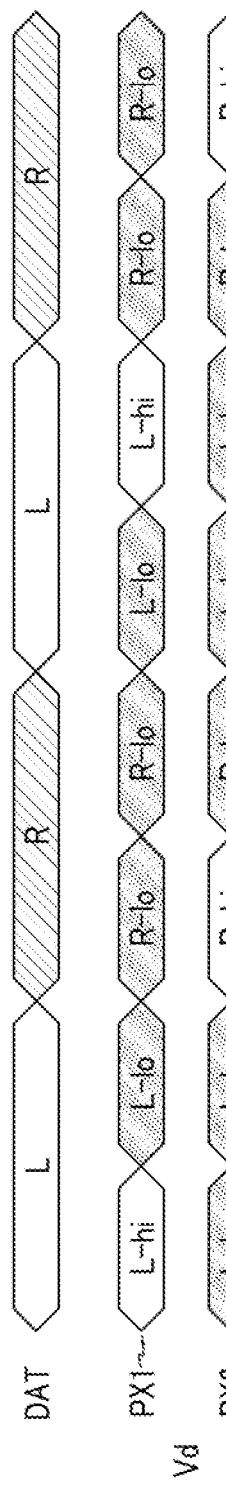
Figure 31:
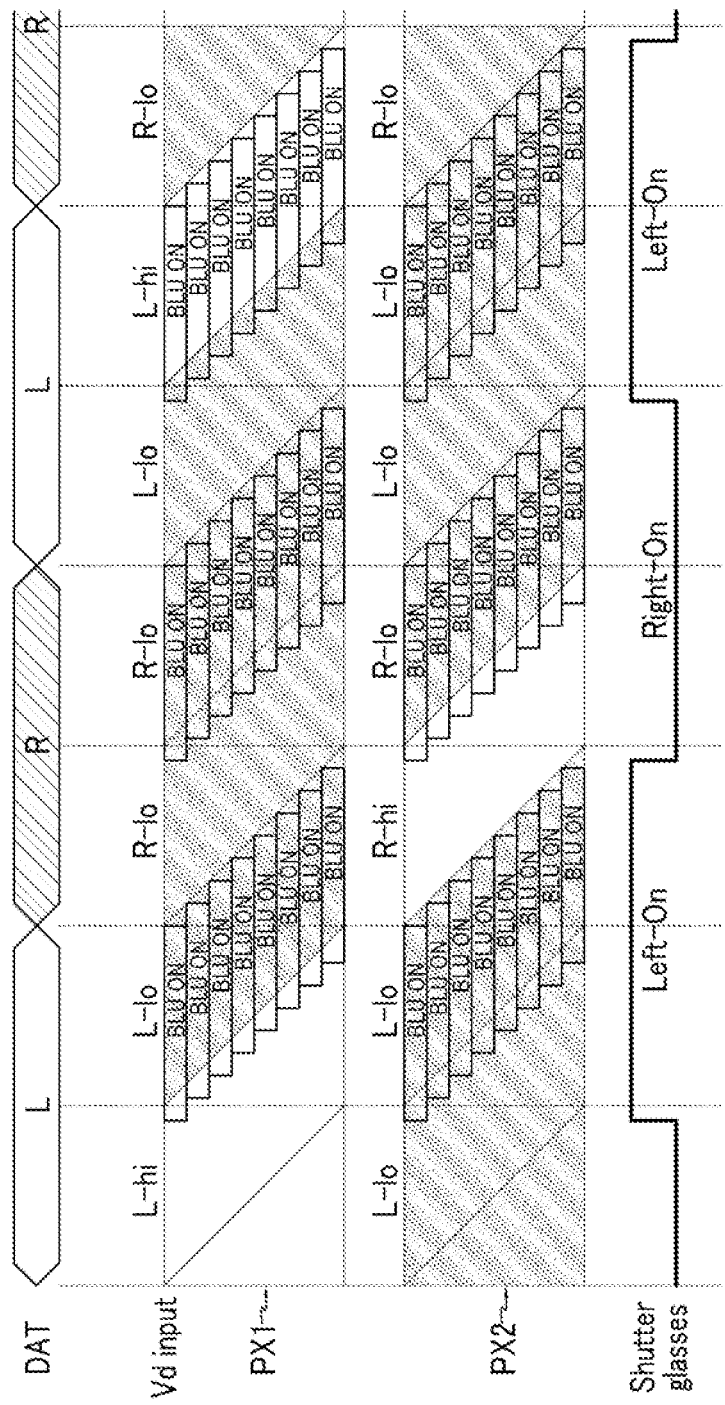

The driving method described below in connection with FIGS. 30 and 31 is substantially the same as the driving method described above in connection with FIGS. 23 and 24 except that, with respect to two successive left eye image signal L and right eye image signal R, the order in which the first gamma curve GH and the second gamma curve GL according to the data voltage Vd inputted to the first pixel PX1 are applied may be different from the order in which the first gamma curve GH and the second gamma curve GL according to the data voltage Vd inputted to the second pixel PX2 are applied. When the first pixel PX1 displays the first left eye image according to the first gamma curve GH, the second pixel PX2 may display the second left eye image according to the second gamma curve GL and vice versa.

Figure 32:
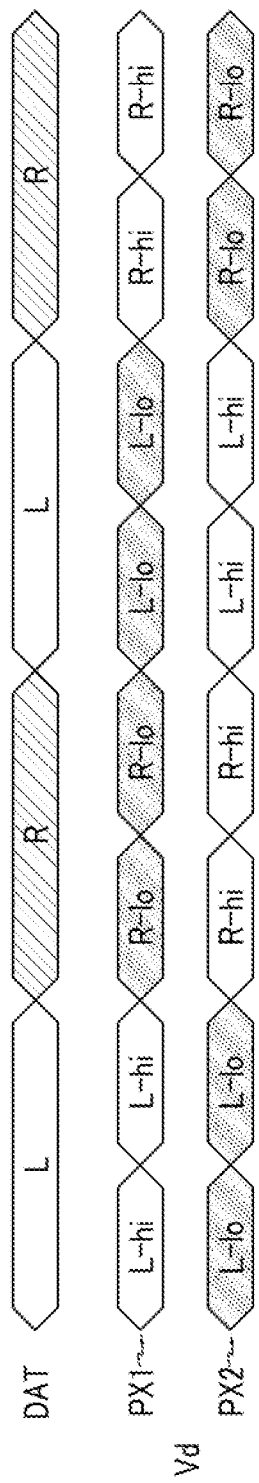
Figure 33:
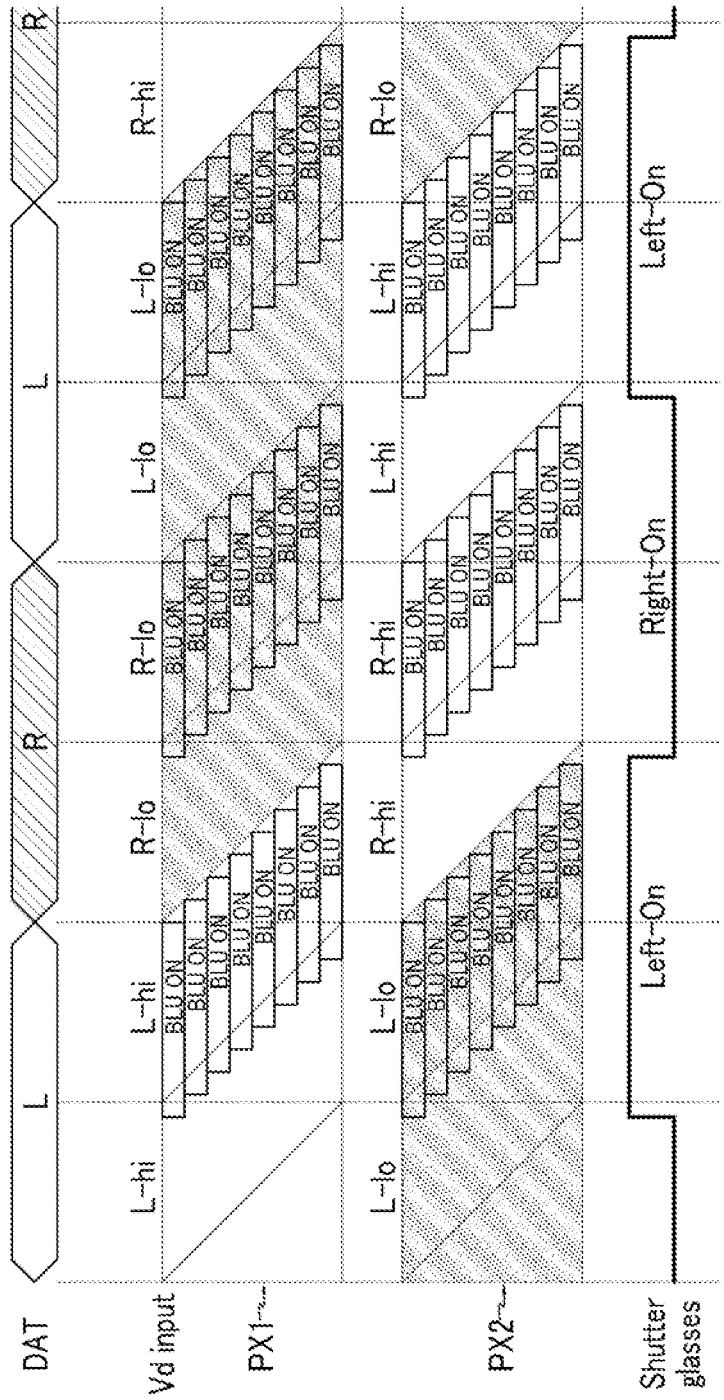

Referring to FIGS. 32 and 33, the data voltages Vd for the two successive left eye image signal L and right eye image signal R are based on the first gamma curve GH and the second gamma curve G, but the data voltage Vd inputted to the display panel 300 may be based on the same gamma curve for one frame set. The order in which the gamma curves are applied during two frame sets may be opposite to the order in which the gamma curves are applied during next two frame sets.

For example, after the first left eye data voltage L-hi is successively inputted during two frames and the second right eye data voltage R-lo is successively inputted during two frames with respect to two successive left eye image signal L and right eye image signal R, the second left eye data voltage L-lo is successively inputted during two frames and the first right eye data voltage R-hi is successively inputted during two frames with respect to the next two successive left eye image signal L and right eye image signal R. Accordingly, since the successive left eye image signal L is converted into the data voltage Vd according to different gamma curves and is displayed, and the successive right eye image signal R is converted into the data voltage Vd according to different gamma curves and is displayed, lateral visibility of the 3D image may be further increased.

Figure 34:
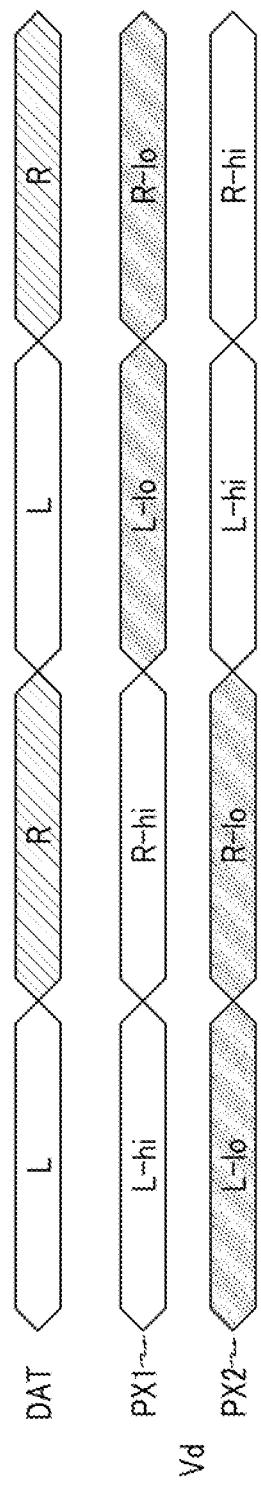
Figure 35:
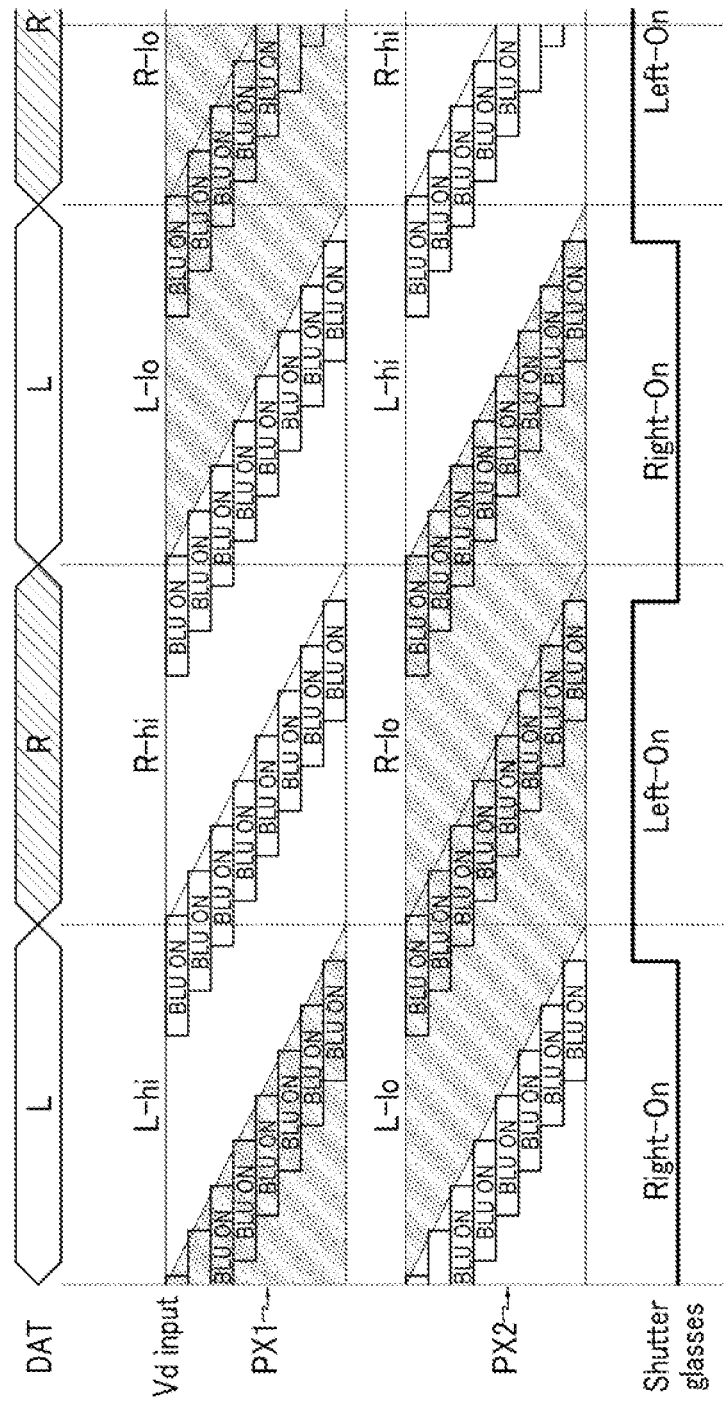

Referring to FIGS. 34 and 35, in the driving method according to an exemplary embodiment, one gamma curve may be applied during one frame set when an image for the left eye image signal L or the right eye image signal R is displayed, and the one frame set may include only one frame. According to an embodiment, the same gamma curve may be applied to the two successive left eye image signal L and right eye image signal R.

In one pixel PX1 and PX2, after the first left eye image data voltage L-hi is inputted to the display panel 300 with respect to one left eye image signal L, and the first right eye image data voltage R-hi is inputted with respect to the right eye image signal R, the second left eye image data voltage L-lo may be inputted with respect to the next left eye image signal L, and the second right eye image data voltage R-lo may be inputted with respect to the right eye image signal R in sequence. According to an embodiment, the gamma curves applied to two adjacent pixels PX1 and PX2 are different from each other.

In an exemplary embodiment, the light emitting period ON of the backlight 900 may overlap a part of the latter half of the input period of each data voltage Vd and may overlap the first part of the input period of the data voltage Vd of the next frame.

A method of driving a display device including the pixels PX1 and PX2 shown in FIG. 25 according to an exemplary embodiment of the present invention will be described with reference to FIGS. 36 to 47, In FIGS. 36 to 47, 'H' represents an image according to a first gamma curve GH, 'L' represents a second image according to a second gamma curve GL, and 'M' represents a third image according to a third gamma curve GM.

FIGS. 36 to 47 are diagrams illustrating luminance levels shown in frame sequence according to gamma curves which are applied to a pixel of a display device according to an exemplary embodiment of the present invention.

The first pixel PX1 and the second pixel PX2 of the display device according to an exemplary embodiment of the present invention are adjacent to each other in a row direction or in a column direction. The first pixel PX1 and the second pixel PX2 alternately display images corresponding to a left eye image signal L and a right eye image signal R, with two or more successive frames included in one frame set. For example, FIGS. 36 to 47 show four frame sets, and each of the four frame set may include two successive frames 1F-2F, 3F-4F, 5F-6F, and 7F-8F.

The first and second subpixels PXa and PXb included in one pixel PX1 or PX2 may display images according to different gamma curves or according the same gamma curve. According to an embodiment, various gamma curves, for example, the gamma curves shown in FIG. 5 or 6, may be used. For purposes of description, the gamma curves shown in FIGS. 5 and 6 are used.

Figure 36:
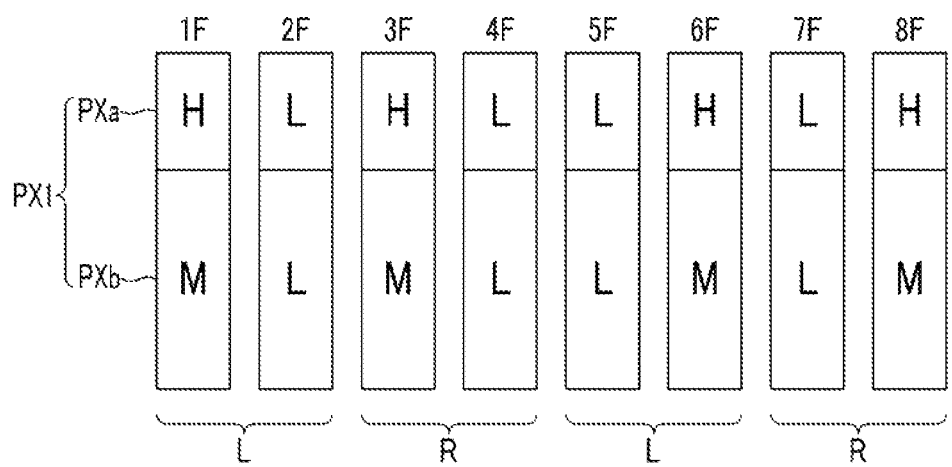
FIGS. 36 to 47, respectively, are diagrams illustrating luminance levels shown in frame sequence according to gamma curves which are applied to a pixel of a display device according to an exemplary embodiment of the present invention.
Figure 36:
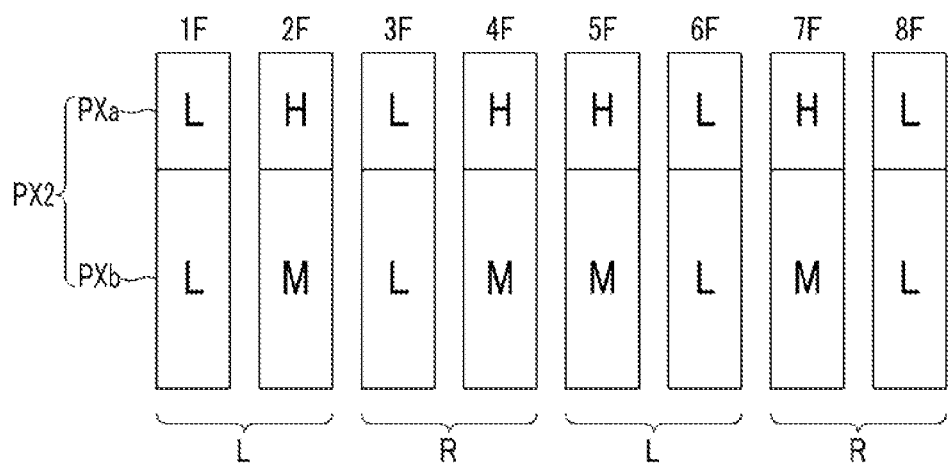

Referring to FIG. 36, during one of the two frames included in one frame set 1F and 2F, the first subpixel PXa of the first pixel PX1 displays a first image H according to the first gamma curve GH, and the second subpixel PXb may display a third image M according to the third gamma curve GM, and during the other frame in the frame set 1F and 2F, the first subpixel PXa of the first pixel PX1 may display a second image L according to the second gamma curve GL, and the second subpixel PXb may display the second image L. In the next frame set 3F and 4F, images may be displayed as in the frame set 1F and 2F, and in two subsequent frame sets 5F-8F, images according to the gamma curves may be displayed in the opposite order to the order in which the images are displayed during the two frame sets 1F-4F.

According to an embodiment, the second pixel PX2 may display images according to a gamma curve which is different from a gamma curve that applies to the first pixel PX1. For example, according to an embodiment, in each frame set, the order in which the images are displayed by the second pixel PX2 according to the frame of the gamma curve may be opposite to the order in which the images are displayed by the first pixel PX1 according to the frame of the gamma curve. According to an embodiment, the same may also apply to the embodiments described below in connection with FIGS. 37 to 47.

Figure 37:
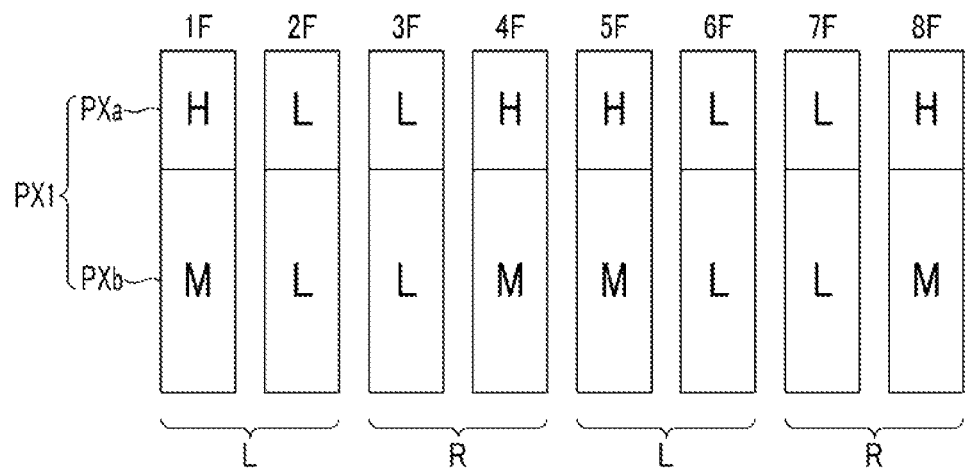
Figure 37:
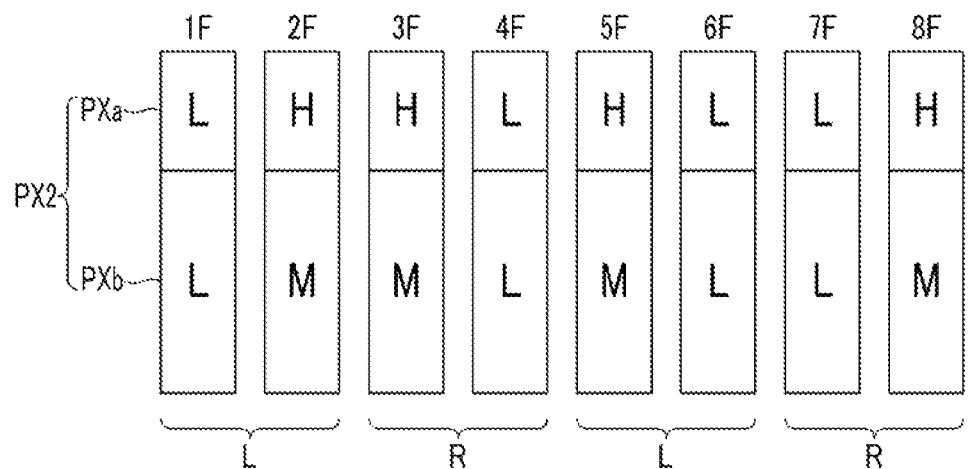

Referring to FIG. 37, when during the first frame of the one frame set 1F and 2F, the first subpixel PXa of the first pixel PX1 displays the first image H, and the second subpixel PXb displays the third image M, and during the second frame of the frame set 1F and 2F, the first subpixel PXa and the second subpixel PXb of the first pixel PX1 display the second image L, during the first frame of the next frame set 3F and 4F, the first subpixel PXa and the second subpixel PXb of the first pixel PX1 may display the second image L, and during the second frame of the frame set 3F and 4F, the first subpixel PXa of the first pixel PX1 may display the first image H, and the second subpixel PXb may display the third image M. In two subsequent frame sets 5F-8F, images may be displayed with the gamma curves applied in an opposite order to the orders that are applied during the two previous frames sets 1F-4F.

According to an exemplary embodiment, since the second image L having low luminance may be displayed in the successive frames and the first image H having high luminance may be displayed in the successive frames, a slow response speed of the liquid crystal molecules may be compensated, such that the lateral visibility may be further increased.

Figure 38:
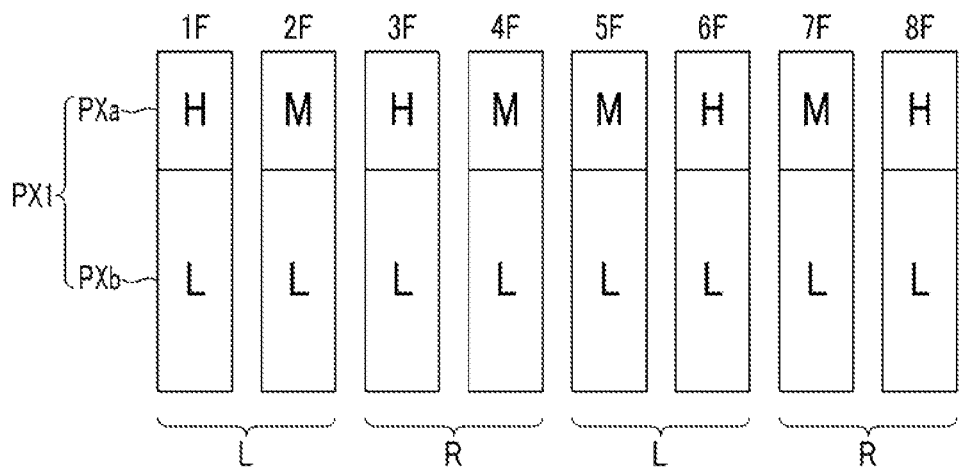
Figure 38:
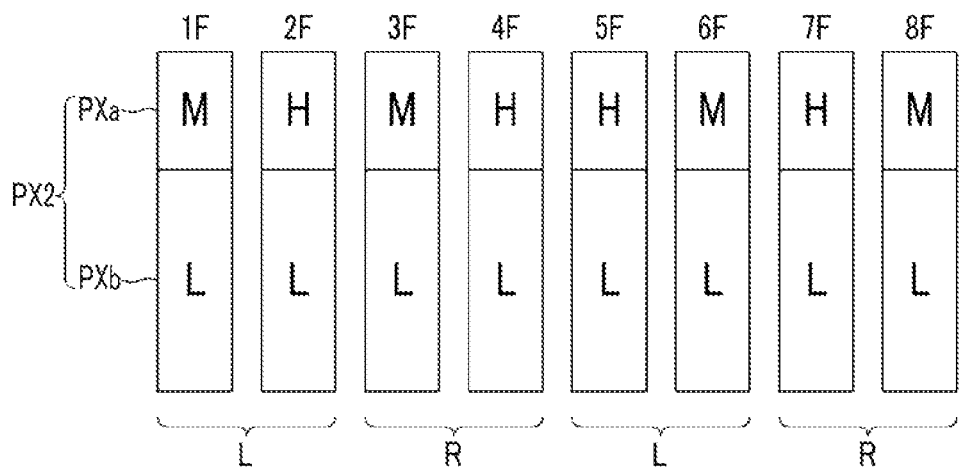
Figure 39:
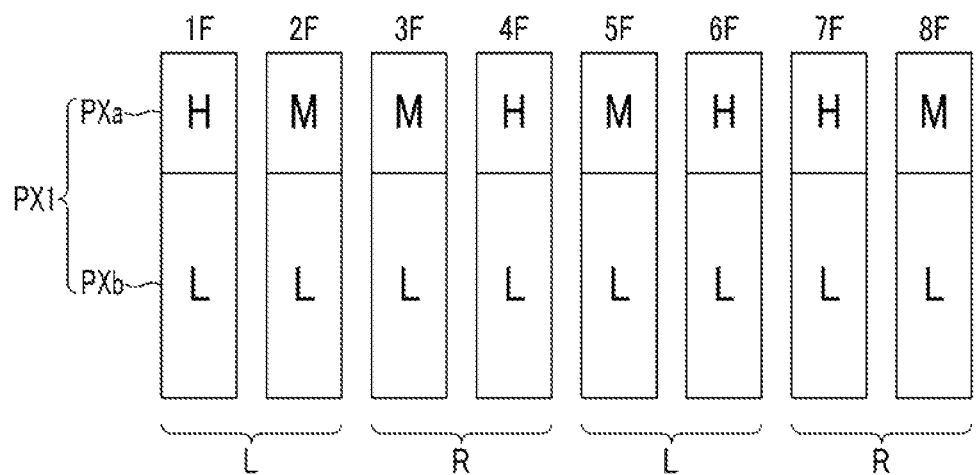
Figure 39:
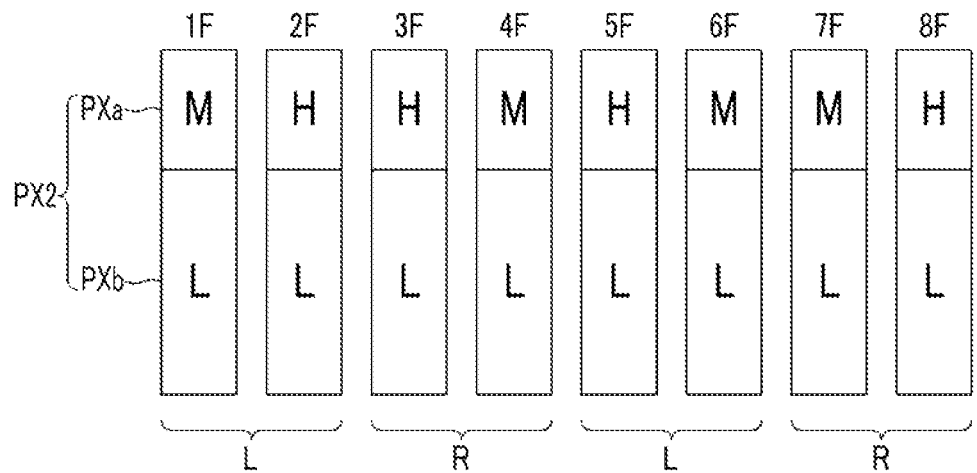

Referring to FIGS. 38 and 39, during one of the two frames included in one frame set, the first subpixel PXa of each pixel PX1 or PX2 displays the first image H, and the second subpixel PXb of the pixel PX1 or PX2 may display the second image L, and during the other of the frames in the frame set, the first subpixel PXa may display the third image M, and the second subpixel PXb may display the second image L. FIG. 38 shows an example in which the orders of applying the gamma curves to a pair of left eye image signal L and right eye image signal R during two adjacent frame sets, respectively, are the same as each other, and FIG. 39 shows an example in which the orders of applying the gamma curves to a pair of left eye image signal L and right eye image signal R during two adjacent frame sets, respectively, are opposite to each other.

According to an exemplary embodiment, during the two frame sets 5F-8F after the two first frame sets 1F-4F, images may be displayed with the gamma curves applied in an opposite order to the orders that are applied during the previous two frame sets 1F-4F. However, according to an exemplary embodiment, as shown in FIG. 39, the third frame set 5F and 6F is the same in order of application of the gamma curves as the second frame set 3F and 4F, and the fourth frame set 7F and 8F may be the same in order of application of the gamma curves as the first frame set 1F and 2F.

According to an exemplary embodiment, as shown in FIG. 39, since the third image M having relatively low luminance may be displayed in the successive frames and the first image H having relatively high luminance may be displayed in the successive frames, a slow response speed of the liquid crystal molecules may be compensated, such that the lateral visibility may be further increased.

Figure 40:
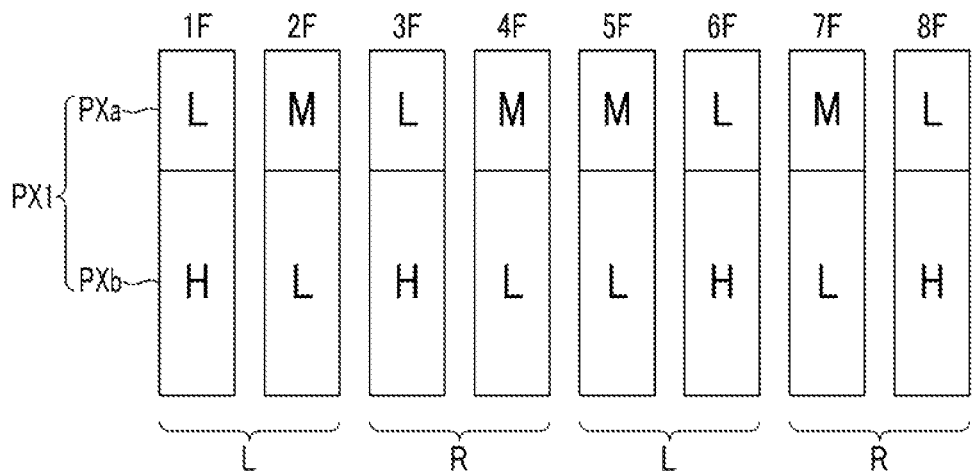
Figure 40:
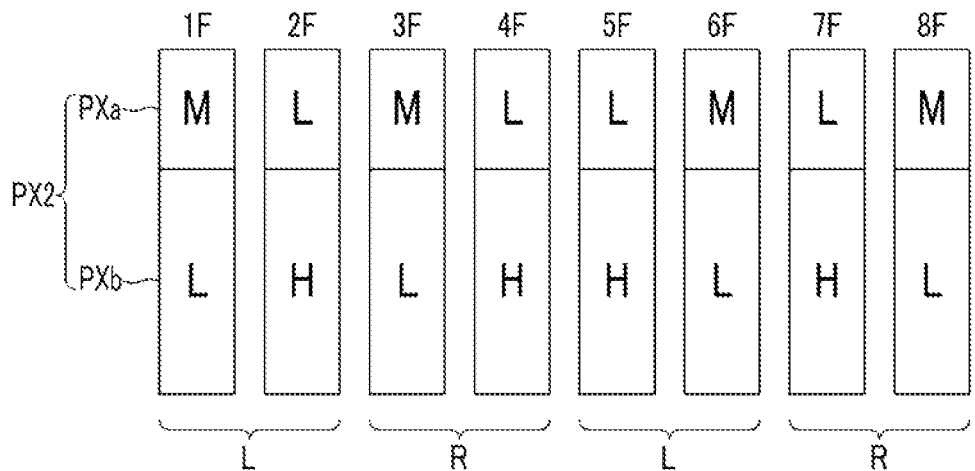
Figure 41:
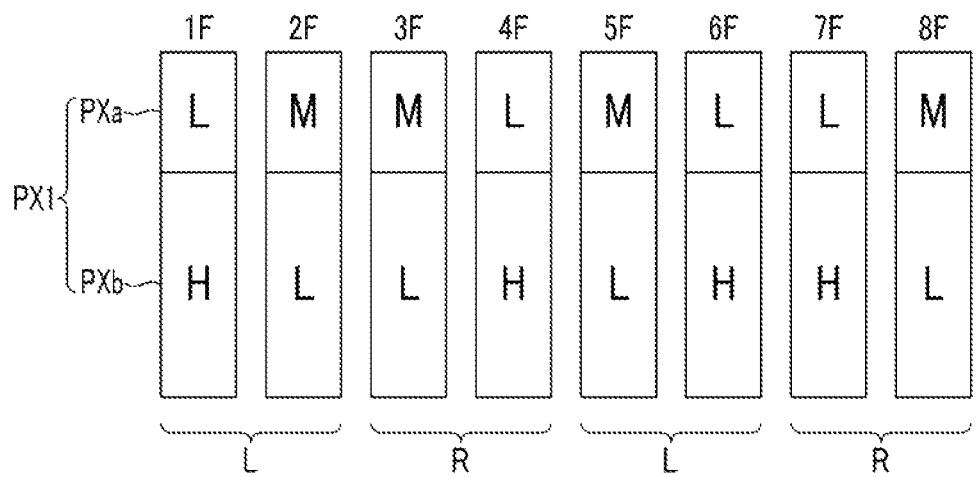
Figure 41:
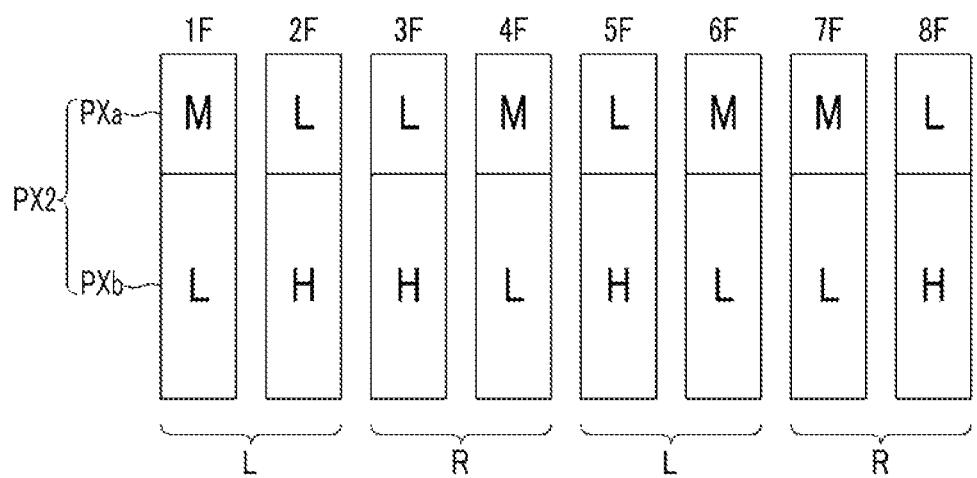

Referring to FIGS. 40 and 41, during one of the two frames included in one frame set, the first subpixel PXa of each pixel PX1 or PX2 displays the second image L, the second subpixel PXb of the pixel PX1 or PX2 may display the first image H, and the first subpixel PXa during the rest of the two frames may display the third image M, and the second subpixel PXb may display the second image L. FIG. 40 shows an example in which the orders of applying the gamma curves to two adjacent frame sets are the same as each other, and FIG. 41 shows an example in which the orders of applying the gamma curves to two adjacent frame sets are opposite to each other.

According to an exemplary embodiment, during the two frame sets 5F-8F after the two first frame sets 1F-4F, images may be displayed with the gamma curves applied in an opposite order to the orders applied during the two previous frame sets 1F-4F. However, according to an exemplary embodiment, as shown in FIG. 41, the third frame set 5F and 6F is the same in order of application of the gamma curves as the second frame set 3F and 4F, and the fourth frame set 7F and 8F may be the same in order of application of the gamma curves as the first frame set 1F and 2F.

Figure 42:
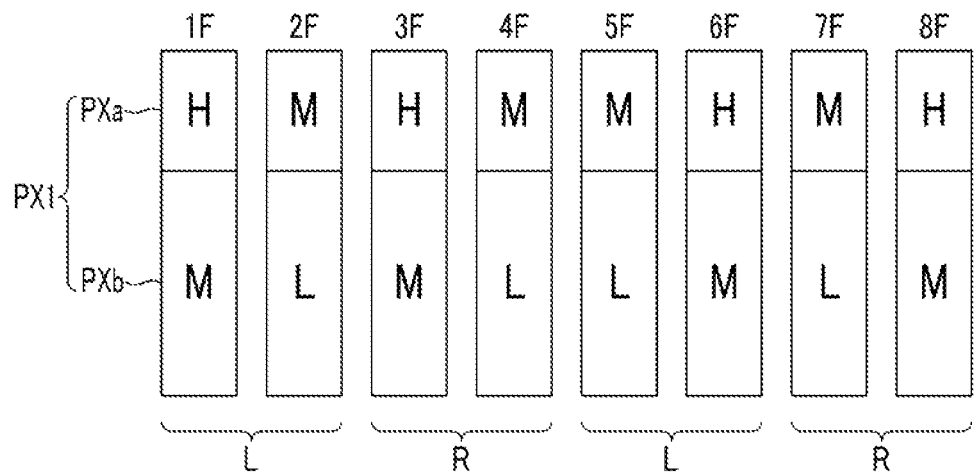
Figure 42:
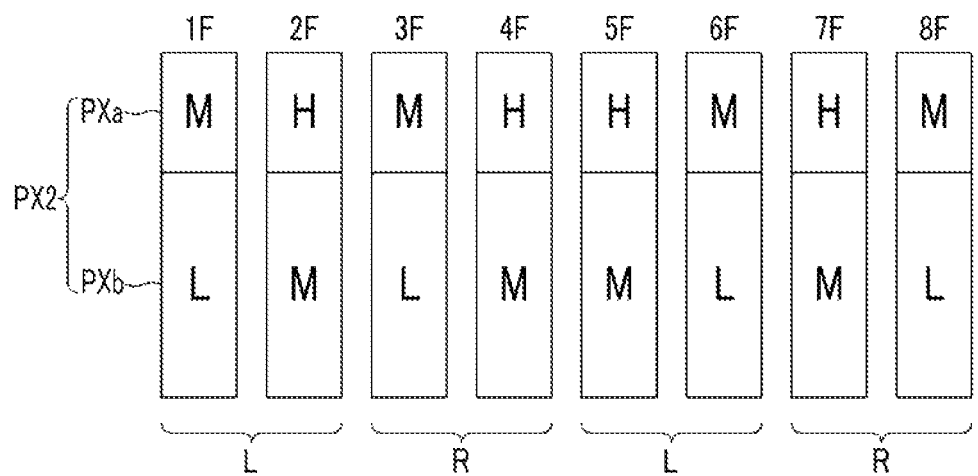
Figure 43:
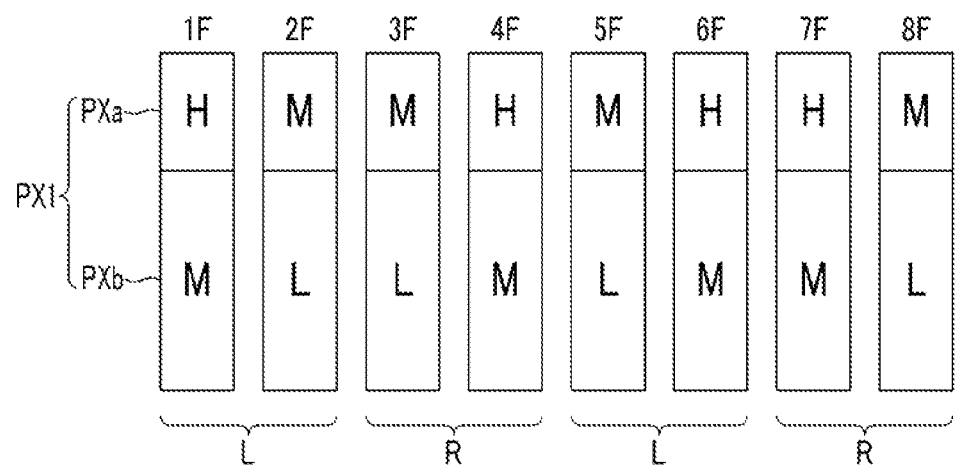
Figure 43:
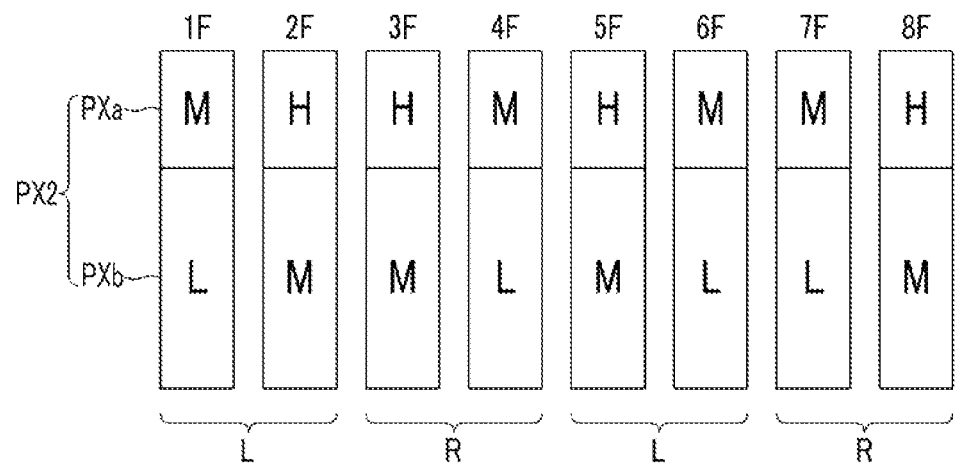

Referring to FIGS. 42 and 43, during one of the two frames included in one frame set, the first subpixel PXa of each pixel PX1 or PX2 displays the first image H, and the second subpixel PXb may display the third image M, and during the rest of the two frames, the first subpixel PXa may display the third image M, and the second subpixel PXb may display the second image L. FIG. 42 shows an example in which the orders of applying the gamma curve to a pair of left eye image signal L and right eye image signal R in two adjacent frame sets are the same as each other, and FIG. 43 shows an example in which the orders of applying the gamma curve to a pair of left eye image signal L and right eye image signal R in two adjacent frame sets are opposite to each other.

According to an exemplary embodiment, during the two frame sets 5F-8F after the two first frame sets 1F-4F, images may be displayed with the gamma curve applied in an opposite order to the orders applied during the two previous frame sets 1F-4F. However, according to an exemplary embodiment, as shown in FIG. 43, the third frame set 5F and 6F is the same in order of application of the gamma curves as the second frame set 3F and 4F, and the fourth frame set 7F and 8F may be the same in order of application of the gamma curves as the first frame set 1F and 2F.

Figure 44:
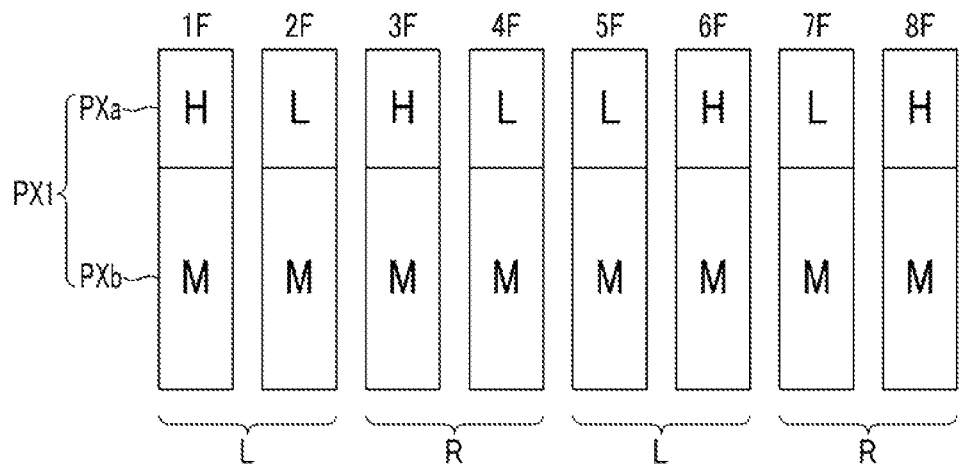
Figure 44:
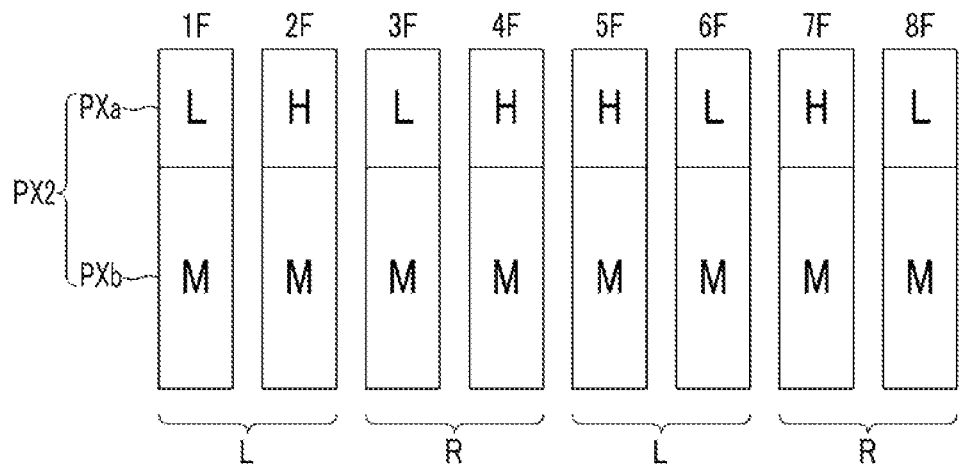
Figure 45:
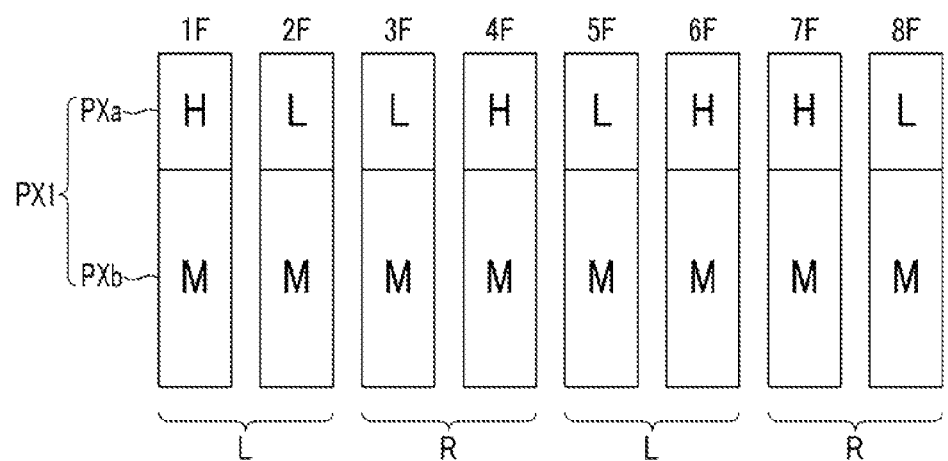
Figure 45:
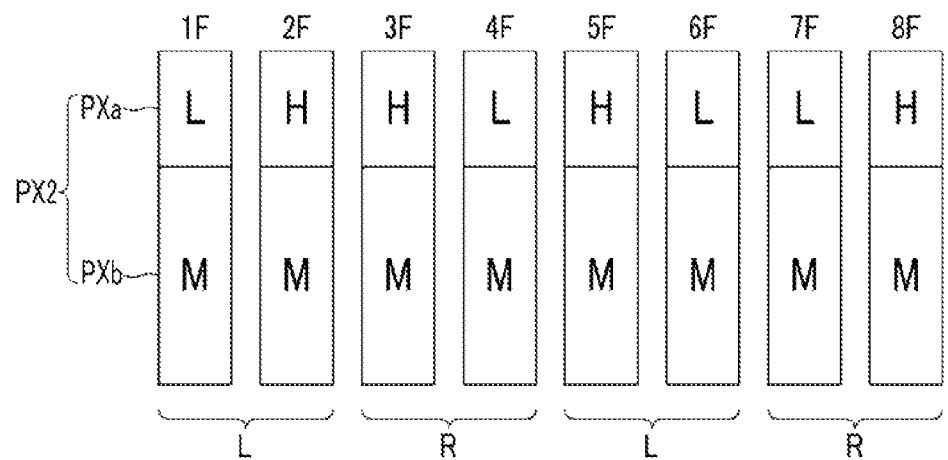

Referring to FIGS. 44 and 45, during one of the two frames included in one frame set, the first subpixel PXa of each pixel PX1 or PX2 displays the first image H, and the second subpixel PXb may display the third image M, and during the rest of the two frames, the first subpixel PXa may display the second image L, and the second subpixel PXb may display the third image M. FIG. 44 shows an example in which the orders of applying the gamma curve to a pair of left eye image signal L and right eye image signal R in two adjacent frame sets are the same as each other, and FIG. 45 shows an example in which the orders of applying the gamma curve to a pair of left eye image signal L and right eye image signal R during two adjacent frame sets are opposite to each other.

According to exemplary embodiment, during the two frame sets 5F-8F after the two first frame sets 1F-4F, images may be displayed with the gamma curve applied in an opposite order to the orders applied during the two previous frame sets 1F-4F. However, according to an exemplary embodiment, as shown in FIG. 45, the third frame set 5F and 6F is the same in order of application of the gamma curves as the second frame set 3F and 4F, and the fourth frame set 7F and 8F may be the same in order of application of the gamma curves as the first frame set 1F and 2F.

Figure 46:
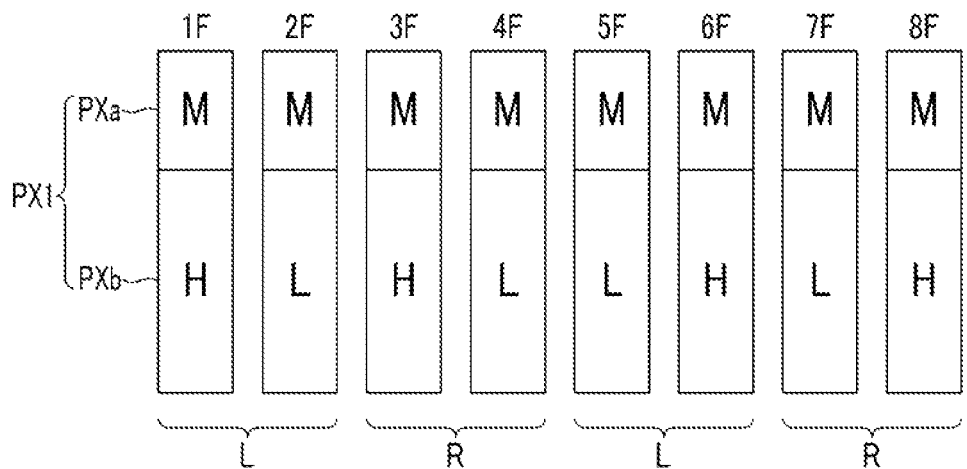
Figure 46:
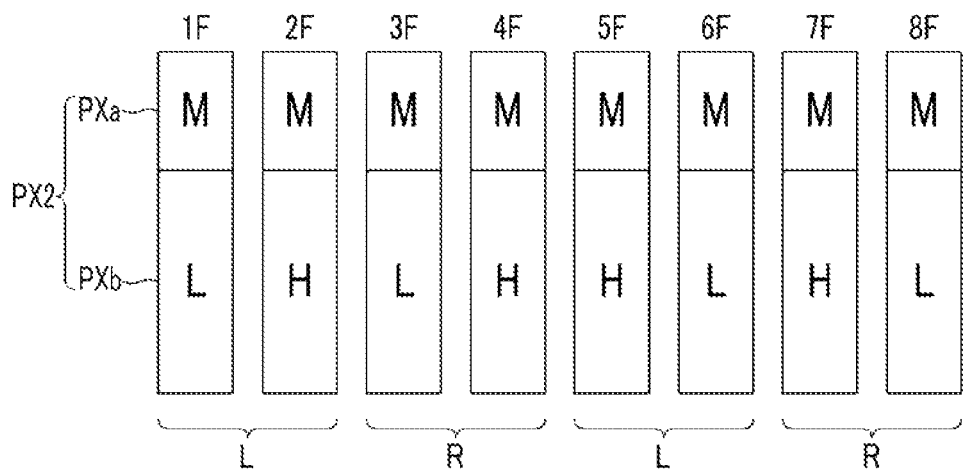
Figure 47:
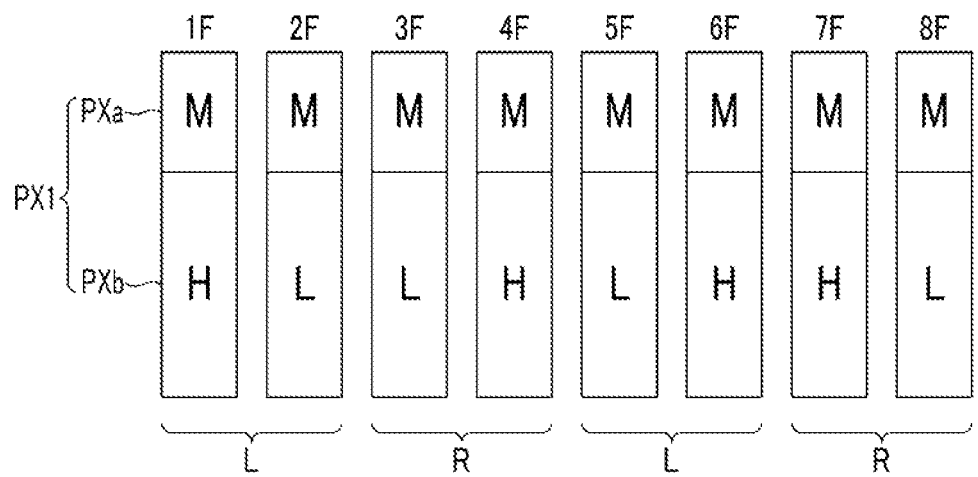
Figure 47:
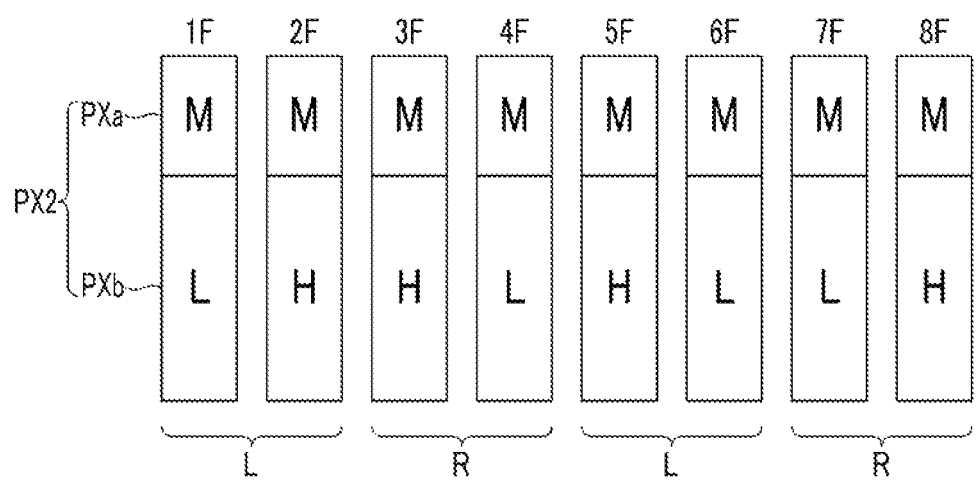

Referring to FIGS. 46 and 47, during one of two frames included in one frame set, the first subpixel PXa of each pixel PX1 or PX2 displays the third image M, and the second subpixel PXb may display the first image H, and during the rest of the two frames, the first subpixel PXa may display the third image M, and the second subpixel PXb may display the second image L. FIG. 46 shows an example in which the orders of applying the gamma curve to a pair of left eye image signal L and right eye image signal R during two adjacent frame sets are the same as each other, and FIG. 47 shows an example in which the orders of applying the gamma curve to a pair of left eye image signal L and right eye image signal R during two adjacent frame sets are opposite to each other.

According to an exemplary embodiment, during the two frame sets 5F-8F after the two first frame sets 1F-4F, images may be displayed with the gamma curves applied in an opposite order to the orders applied during the two previous frame sets 1F-4F. However, according to an exemplary embodiment, as shown in FIG. 47, the third frame set 5F and 6F is the same in order of application of the gamma curves as the second frame set 3F and 4F, and the fourth frame set 7F and 8F may be the same in order of application of the gamma curves as the first frame set 1F and 2F.

The gamma curves on which the images displayed in one frame set by the two subpixels PXa and PXb are based may be variously selected among the first to third gamma curves GH, GL, and GM described above in connection with FIGS. 5 and 6. According to an embodiment, one frame set may include three or more successive frames. According to an embodiment, images according to four or more gamma curves may be variously disposed.

For example, the display device according to an exemplary embodiment of the present invention may display images according to four or more gamma curves, and in the exemplary embodiments described in connection with FIGS. 36 to 47, the third image M displayed by the subpixels PXa and PXb of the two pixels PX1 and PX2 which are adjacent to each other in a row direction or a column direction may be based on the different gamma curves.

According to an exemplary embodiment of the present invention, the gamma curves on which the images of the first and second subpixels PXa and PXb included in each of the pixels PX1 and PX2 described in connection with FIGS. 36 to 47 may be reversed. According to an embodiment, the third images M displayed by the subpixels PXa and PXb of the two pixels PX1 and PX2 may be based on different gamma curves, respectively.

In the spatial division driving scheme, when the first and second gamma curves GH and GL as shown in FIG. 5 are used, the third image M shown in FIGS. 36 to 47 is changed into the second image L according to the second gamma curve GL shown in FIG. 5.

Accordingly, a spatial division driving scheme and a time division driving scheme are applied together and thus an image according to different gamma curves for one input image signal L or R may be displayed through the two subpixels PXa and PXb during one frame, and the subpixels PXa and PXb, respectively, may display the images according to different gamma curves during the successive frame. Accordingly, a side synthetic gamma curve during one frame set including two or more successive frames with respect to the two subpixels PXa and PXb is closest to a front gamma curve Gf, thereby increasing lateral visibility.

Figure 48:
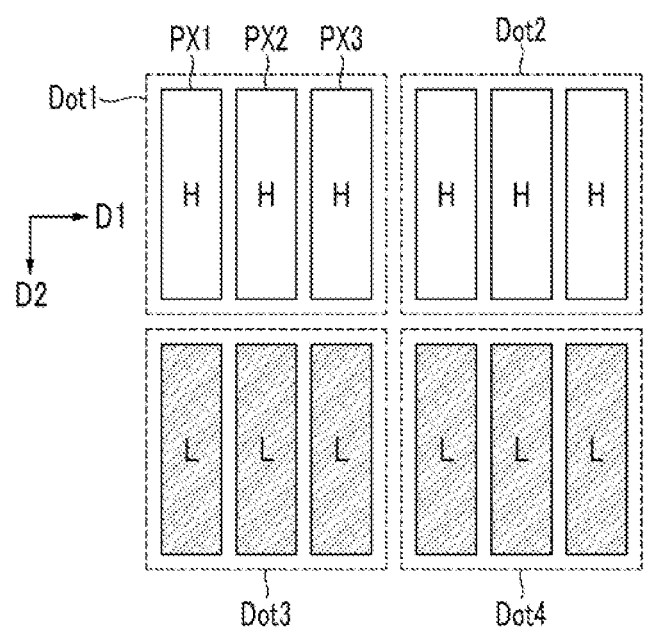
FIGS. 48 to 50, respectively, are diagrams illustrating luminance of a plurality of pixels of a display device according to an exemplary embodiment of the present invention.
Figure 49:
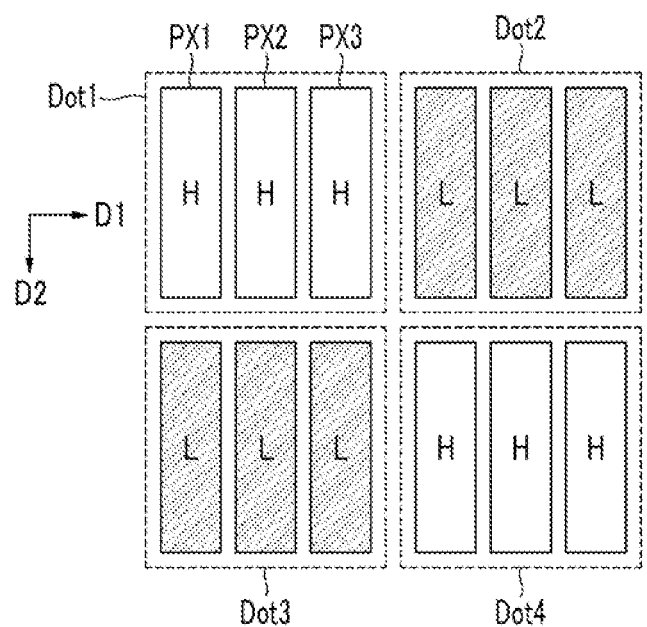
Figure 50:
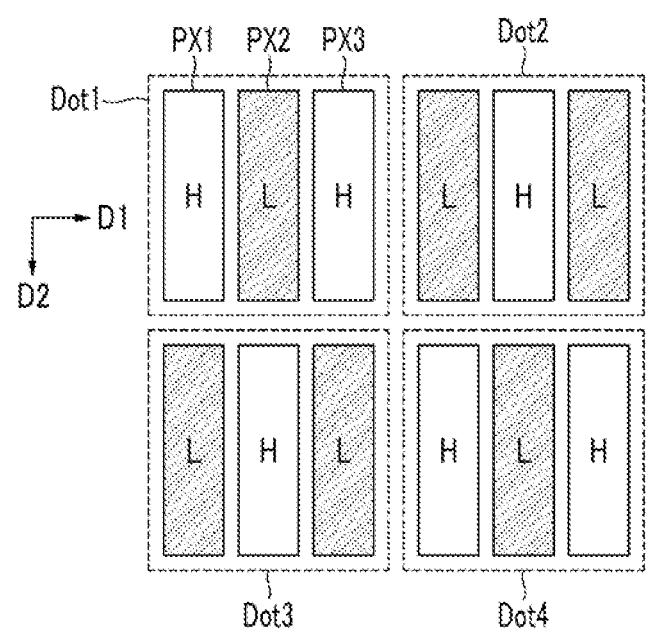

A method of driving a display device according to an exemplary embodiment of the present invention will be described with reference to FIGS. 48 to 50. In FIGS. 48 to 50, 'H' represents an image according to a first gamma curve GH, and represents a second image according to the second gamma curve GL.

FIGS. 48 to 50, respectively, are diagrams illustrating luminance levels of a plurality of pixels of a display device according to an exemplary embodiment of the present invention.

Referring to FIG. 3 and FIGS. 48 to 50, the display panel 300 of the display device according to an exemplary embodiment of the present invention includes a plurality of dots Dot1, Dot2, Dot3, and Dot4 which are arranged in a matrix form, and each of the dots Dot1, Dot2, Dot3, and Dot4 includes a plurality of pixels PX1, PX2, and PX3 which display different primary colors, such as red, green and blue, respectively. The plurality of pixels PX1, PX2, and PX3 included in one dot Dot1-Dot4 may be disposed in a row direction or in a column direction and may display images corresponding to different input image signals IDAT, respectively.

According to an exemplary embodiment of the present invention, in the 2D mode, each of the pixels PX1, PX2, and PX3 may display the first image H according to the first gamma curve GH and the second image L according to the second gamma curve GL during a plurality of frames included in one frame set. In the 3D mode, each of the pixels PX1, PX2, and PX3 alternately receives a left eye data voltage corresponding to the left eye image signal L and a right eye data voltage corresponding to the right eye image signal R to alternately display the left eye image and the right eye image during each frame. In the 3D mode, each of the pixels PX1, PX2, and PX3 may receive the data voltage Vd according to one gamma curve, and the adjacent pixels PX1, PX2, and PX3 may receive the data voltages Vd according to different gamma curves. As a result, it is possible to increase lateral visibility in the 3D mode.

Referring to FIG. 48, during one frame, pixels PX in one pixel row receive the data voltages Vd according to the same gamma curve to display the first image H or the second image L, and the adjacent pixels PX in a column direction D2 may receive the data voltages Vd according to different gamma curves. The pixels PX1, PX2, and PX3 included in one dot Dot1-Dot4 may display images according to the same gamma curve. During the next frame, the gamma curve on which the image of each pixel PX is based may be different from the gamma curve during the previous frame.

Referring to FIG. 49, during one frame, pixels PX1, PX2, and PX3 in one dot Dot1-Dot4 display images according to the same gamma curve, or the adjacent dots Dot-Dot4 in a row direction D1 or a column direction D2 may display images H and L according to different gamma curves. Two dots Dot1-Dot4 facing each other in a diagonal direction may display the images H and L according to the same gamma curve, and the gamma curves on which the images displayed in each dot Dot1-Dot4 are based may be changed during the two adjacent frames. During the next frame, the gamma curve on which the image of each pixel PX is based may be different from the gamma curve during the previous frame.

Referring to FIG. 50, during one frame, the pixels PX1, PX2, and PX3 which are adjacent to each other in a row direction D1 or a column direction D2 may receive data voltages Vd according to different gamma curves to display the images H and L. Accordingly, one dot Dot1-Dot4 may include the pixels PX1, PX2, and PX3 displaying images according to different gamma curves. During the next frame, the gamma curve on which the image of each pixel PX is based may be different from the gamma curve during the previous frame.

A method of driving a display device according to an exemplary embodiment of the present invention will be described with reference to FIGS. 51 to 53E.

Figure 51:
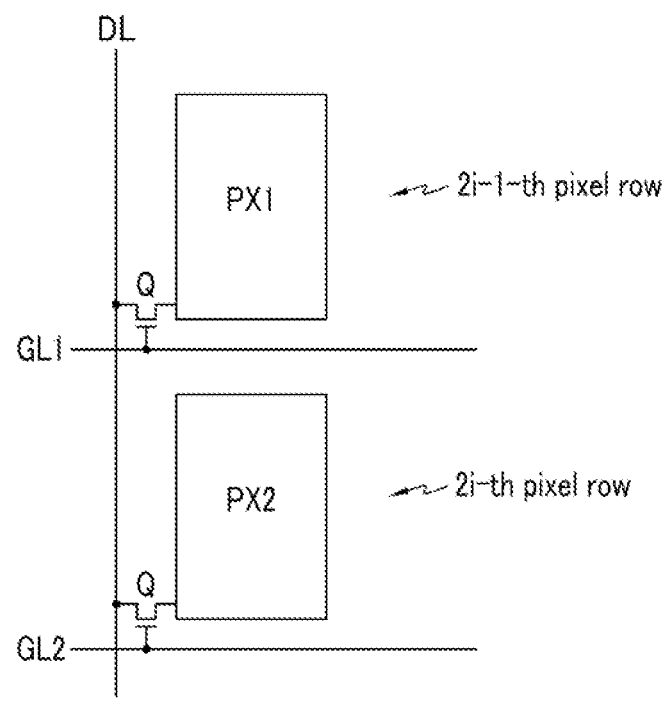
FIG. 51 is a circuit diagram schematically illustrating a display panel of a display device according to an exemplary embodiment of the present invention.
Figure 52:
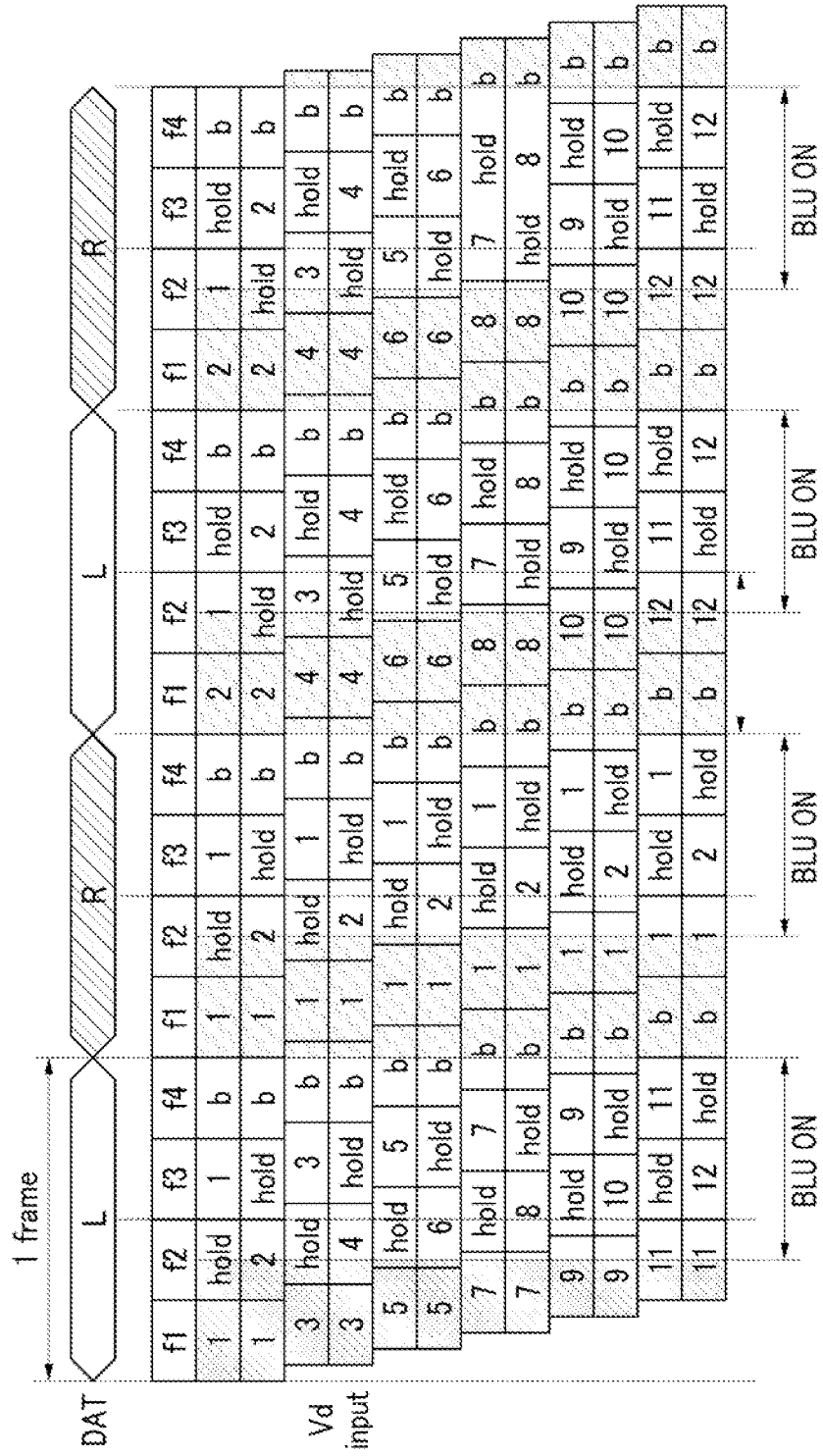
FIG. 52 is a timing diagram illustrating a method of driving a display device that displays a 3D image according to an exemplary embodiment of the present invention.
Figure 53:
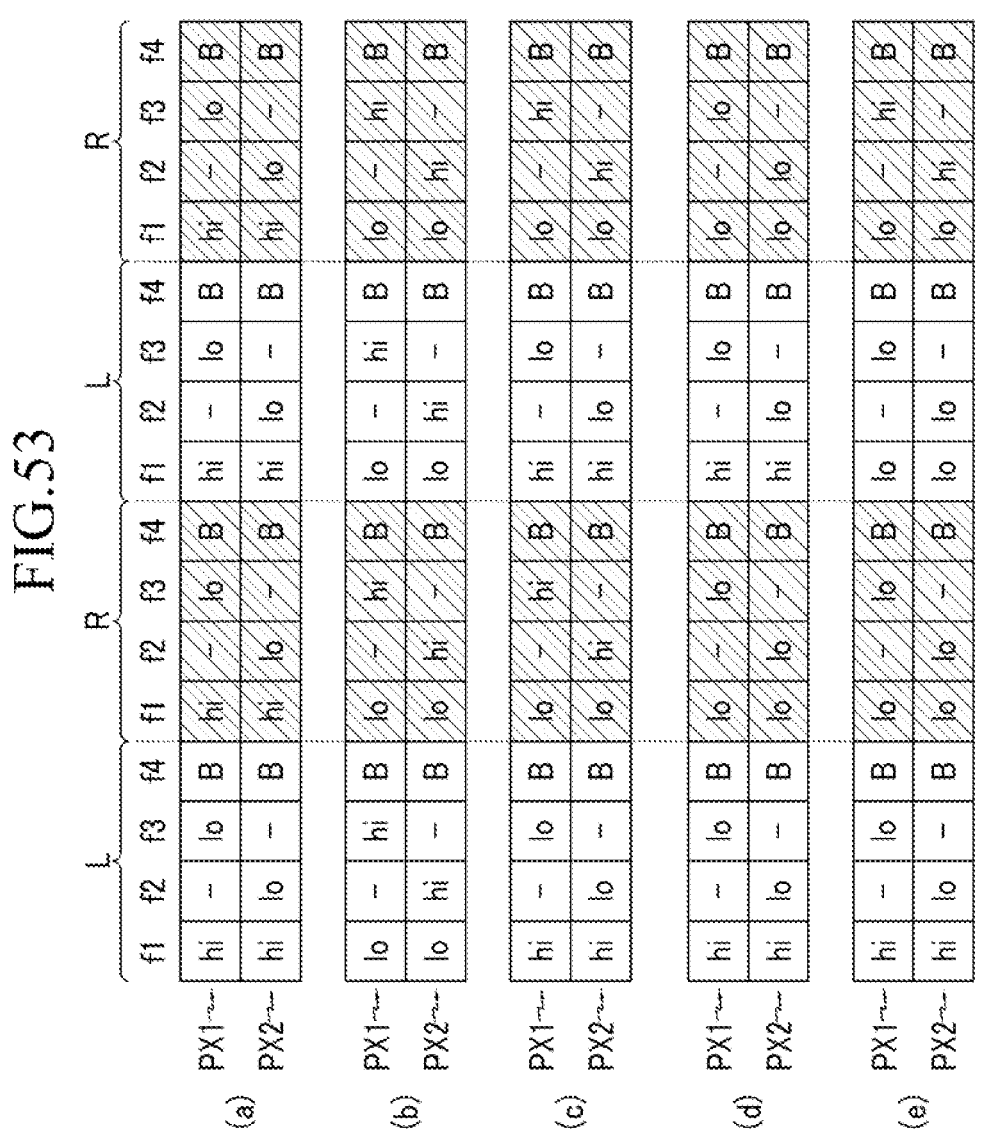

FIG. 51 is a circuit diagram schematically illustrating a display panel of a display device according to an exemplary embodiment of the present invention, FIG. 52 is a timing diagram illustrating a method of driving a display device that can display a 3D image according to an exemplary embodiment of the present invention, and FIGS. 53A to 53E are diagrams illustrating changes over time in luminance of pixels in two pixel rows of a display device according to an exemplary embodiment of the present invention.

Referring to FIG. 51, the display device according to an exemplary embodiment of the present invention includes a plurality of pixel rows. A pixel PX1 in a 2i-1-th pixel row (i is a natural number) and a pixel PX2 in a 2i-th pixel row may be connected to different gate lines GL1 and GL2 and one data line DL through switching elements Q. The first pixel PX1 is included in the 2i-1-th pixel row, and the second pixel PX2 is included in the 2i-th pixel row. The two gate lines GL1 and GL2 may be adjacent to each other in a column direction. The two gate lines GL1 and GL2 may transfer a gate-on voltage Von to the switching elements Q at different times or at the same time.

Referring to FIG. 52, in the driving method of the display device according to an exemplary embodiment, an image display period of one frame for each of the left eye image signal L and the right eye image signal R includes a precharging step f1, main charging steps f2 and f3, and a back image step f4. FIG. 52 shows some pixel rows, but the number of pixel rows is not limited thereto.

According to an exemplary embodiment of the present invention, two or more pixel rows may be paired and driven.

In the pre-charging step f1, the pixels PX in the 2i-1-th pixel row and the 2i-th pixel row are simultaneously charged with the data voltage Vd corresponding to the output image signal DAT for the 2i-1-th pixel row. The pixels PX in the first pixel row and the second pixel row are charged with the data voltages Vd corresponding to the output image signal DAT for the first pixel row, and the pixels PX in the third pixel row and the fourth pixel row are charged with the data voltages Vd corresponding to the output image signal DAT for the third pixel row. The pixels of the subsequent pixel rows may be charged in a similar way.

In the main charging step f2, the pixels PX in the 2i-1-th pixel row maintain the charged voltage, and the pixels PX in the 2i-th pixel row are charged with the data voltages Vd corresponding to the output image signal DAT for the 2i-th pixel row.

In the main charging step f3, the pixels PX in the 2i-th pixel row maintains the charged voltage, and the pixels PX in the 2i-1-th pixel row are charged with the data voltages Vd corresponding to the output image signal DAT for the 2i-1-th pixel row.

In the black image step f4, black data voltages b corresponding to black images are charged in the pixels PX in all of the pixel rows or the previously charged voltage may be maintained.

The light emitting period ON of the backlight 900 may start from a middle part of the main charging step f2 of the first pixel row for each frame and may last until the main charging step f3 of the last pixel row, but is not limited thereto and may be controlled to reduce luminance and crosstalk.

In the driving method of the display device, the gamma curve applied in the pre-charging step f1 and the gamma curves applied in the main charging steps f2 and f3 are different from each other, thereby increasing lateral visibility of the 3D image. The gamma curves may be applied in various orders.

For example, referring to FIG. 53A, in the pre-charging step f1 of the frame for the left eye image signal L and the right eye image signal R, the data voltages Vd are charged in the pixel PX1 in the 2i-1-th pixel row and the pixel PX2 in the 2i-th pixel row to display a first image hi. In the main charging steps f2 and f3, the data voltages Vd according to the second gamma curve GL are charged in the pixels PX in the 2i-1-th pixel row and the 2i-th pixel row to display a second image lo, or the previously charged voltage may be maintained. In the black image step f4, black data voltages b are charged in the pixels PX in all of the pixel rows, or the previous image may be maintained.

Referring to FIG. 53B, in the pre-charging step f1 of each frame, the data voltages Vd according to the second gamma curve GL are charged in the pixel PX1 in the 2i-1-th pixel row and the pixel PX2 in the 2i-th pixel row to display the second image lo. In the main charging steps f2 and f3, the data voltages Vd according to the first gamma curve GH are charged in the pixels PX in the 2i-1-th pixel row and the 2i-th pixel row to display the first image hi, or the previous charged voltage may be maintained.

Referring to FIG. 53C, with respect to the right eye image signal R or the left eye image signal L in one frame, in the pre-charging step f1, the pixel PX1 in the 2i-1-th pixel row and the pixel PX2 in the 2i-th pixel row display the first image hi, and in the main charging steps f2 and f3, the second image lo may be displayed or the previous image may be maintained. With respect to the left eye image signal L or the right eye image signal R during the next frame, in the pre-charging step f1, the pixel PX1 in the 2i-1-th pixel row and the pixel PX2 in the 2i-th pixel row display the second image lo, and in the main charging steps f2 and f3, the first image hi may be displayed or the previous image may be maintained.

Referring to FIG. 53D, with respect to the right eye image signal R or the left eye image signal L during one frame, in the pre-charging step f1, the pixel PX1 in the 2i-1-th pixel row and the pixel PX2 in the 2i-th pixel row display the first image hi, and in the main charging steps f2 and f3, the second image lo may be displayed or the previous image may be maintained. With respect to the left eye image signal L or the right eye image signal R during the next frame, in the pre-charging step f1, the pixel PX1 in the 2i-1-th pixel row and the pixel PX2 in the 2i-th pixel row display the second image lo, and in the main charging steps f2 and f3, the second image lo may be displayed or the previous image may be maintained.

Referring to FIG. 53E, with respect to the right eye image signal R or the left eye image signal L during one frame, in the pre-charging step f1, the pixel PX1 in the 2i-1-th pixel row and the pixel PX2 in the 2i-th pixel row display the first image hi, and in the main charging steps f2 and f3, the second image lo may be displayed or the previous image may be maintained. With respect to the left eye image signal L or the right eye image signal R during the next frame, in the pre-charging step f1, the pixel PX1 in the 2i-1-th pixel row and the pixel PX2 in the 2i-th pixel row display the second image lo, and in the main charging steps f2 and f3, the second image lo may be displayed or the previous image may be maintained. During the next two frames, the application order of the gamma curves may be opposite to the application order of the gamma curves during the two previous frames. With respect to the left eye image signal L or the right eye image signal R during the next frame, in the pre-charging step f1, the pixel PX1 in the 2i-1-th pixel row and the pixel PX2 in the 2i-th pixel row display the second image lo, and during the main charging steps f2 and f3, the second image lo may be displayed or the previous image may be maintained. Thereafter, with respect to the left eye image signal L or the right eye image signal R during the next frame, in the pre-charging step f1, the pixel PX1 in the 2i-1-th pixel row and the pixel PX2 in the 2i-th pixel row display the second image lo, and in the main charging steps f2, and f3, the first image hi may be displayed or the previous image may be maintained.

For purposes of the description, the left eye image signal L is inputted earlier than the right eye image signal R, but the embodiments of the present invention are not limited thereto, and alternatively, the right eye image signal R may be inputted earlier than the left eye image signal L.

While the embodiments of the invention have been described, it is to be understood that the invention is not limited to the disclosed embodiments, but, on the contrary, is intended to cover various modifications and equivalent arrangements included within the spirit and scope of the appended claims.

What is claimed is:

1. A method of driving a display device including a plurality of pixels, the method comprising:
    displaying an image corresponding to a left eye image signal through a pixel of the plurality of pixels during a first frame set including at least two frames; and
    displaying an image corresponding to a right eye image signal through the pixel during a second frame set including at least two frames,
    wherein the first frame set is adjacent to the second frame set,
    wherein the first and second frame sets include at least one frame during which a first image according to a first gamma curve is displayed and at least two frames during which second images according to a second gamma curve different from the first gamma curve are displayed,
    wherein the at least two frames includes two successive frames during which the second image corresponding to the left eye image signal and the second image corresponding to the right eye image signal are displayed, and
    wherein a luminance of the first image is not lower than a luminance of the second image.

2. The method of claim 1, wherein each of the first frame set and the second frame set includes a frame during which the first image is displayed and a frame during which the second image is displayed.

3. The method of claim 2, wherein an order in which the first image and the second image are displayed during the first frame set is opposite to an order in which the first image and the second image are displayed during another first frame set.

4. The method of claim 3, wherein the plurality of pixels include a first pixel and a second pixel which are adjacent to each other in a row direction or in a column direction, and wherein when the first pixel displays the first image during one frame, the second pixel displays the second image.

5. The method of claim 2, wherein an order in which the first image and the second image are displayed during the first frame set is different from an order in which the first image and the second image are displayed during the second frame set.

6. The method of claim 5, wherein an order in which the first image and the second image are displayed during the first frame set is opposite to an order in which the first image and the second image are displayed during another first frame set.

7. The method of claim 6, wherein the plurality of pixels include a first pixel and a second pixel which are adjacent to each other in a row direction or in a column direction, and wherein when the first pixel displays the first image during one frame, the second pixel displays the second image.

8. The method of claim 1, wherein a ratio of the number of frames during which the first image is displayed to the number of frames during which the second image is displayed in the first frame set and the second frame set is 1:3.

9. The method of claim 8, wherein four frames during which the second image is displayed are positioned between two frames during which the first image is displayed.

10. The method of claim 9, wherein the plurality of pixels include a first pixel and a second pixel which are adjacent to each other in a row direction or in a column direction, and wherein when the first pixel displays the first image during one frame, the second pixel displays the second image.

11. The method of claim 1, wherein each of the first frame set and the second frame set includes a plurality of frames during which images according to a same gamma curve are displayed.

12. The method of claim 11, wherein images displayed during which a plurality of frames of the first frame set and the second frame set are based on a same gamma curve.

13. The method of claim 12, wherein the plurality of pixels include a first pixel and a second pixel which are adjacent to each other in a row direction or in a column direction, and wherein when the first pixel displays the first image during one frame, the second pixel displays the second image.

14. The method of claim 1, wherein each of the first frame set and the second frame set includes one frame, and wherein during the first frame set and the second frame set, images according to a same gamma curve are displayed.

15. The method of claim 14, wherein the plurality of pixels include a first pixel and a second pixel which are adjacent to each other in a row direction or in a column direction, and wherein when the first pixel displays the first image during one frame, the second pixel displays the second image.

16. A method of driving a display device including a plurality of dots, each dot including a plurality of pixels representing different colors from each other, the method comprising:

in a first frame, displaying a left eye image according to a first gamma curve by a first pixel representing a first color;

in the first frame, displaying a left eye image according to a second gamma curve different from the first gamma curve by a second pixel adjacent to the first pixel in a column direction and representing the first color;

in a second frame subsequent to the first frame, displaying a right eye image according to the first gamma curve by the first pixel; and in the second frame, displaying a right eye image according to the second gamma curve by the second pixel.

17. The method of claim 16, wherein at least two pixels of the pixels included in one dot display images according to a same gamma curve.

18. The method of claim 17, wherein at least two pixels of the pixels positioned in one pixel row display images according to a same gamma curve.

19. The method of claim 17, wherein pixels included in two dots which are adjacent to each other in a row direction display images according to different gamma curves.

20. The method of claim 16, wherein the plurality of pixels included in one dot include at least two pixels displaying images according to different gamma curves.

21. The method of claim 20, wherein pixels which are adjacent to each other in a row direction display images according to different gamma curves.

22. The method of claim 16, wherein a pixel of the pixels includes a first subpixel and a second subpixel which display images according to different gamma curves or images according to a same gamma curve.

* * * * *